(12) United States Patent
Chen et al.

(10) Patent No.: US 8,793,405 B2
(45) Date of Patent: Jul. 29, 2014

(54) PORTABLE TERMINAL AND CONTROL METHOD THEREOF, PORTABLE DEVICE AND CONTROL METHOD THEREOF

(75) Inventors: Xingwen Chen, Beijing (CN); Dayong Gan, Beijing (CN); Ping Tian, Beijing (CN); Deming Chen, Beijing (CN); Wei Liu, Beijing (CN); Zhifeng Xin, Beijing (CN); Xiangyang Li, Beijing (CN)

(73) Assignees: Lenovo (Beijing) Co., Ltd., Beijing (CN); Beijing Lenovo Software Ltd., Beijing (CN)

( * ) Notice: Subject to any disclaimer, the term of this patent is extended or adjusted under 35 U.S.C. 154(b) by 29 days.

(21) Appl. No.: 13/142,380

(22) PCT Filed: Sep. 29, 2010

(86) PCT No.: PCT/CN2010/077488
§ 371 (c)(1),
(2), (4) Date: Jun. 27, 2011

(87) PCT Pub. No.: WO2011/038686
PCT Pub. Date: Apr. 7, 2011

(65) Prior Publication Data
US 2012/0176746 A1   Jul. 12, 2012

(30) Foreign Application Priority Data

Sep. 29, 2009  (CN) .......................... 2009 1 0235575
Dec. 18, 2009  (CN) ...................... 2009 2 0277541 U
Dec. 25, 2009  (CN) ...................... 2009 2 0278256 U
Dec. 29, 2009  (CN) ...................... 2009 2 0278282 U
Dec. 31, 2009  (CN) .......................... 2009 1 0244580

(51) Int. Cl.
*G06F 3/00*  (2006.01)
*G06F 13/12* (2006.01)
*G06F 13/38* (2006.01)

(52) U.S. Cl.
USPC .................................. 710/8; 710/15; 710/62

(58) Field of Classification Search
None
See application file for complete search history.

(56) References Cited

U.S. PATENT DOCUMENTS

2004/0221035 A1   11/2004   Morikawa

FOREIGN PATENT DOCUMENTS

| CN | 1441602   | 9/2003  |
|----|-----------|---------|
| CN | 1536918   | 10/2004 |
| CN | 201562205 | 8/2010  |

OTHER PUBLICATIONS

International Preliminary Report on Patentability for PCT Patent Application Serial No. PCT/CN2010/077488, dated Apr. 3, 2012, 6 pages.

*Primary Examiner* — Zachary K Huson
(74) *Attorney, Agent, or Firm* — Brinks Gilson & Lione; G. Peter Nichols

(57) ABSTRACT

A portable terminal is provided, which comprises: a master device and a slave device, the master device includes a master detection unit, a master notification unit and a master control unit, and the slave device includes a slave detection unit, a slave notification unit and a slave control unit; the master detection unit and the slave detection unit are used to detect whether the second interface of the slave device is connected to the first interface of the master device, respectively; when the second interface is connected to the first interface, the master notification unit is used to transmit a first notification instruction to the master device, the slave notification unit is used to transmit the first notification instruction to the slave device; and the master control unit and the slave control unit are used to control the first hardware system and the second hardware system to compose a third hardware system, respectively, after the master device and the slave device connect with each other according to the first notification instruction, and the first OS and/or the second OS run(s) on the third hardware system. The master device and the slave device of the portable terminal in the present application may compose a hybrid system architecture to cooperate or separate as two different device to operate individually.

77 Claims, 22 Drawing Sheets

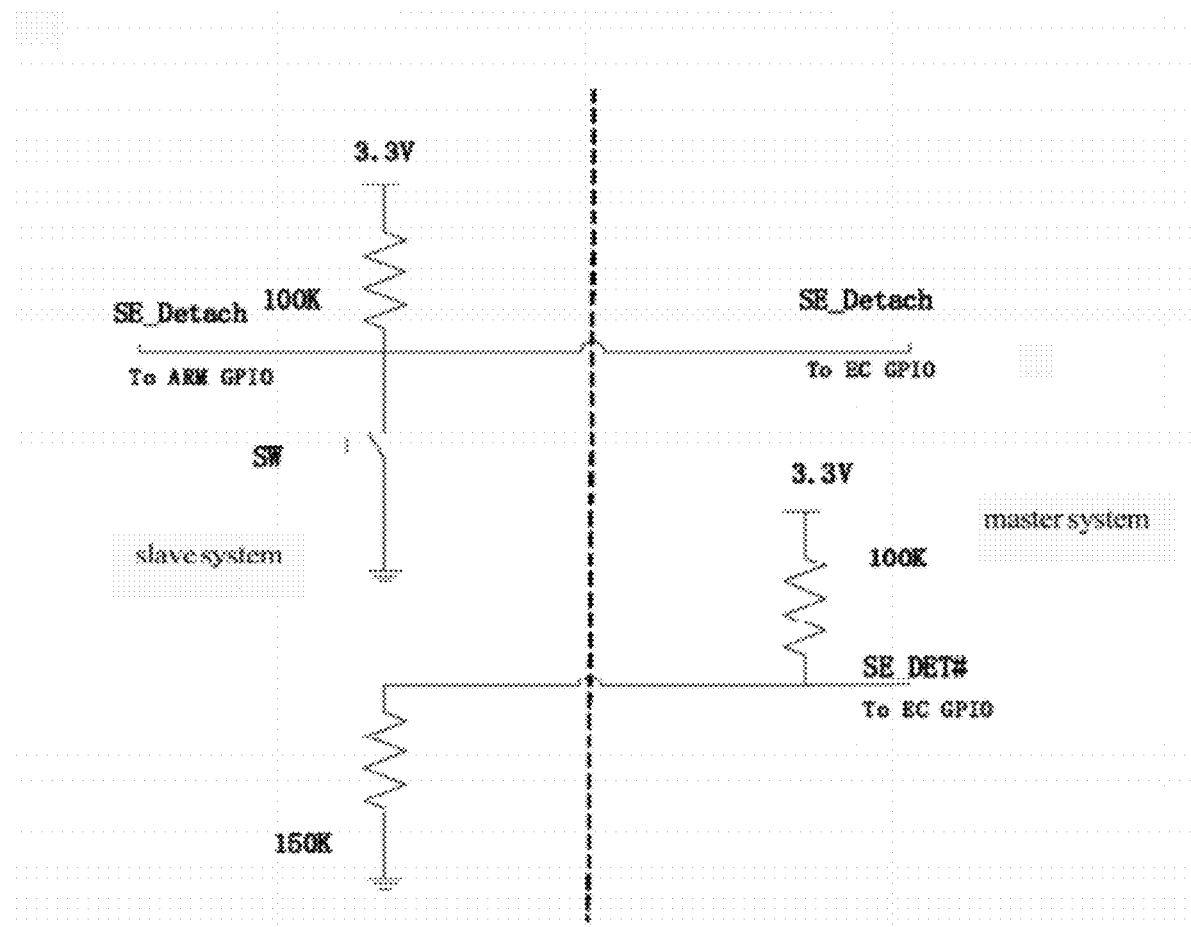

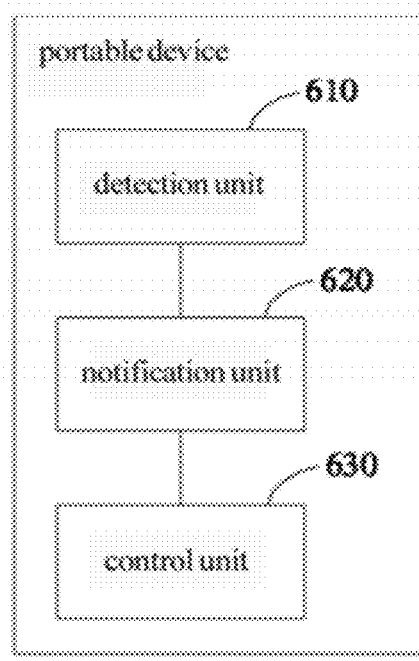

FIG. 6 the first portable device detects whether the first interface thereof is connected to the second interface of the second portable device, and generates a first detection result. — 701 when the first detection result indicates the second interface is connected to the first interface, transmitting a first notification instruction to a embedded controller EC in the first hardware system and the second portable device, respectively, and instruct the first portable device to be connected to the second portable device. — 702 the first portable device controls the first hardware system and the second hardware system to compose a third hardware system after the first portable device and the second portable device are connected with each other according to the first notification instruction, and the first OS and/or the second OS run(s) on the third hardware system. — 703

FIG. 7

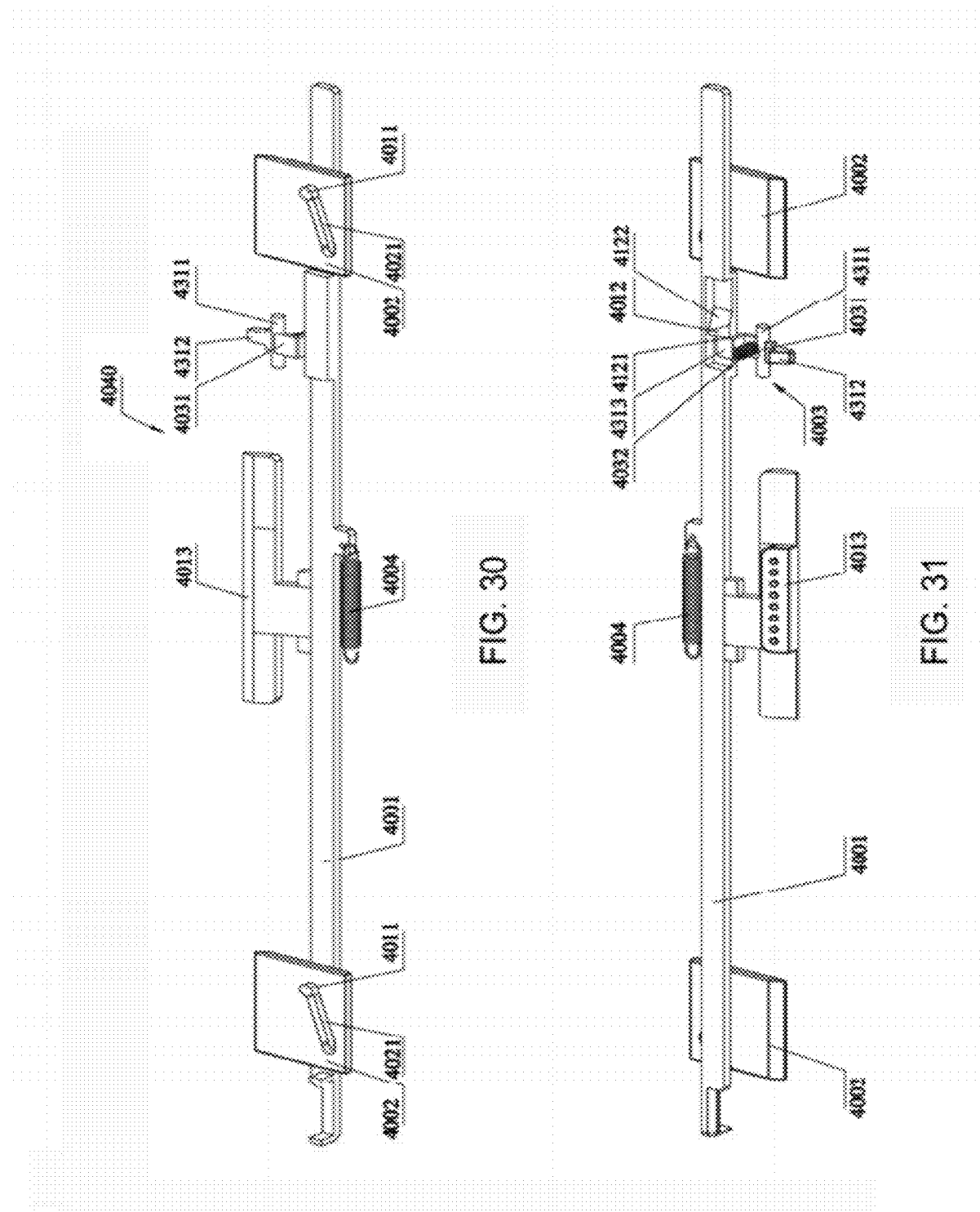

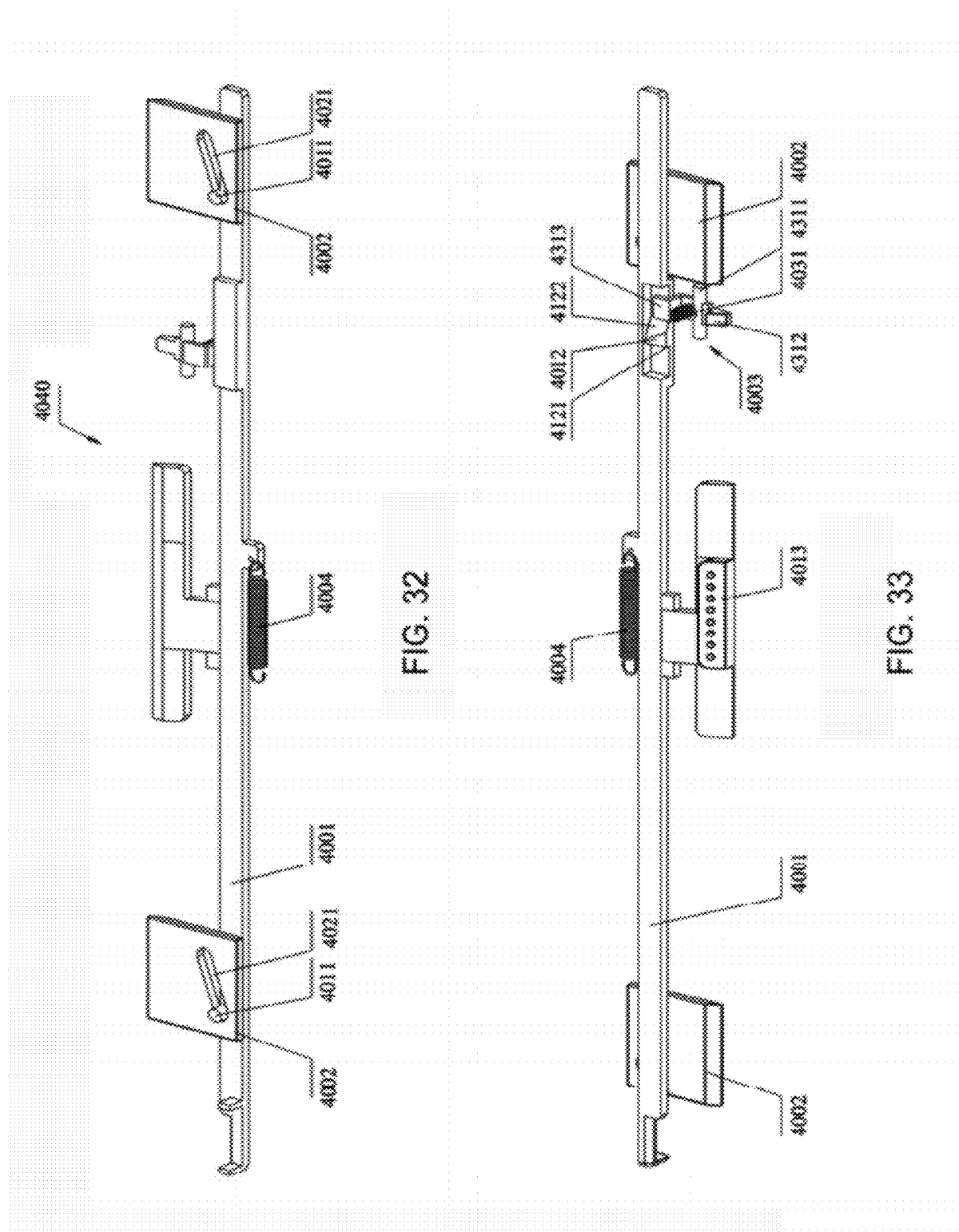

PORTABLE TERMINAL AND CONTROL METHOD THEREOF, PORTABLE DEVICE AND CONTROL METHOD THEREOF

BACKGROUND OF THE INVENTION

The present invention relates to a communication technique field, and particularly to a portable terminal and control method thereof, and a portable device and control method thereof.

A PC (Personal Computer) with hybrid system architecture is a PC embedding at least one other system on the basis of the only one system currently existed. Different systems may cooperate with each other and exert their respective advantages. In general, the existing normal PCs with hybrid system architecture integrate a master system (e.g., Vista) and a slave system (e.g., Win CE). The master system and the slave system may share components such as a keyboard, a network card, a display screen, a storage unit, an audio device, and the like, with each other.

In the prior art, the master system and the sub-system of the PC with hybrid system architecture are integrated on one mainboard, so as to form a uniform hybrid system architecture. Switch sharing and cooperation can be realized between the master system and slave system. However, the master system and the slave system have its own advantage, but the existing hybrid architecture system can only combine the advantages of the two systems to use. That is, for a PC with hybrid system architecture, its master system and slave system are unable to separate into two independent systems and operate respectively; further, it is difficult to compose hybrid system architecture with independent device terminals having only single system to cooperate with each other.

SUMMARY OF THE INVENTION

One object of the present invention's embodiment is to provide a portable terminal and control method thereof, and a portable device and control method thereof, in order to address the problems occurred in the prior art that different systems in the terminal with hybrid system architecture can not operate separately, and two terminals having independent system are difficult to compose a hybrid system architecture to cooperate.

In order to address the above described technical problems, the present invention's embodiments provide technical solutions as follows.

A portable terminal comprises: a master device and a slave device, wherein the master device includes a first housing, a first hardware system and a first Operating System (OS); the first hardware system is disposed in the first housing and at least includes a first interface, and the first OS runs on the first hardware system; the slave device includes a second housing, a second hardware system and a second OS; the second hardware system is disposed in the second housing and at least includes a second interface, the second hardware system is different from the first hardware system, and the second OS runs on the second hardware system; the master device includes a master detection unit, a master notification unit and a master control unit, and the slave device includes a slave detection unit, a slave notification unit and a slave control unit; the master detection unit and the slave detection unit are used to detect whether the second interface of the slave device is connected to the first interface of the master device, respectively, and to generate a first detection result; when the first detection result indicates the second interface is connected to the first interface, the master notification unit is used to transmit a first notification instruction to the master device, the slave notification unit is used to transmit the first notification instruction to the slave device, the first notification instruction is used to instruct the master device to connect with the slave device, and the portable terminal is in a connection state when the master device remains connection with the slave device; and the master control unit and the slave control unit are used to control the first hardware system and the second hardware system to compose a third hardware system, respectively, after the master device and the slave device connect with each other according to the first notification instruction, and the first OS and/or the second OS run on the third hardware system.

A control method for a portable terminal is provided, the portable terminal comprises: a master device and a slave device, wherein the master device includes a first housing, a first hardware system and a first Operating System (OS); the first hardware system is disposed in the first housing and at least includes a first interface, and the first OS runs on the first hardware system; the slave device includes a second housing, a second hardware system and a second OS; the second hardware system is disposed in the second housing and at least includes a second interface, the second hardware system is different from the first hardware system, and the second OS runs on the second hardware system, the method comprises the steps of: detecting whether the second interface of the slave device is connected to the first interface of the master device, and generating a first detection result; when the first detection result indicates the second interface is connected to the first interface, transmitting a first notification instruction to the master device and the slave device, respectively, the first notification instruction is used to instruct the master device to connect with the slave device, and the portable terminal is in a connection state when the master device remains connection with the slave device; controlling the first hardware system and the second hardware system to compose a third hardware system after the master device and the slave device connect with each other according to the first notification instruction, and the first OS and/or the second OS run on the third hardware system.

A portable device comprises: a first housing, a first hardware system and a first Operating System (OS), the first hardware system is disposed in the first housing and at least includes a display unit and a first interface, and the first OS runs on the first hardware system; the portable device further comprises: a detection unit for detecting whether the first interface is connected to a second interface of a second portable device and generating a first detection result, wherein the second portable device has a second housing, a second hardware system and a second OS, the second hardware system is disposed in the second housing and at least includes a second interface, and the second OS runs on the second hardware system; a notification unit for transmitting a first notification instruction to an embedded controller EC in the first hardware system and the second portable device, respectively, when the first detection result indicates the second interface is connected with the first interface, the first notification instruction is used to instruct the portable device to connect with the second portable device; and a control unit for controlling the first hardware system and the second hardware system to compose a third hardware system after the portable device and the second portable device connect with each other according to the first notification instruction, and the first OS and/or the second OS run on the third hardware system.

A control method for a portable device is provided, the portable device comprises a first housing, a first hardware system and a first Operating System (OS), the first hardware system is disposed in the first housing and at least includes a display unit and a first interface, and the first OS runs on the first hardware system; the method comprises the steps of: detecting whether the first interface is connected to a second interface of a second portable device and generating a first detection result, wherein the second portable device has a second housing, a second hardware system and a second OS, the second hardware system is disposed in the second housing and at least includes a second interface, and the second OS runs on the second hardware system; transmitting a first notification instruction to an embedded controller EC in the first hardware system and the second portable device, respectively, when the first detection result indicates the second interface is connected with the first interface, the first notification instruction is used to instruct the portable device to connect with the second portable device; and controlling the first hardware system and the second hardware system to compose a third hardware system after the portable device and the second portable device connect with each other according to the first notification instruction, and the first OS and/or the second OS run on the third hardware system.

It can be seen from the technical solutions provided by the present invention's embodiments that the portable terminal composing of the master device and the slave device may control the master device and the slave device to compose a hybrid architecture system to operate, and may also control the master device and the slave device to operate independently in a form of separating, by detecting the connection state of the interfaces; and with respect to a portable device having a independent system, the present invention may make the two portable devices composing a hybrid architecture system to operate by detecting the connection state between its interface and other portable devices having the independent system. The present invention's embodiments may carry out application control to terminals having different OSs, select freely whether the terminals should compose a hybrid architecture system to operate or be separated into independent systems to operate, which increases an application flexibility of the terminals.

BRIEF DESCRIPTION OF THE DRAWINGS

In order to illuminate the technical solutions of the present invention's embodiments more clearly, the following simple introduction will given for the figures which are used necessary in the description of the embodiments. Obviously, the figures in the following description are only some embodiments of the present invention, and those of ordinary skilled in the art may obtain other figures according to these figures without paying out any inventive labors, wherein:

FIG. 3 is a schematic view showing a processing for detection control when a plug-pull switching is performed by a portable terminal of the present application;

FIG. 4 is a flow chart of a control method for the portable terminal of the first embodiment of the present application;

FIG. 6 is a block diagram of the portable terminal of a embodiment of the present application;

FIG. 7 is a flow chart of a control method for the portable device of the first embodiment of the present application;

FIG. 30 is a schematic view showing an assembling relationship of a locking mechanism described in the embodiment of the present invention;

FIG. 31 is a schematic view, from the back side angle, showing the assembling relationship of the locking mechanism described in the embodiment of the present invention;

FIG. 32 is a schematic view showing the assembling relationship of the locking mechanism when a locking tab is in a protruding state;

FIG. 33 is a schematic view, from the back side angle, showing the assembling relationship of the locking mechanism when locking tab is in a protruding state;

DETAILED DESCRIPTION OF THE PREFERRED EMBODIMENT

Figure 1A:
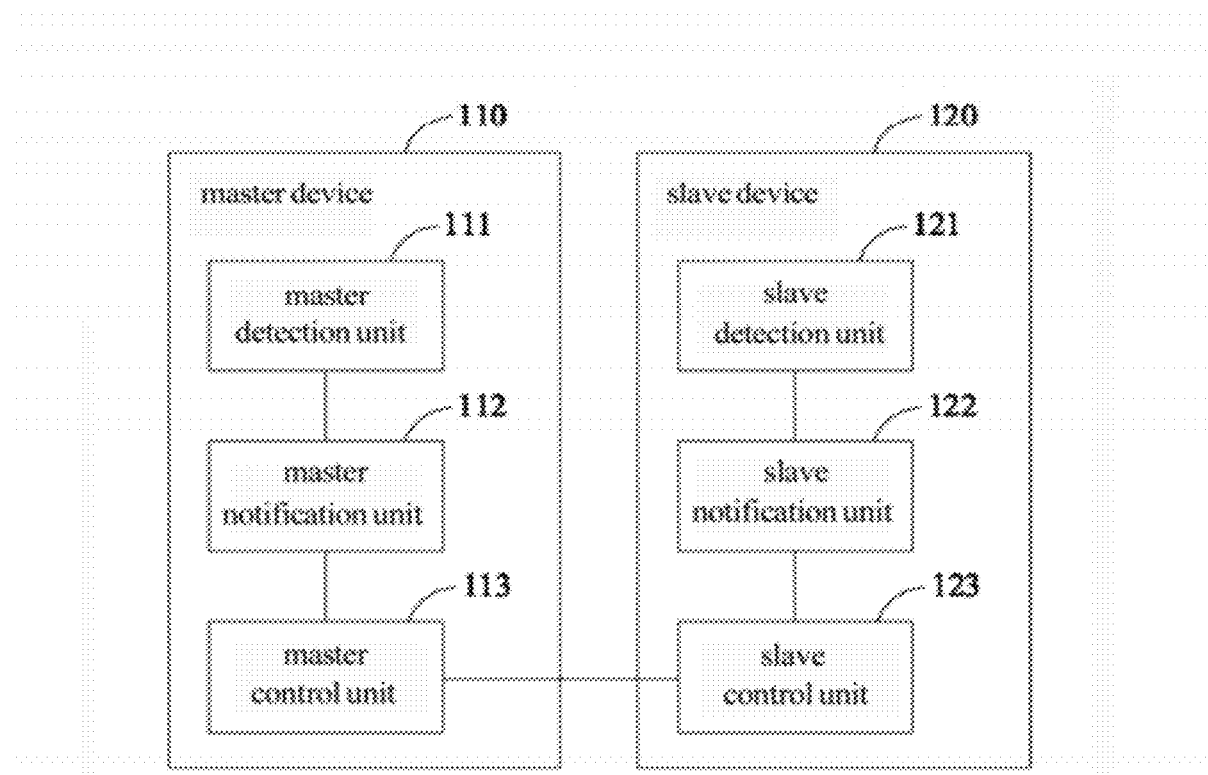
FIG. 1A is a block diagram of the portable terminal of the present application.

In a plurality of embodiments of the present application as follows, some embodiments provide a portable terminal and control method thereof, and others provide a portable device and the control method thereof.

Solutions in the embodiments of the present application will now be described in detail with reference to the accompanying drawings, so that those skilled in the art can understand the solutions in the embodiments of the present application better, and the above objects, characteristics and advantages of the embodiments of the present application may be more apparent.

With respect to the structure, a portable terminal provided by the embodiments of the present application comprises a master device and a slave device, wherein the master device includes a first housing, a first hardware system and a first Operating System (OS), the first hardware system is disposed in the first housing and at least includes a first interface, and the first OS runs on the first hardware system; the slave device includes a second housing, a second hardware system and a second OS; the second hardware system is disposed in the second housing and at least includes a second interface. The second hardware system is different from the first hardware system, and the second OS runs on the second hardware system.

Referring to FIG. 1, which is a block diagram of the portable terminal of the embodiment of the present application. It shows a master device 110 and a slave device 120. The master device 110 includes a master detection unit 111, a master notification unit 112 and a master control unit 113, and the slave device 120 includes a slave detection unit 121, a slave notification unit 122 and a slave control unit 123. Other components in the master device 110 and the slave device 120 are not shown in the FIG. 1 in detail, and their functions and usage processes are illustrated from the description with respect to the following several units.

The master detection unit 111 and the slave detection unit 121 are used to detect whether the second interface of the slave device 120 is connected to the first interface of the master device 110, respectively, and generate a first detection result; when the first detection result indicates the second interface is connected to the first interface, the master notification unit 112 is used to transmit a first notification instruction to the master device 110, the slave notification unit 122 is used to transmit the first notification instruction to the slave device 120, the first notification instruction is used to instruct the master device 110 to connect with the slave device 120, and the portable terminal is in a connection state when the master device 110 remains connection with the slave device 120; and the master control unit 113 and the slave control unit 123 are used to control the first hardware system and the second hardware system to compose a third hardware system, respectively, after the master device 110 and the slave device 120 connect with each other according to the first notification instruction, and the first OS and/or the second OS run(s) on the third hardware system.

When the portable terminal is in the connection state, the master device and the slave device compose a hybrid system architecture to cooperate. The master device and the slave device may communicate data (including system state data, which enables the two systems to obtain the system state from each other, respectively), electrical signal, etc., through the first interface and the second interface. The term "hybrid system architecture" herein used refers to a Hybrid Architecture commonly said. For example, if a user views video on the master device in this architecture, when the first OS of the maser device detects that a program for playing the video is running, the slave device may transit to a normal operation state from a sleeping state or a OFF state, so that the video may be played by the second OS of the slave device, and the first OS of the corresponding master device may transit to the sleeping state or OFF state from the normal operation state in order to save power consumption of the entire hybrid system.

The first hardware system of the master device 110 includes a first peripheral, and the first OS connects to the first peripheral though a first switching logic; the second hardware system of the slave device 120 includes a second peripheral, and the second OS connects to the second peripheral though a second switching logic.

Further, the master control unit 113 is also used to control the data processing before the connection between the first OS and the second OS cooperating with the slave control unit 123 and control the first OS to connect with the second switching logic, after the master device 110 receives the first notification instruction, and the first switching logic and the second switching logic are controlled by the first OS; the slave control unit 123 is also used to control the data processing before the connection between the first OS and the second OS cooperating with the master control unit 123 and control the second OS to connect with the first switching logic, after the slave device 120 receives the first notification instruction. The data processing before connection comprises: restoring data transmission according to the stored current state data and configuration files, and loading driver.

Further, when the master device 110 is separated from the slave device 120, the master detection unit 111 and the slave master detection unit 121 are also used to, respectively, detect whether the second interface of the slave device 120 is disconnected from the first interface of the master device 110 and generate a second detection result, in the connection state; when the second detection result indicates that the second interface is disconnected from the first interface, the master notification unit 112 is also used to transmit a second notification instruction to the master device 110, the slave notification unit 122 is also used to transmit the second notification instruction to the slave device 120, the second notification instruction is used to instruct the master device 110 to disconnect from the slave device 120, the portable terminal is in a disconnection state when the master device 110 is disconnected from the slave device 120; the master control unit 113 and the slave control unit 123 are used to control the third hardware system to be divided as the first hardware system and the second hardware system, respectively, after the master device 110 and the slave device 120 disconnect with each other according to the second notification instruction, and the master control unit 113 is also used to control the first OS to run on the first hardware system, while the slave control unit 123 is also used to control the second OS to run on the second hardware system.

The master detection unit 111 and the slave detection unit 121 comprise at least one of the following units (not shown in FIG. 1), respectively: a first detection unit for detecting whether the second interface of the slave device 120 is disconnected from the first interface of the master device 110, according to a lockpin-key-trigger of a removable configuration between the master device 110 and the slave device 120; a second detection unit for detecting whether the second interface of the slave device 120 is disconnected from the first interface of the master device 110, according to a software-trigger set in the first OS; a third detection unit for detecting whether the second interface of the slave device 120 is disconnected from the first interface of the master device 110, according to a separation instruction generated when an insertion pin in the first interface separates from an insertion hole in the second interface. Likewise, a connection instruction will be generated if the insertion pin in the first interface inserts into the insertion hole in the second interface.

Further, the master control unit 113 is also used to control the data processing before the disconnection between the first OS and the second OS cooperating with the slave control unit 123 and control the first OS to disconnect from the second switching logic, after the master device 110 receives the second notification instruction; and the slave control unit 123 is also used to control the data processing before the disconnection between the first OS and the second OS cooperating with the master control unit 123 and control the second OS to disconnect from the first switching logic, after the slave device 120 receives the second notification instruction. The data processing before disconnection comprises: stopping the data transmission between the first OS and the second OS, interacting the configuration files and uninstalling the driver, and storing data on the current state.

Regarding the structure, the master device 110 is further equipped with a connection support apparatus 114, and the slave device 120 is further equipped with a connection adaptation apparatus. The master device 110 and the slave device 120 compose the portable terminal or separate as two separate devices through the adaptation between the connection support apparatus and the connection adaptation apparatus.

The connection structure between the master device and the slave device will be illustrated below taking a notebook computer as an example.

Figure 1B:
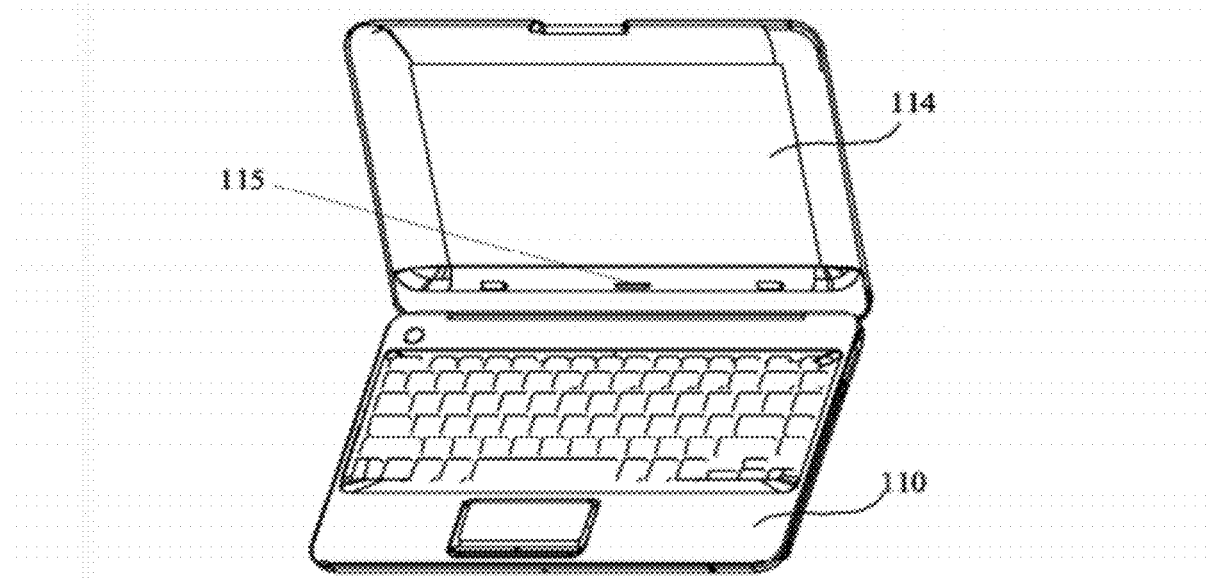
FIG. 1B is a schematic view of a front structure of a connection support apparatus of a portable terminal master device.
Figure 1C:
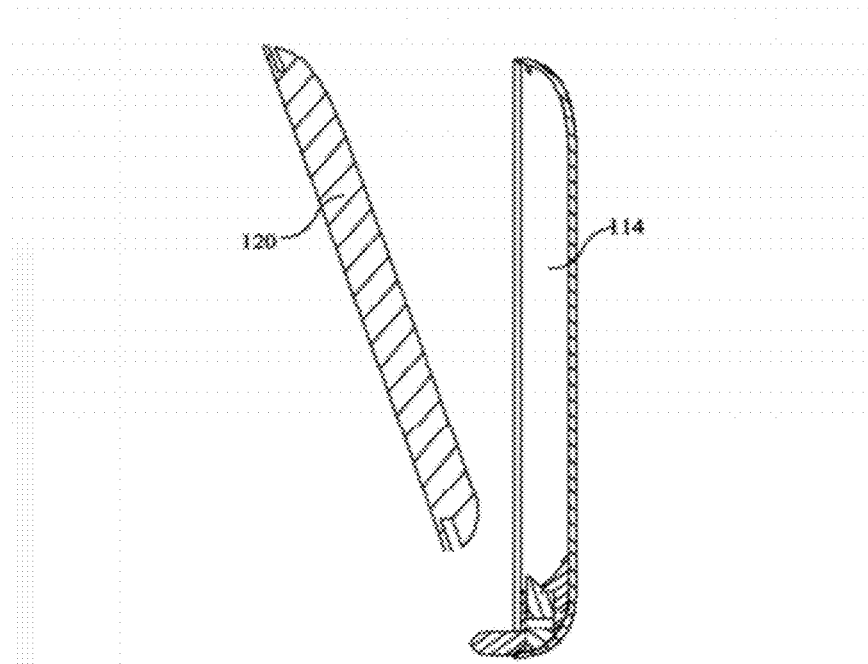
FIG. 1C is a section view of a side structure of the connection support apparatus shown in FIG. 1B.
Figure 1D:
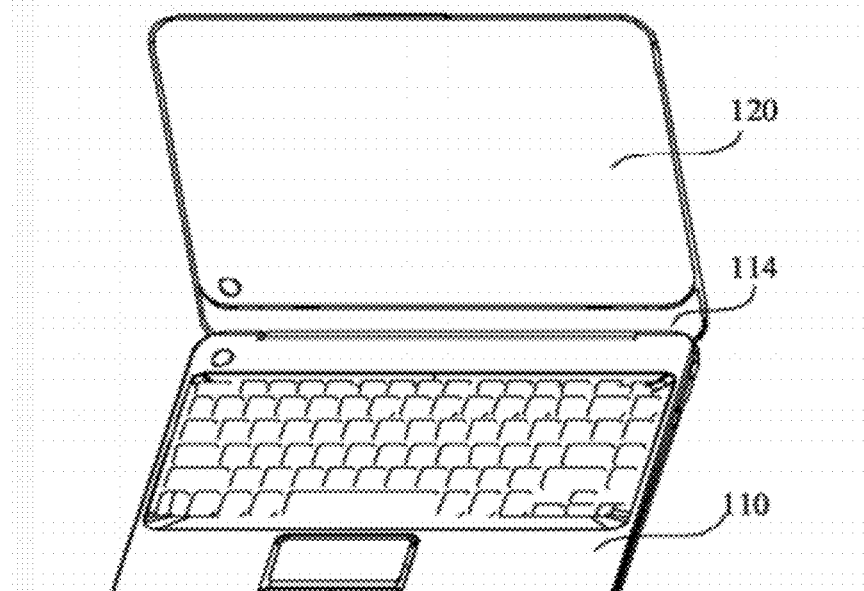
FIG. 1D is a schematic view of a hybrid system portable terminal which is composed by a master device and a slave device through the connection support apparatus.

Referring to FIGS. 1B-1D, wherein FIG. 1B is a schematic view of a front structure of a connection support apparatus of a portable terminal master device of the present application, FIG. 1C is a section view of a side structure of the connection support apparatus shown in FIG. 1B, and FIG. 1D is a schematic view of a hybrid system portable terminal which is composed by the master device and the slave device through the connection support apparatus. As shown in FIG. 1B, a host part of the master device 110 is connected to the connection support apparatus 114 via a spindle, the first interface 115 is disposed on a middle position of a connection part at which the host part and the connection support apparatus 114 connect to each other, the body of the connection support apparatus 114 is a concave panel, and two location convex parts are disposed at the bottom of this panel; as can be seen from FIG. 1C, the connection adaptation apparatus of the slave device 120 may be embodied as two concave slots disposed at the bottom of the slave device 120, corresponding to the two location convex parts on the master device 110. When the slave device 120 prepares for inserting into the connection support apparatus 114 of the master device 110, the two concave slots thereon are inserted into the location convex parts, respectively, and in turn the body part of the slave device 120 is embedded in the concave panel of the connection support apparatus 114; referring to FIG. 1D, the master device 110 and the slave device 120 compose a integrated portable terminal. Also, the second interface (not shown) of the slave device 120 is connected with the first interface 115 of the master device 110 so as to realize the transmission of data (including information on system states), and the conduction of a circuit, realizing a portable terminal with the hybrid system architecture, in a form of notebook, composed of a master device and a slave device. A user may operate such portable terminal like operating a notebook computer without change the user's common usage. Further, this portable terminal has all advantages of a device with the hybrid system architecture, for example, long standby time, automatically switching to the master device or the slave device to operate according to power consumption of the program currently run, and less system power consumption of the slave device than that of the master device. The slave device of this portable terminal may also separate from the connection support apparatus of the master device easily, so that the two devices may operate independently. At that time, the slave device is a tablet computer with a touch function, while the master device may act as a home server, for example, the master device may perform a download task, etc.

Figure 1E:
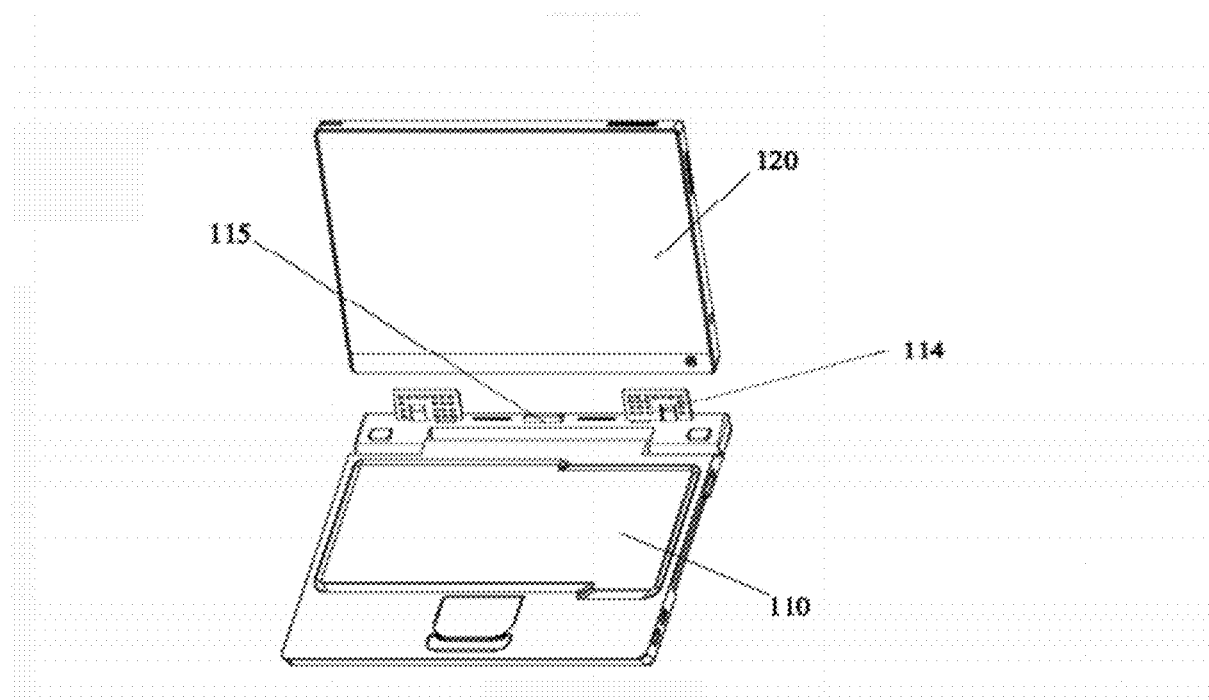
FIG. 1E is a schematic view of the structure of a connection support apparatus of another portable terminal master device of the present application.

Referring to FIG. 1E, which is a schematic view of the structure of a connection support apparatus of another master device of a portable terminal of the present application. A connection support apparatus 114 is disposed on the master device 110 and connected to the master device 110 via a spindle, the first interface 115 is disposed on a middle position near a side of the connection support apparatus 114 on the host part, two convex insertion parts are disposed on both sides of the connection support apparatus 114, two concave slots are correspondingly set in the bottom of the slave device 120. And the slave device 120 aims the concave slots thereon at the two convex insertion parts and inserts to complete the composition when combing the slave device 120 and the master device 110. Also, the second interface (not shown) of the slave device 120 is connected with the first interface 115 of the master device 110 so as to realize the transmission of data (including information on system states) and the conduction of a circuit, realizing a portable terminal with the hybrid system architecture, in a form of notebook, composed of a master device and a slave device.

The portable terminal in the embodiment of the present application may be embodied as a notebook computer with a hybrid architecture system, and the master device of this notebook computer is a host part including a keyboard, while the slave device thereof is a part including a display screen. The master Operating System (OS), which is usually a Window system, runs on a first hardware system (X86) in the host part. The host part may operate as a separate device, such as being a home server. For example, the host part may perform a download task, etc., or may connect to a general display to form a general computer; the slave OS, which is usually a embedded OS (winCE), runs on a second hardware system (ARM) in the display screen part. This display screen part may separately operate as a separate device, and may have a touch function so as to be used as a tablet touch computer. A master system interface (i.e., the first interface) is disposed on the host part, while a slave system interface (i.e., the second interface) is disposed on the display screen part. A notebook computer with the hybrid system architecture may be composed by jointing the master system interface with the slave system interface, thus the host part and the display screen part cooperate with each other.

Figure 2:
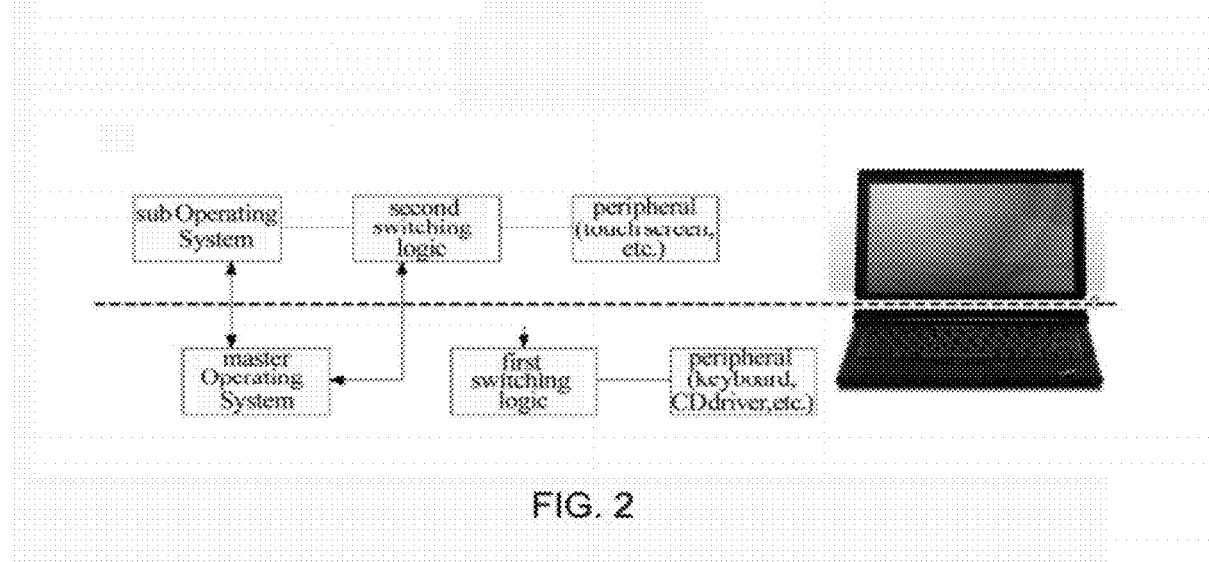
FIG. 2 is a schematic view of the internal structure of a portable terminal of the present application.

FIG. 2 is a schematic view of the internal structure of a portable terminal of the present application, wherein the portable terminal is shown as a notebook computer as an example. The first OS is the master system, the second OS is a sub system, and the sub system is set in the display screen, the master system is set in the host. The sub system in the display screen runs on the hardware system (ARM) set in the display screen, and the master system in the host runs on the hardware system (X86) in the host module. The display screen is a separate electrical device having touch function and may operate separately (i.e., a tablet touch computer). Also, the host is a separate device and may operate separately. Interfaces, which belong to the sub system and the master system, respectively, is disposed between the display screen and host module, so that a connection state and a disconnection state between the display screen and the host may be detected through these interfaces.

When it is detected that the master system interface of the host part connects with the slave system interface of the display screen part, the host part and the display screen part are informed of a notification instruction for instructing the host part to connect to the display screen part, respectively. The host part and the display screen part control the hardware system in the host part and the hardware system in the display screen part to compose a complete hybrid architecture hardware system after connecting with each other according to this notification instruction, and the master OS and/or the slave OS may run on the complete hybrid architecture hardware system according to a cooperation instruction of the hybrid architecture system. In this notebook computer, the master OS further connects to master peripherals (including a keyboard and a CD driver, etc.), and the master OS connects to the master peripherals through a first switching logic; the slave OS further connects to slave peripherals (including a display part such as a touch screen.), and the slave OS connects to the slave peripherals through a second switching logic. When the host part connects to the display screen part, it needs to control the master OS and the slave OS to perform some necessary data processing before connecting, including restoring the data transmission between these two systems according to the stored current state data and configuration files upon disconnection and loading various drivers uninstalled upon disconnection; at the same time, the master OS is controlled to further connect to the second switching logic, and the slave OS is controlled to further connect to the first switching logic, and in turn the master OS controls both the first switching logic and the second switching logic, in order to implement the controlling of the peripherals and perform all kinds of the application program, so that functions in this hybrid system architecture can be achieved. A notebook computer of the hybrid system architecture is composed after the host part connects to the display screen part, and the transmission of data (including system state data, which enables both systems know the system state of the other part from each other, respectively), electrical signal (current), etc. is carried out through the master system interface of the host part and the slave system interface of the display screen part, which enables the cooperation between the two separate devices, that is, the host part and the display screen part. When starting connecting the host part and the display screen part, the connection state between the master system interface and the slave system interface may be detected by a lockpin-key-trigger for plug-pull between the host part and the display screen part, or a software-trigger set in the master OS. It is to be noted that, the individual external devices, which are connected to the master system and the slave system, respectively, become public external devices after the master system and the slave system compose the hybrid system architecture, that is, these public external devices are available for both systems.

When it is detected that the master system interface of the host part disconnects from the slave system interface of the display screen part, a notification instruction for instructing the host part and the display screen part to disconnect is sent to the host part and the display screen part, and this notification instruction may be sent to the master OS through a input/output interface, such as a GPIO interface or a I2C interface, of the master system and to the slave OS through a input/output interface, such as GPIO interface of a I2C interface, of the slave system. In other words, when the host part disconnects from the display screen part, the host part and the display screen part trigger their own GPIO signal, respectively, so the host part and the display screen part can obtain the notification instruction for instructing disconnecting. After the host part and the display screen part disconnect from each other according to this notification instruction, the complete hybrid architecture hardware system is controlled to be divided into the hardware system components of the host part and the hardware system components of the display screen part, and thereafter, the master OS in the host part runs on the divided hardware system of the host part while the slave OS in the display screen part runs on the divided hardware system of the display screen part.

When the host part disconnects from the display screen part, it still needs to control the master OS and the slave OS to perform some necessary data processing before connecting, including stopping the data transmission between the master OS and the slave OS, interacting the configuration files, uninstalling various drivers, storing the current state date and the like; at the same time, the master OS is controlled to disconnect from the second switching logic, and the slave OS is controlled to disconnect from the first switching logic, and the master OS controls the peripherals of the host part to operate separately through the first switching logic, while the slave OS controls the peripheral of the display screen part to operate separately through the second switching logic after disconnecting. It is to be noted that, the master OS of the host part can still operate at this moment, but it lacks a display part, therefore a user may connect an external display part to this host part or can use this host part as a data center. When starting disconnecting the host part from the display screen part, the disconnection state between the master system interface and the slave system interface may be detected by a lockpin-key-trigger for plug-pull between the host part and the display screen part, or a software-trigger set in the master OS.

Please note, it needs to take a period of time to complete the process for disconnecting the host part from the display screen part, because reliability and safety after disconnection should be ensured in terms of mechanism, hardware and software. After completing the above process, the user can be alerted to pull out the display screen part through an alert sound or an indication lamp, thus the two systems may separately operate.

In FIG. 2, the host part and the display screen part are composed to act as a notebook computer of the hybrid system architecture with high performance, which is suitable for office or business environment and supplies a super long standby time; if the host part disconnects from the display screen part, the display screen part may be a convenient and fashionable Tablet PC, the hardware platform therein is generally a embedded platform which has all functions of a notebook and is convenient to be carried and perform mobile application, etc. Further, the wireless data line coupling between the host part and the display screen part may be continued at this time, for example, via infrared or Bluetooth and the like, so that the user may enjoy a better mobile application experience in the situations such as home, etc.; at the same time, the host part may still function as a docking or data server, etc. having a capability of data processing, after being pulled out the display screen part. It can be seen that, the portable terminal of the embodiment of the present application has a broader application scenarios and usage mode.

Referring to FIG. 3, FIG. 3 is a schematic view showing a processing for detection control when a plug-pull switching is performed by a portable terminal with hybrid systems of the present application. The plug-pull control process in the embodiment of the present application will be described by a detailed detection signal in connection with the schematic view, wherein the master OS and the hardware system running the master OS are collectively called as a master system, while the slave OS and the hardware system running the slave OS are collectively called as a slave system.

It can be seen from the FIG. 3 that the state detection between the slave system and the master system comprises two signals SE_DET# and SE_Detach. The signal SE_DET# is used to detect whether the slave system is inserted into the master system, and the signal SE_Detach is used to detect the plug-pull action and inform the slave system of the state of the master system. The detection of the signal SE_Detach can be realized by the cooperation between key-presses and mechanism.

When the display screen and the host on which the sub system and the master system are located are in a connection state by hardware, the sub system and the master system compose a hybrid architecture system to operate. At this time, the state of signal SE_Detach is low (low level state) and the state of signal SE_DET# is low (low level state), which are detected via interfaces between the display screen and the host.

When the display screen on which the sub system is located prepares to disconnect from the host on which the master system is located, the state of signal SE_Detach is high (high level state) and the state of signal SE_DET# is low (low level state), which are detected via interfaces between the display screen and the host. Since the state of the signal SE_Detach transits to high (high level state) from low (low level state), a notification is sent to an embedded controller (EC) in the master system for informing the EC that the slave system is to be disconnected from the master system, and then the EC inform the master system of corresponding data processing operations before disconnection, including the data processing with the slave system, interacting the configuration files, uninstalling the drivers, or switching devices, and so on; also, when the slave system detects that it is about to disconnect from the master system, it performs corresponding processing operations, and if a power supply control system is configured in the slave system, the processing operations of the slave system include power supply switching and so on. Additionally, please note, in order to ensure that the disconnection between the display screen and the host is safe, there should be enough time preparing for detaching in terms of the hardware mechanism (or together with the software mechanism).

After completing the preparatory work, the user may be notified through alert sound or indication lamps that the disconnection is allowable now. After the display screen on which the sub system is located disconnects from the host on which the master system is located, the state of signal SE_Detach is still high (high level state) and the state of signal SE_DET# transits to high (high level state) from low (low level state), which are detected via interfaces between the display screen and the host. At the same time, the EC of the master system is informed that the display screen on which the slave system is located has been disconnected, and the master system enters a setup state, or power-off automatically, so as to wait for being used separately thereafter.

After the display screen on which the slave system is located disconnects from the host, the slave system enters a separate operation state, during which the slave system detects its own interfaces and obtains the state of signal SE_Detach as high (high level state) and the state of signal SE_DET# as x (arbitrary state), thus the slave system may operate independently.

In the disconnection state, when the display screen on which the sub system is located is ready to insert into the host on which the master system is located so as to compose the complete hybrid system to operate, the state of signal SE_DET# transits to high (high level state) from x which is detected via the interfaces between the display screen and the host. After starting the insertion action, a notification for notifying the EC to get ready is sent to the EC of the master system, that is, the master system performs corresponding data processing operations before insertion, including performing data processing with the slave system according to the stored data upon disconnection, interacting the configuration files, loading drivers, switching devices, etc.

After the insertion of the display screen on which the sub system into the host on which the master system is located is completed, the state of signal SE_Detach transits to low (low level state) from high (high level state) and the state of signal SE_DET# transits to low (low level state) from x (arbitrary state), which are detected via interfaces between the display screen and the host, the master system and the slave system compose a complete system with hybrid architecture to operate at this time.

Referring to FIG. 4, FIG. 4 is a flow chart of a control method of the portable terminal of the first embodiment the present application, and shows the control process for connecting the master device and the slave device.

Step 401: detecting whether the second interface of the slave device is connected to the first interface of the master device, and generating a first detection result.

Step 402: when the first detection result indicates the second interface is connected to the first interface, transmitting a first notification instruction to the master device and the slave device, respectively, the first notification instruction is used to instruct the master device to connect with the slave device.

Wherein the portable terminal is in a connection state when the master device connects with the slave device.

Step 403: controlling the first hardware system and the second hardware system to compose a third hardware system after the master device and the slave device connect with each other according to the first notification instruction, and the first OS and/or the second OS run(s) on the third hardware system, and terminating the current flow.

Figure 5:
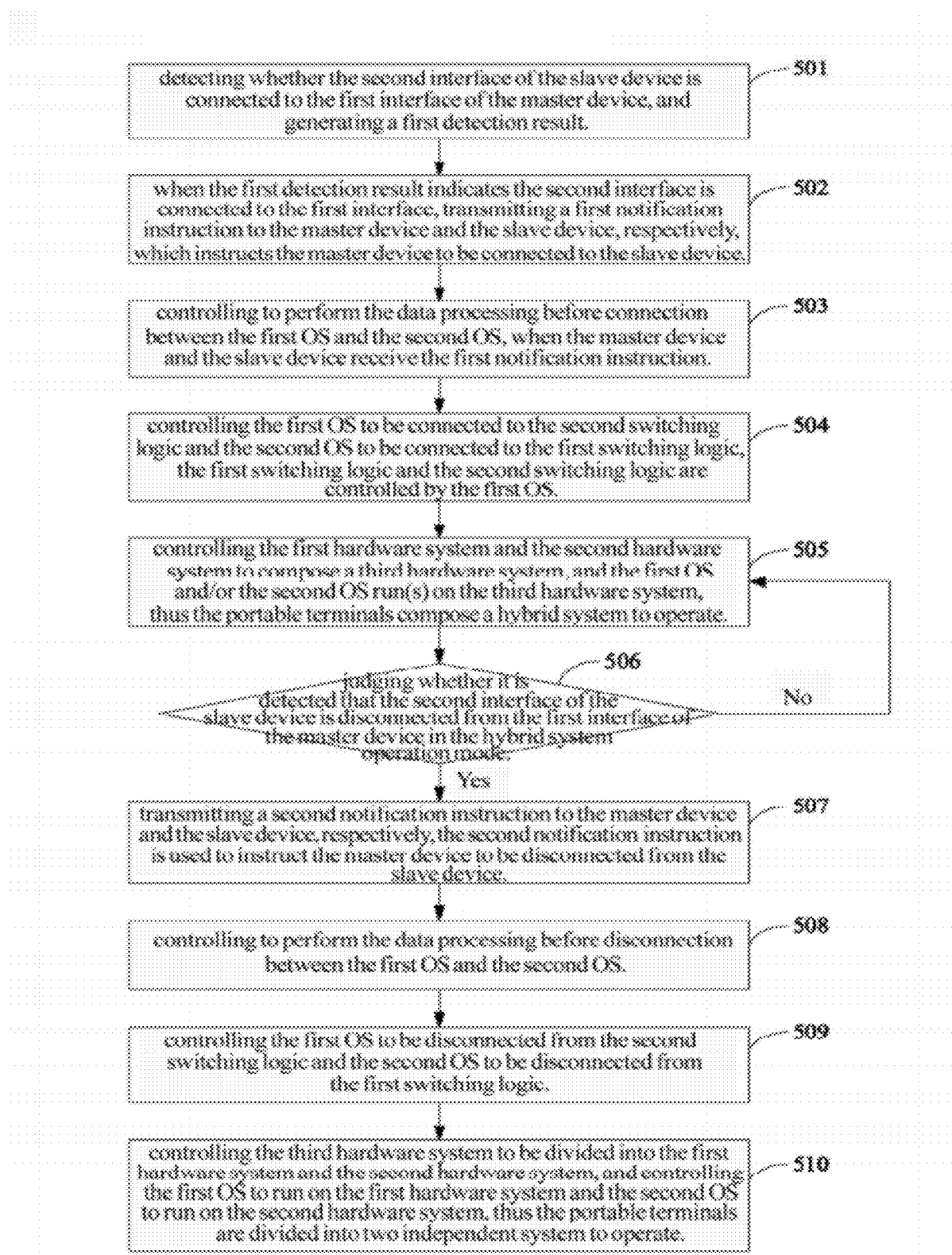
FIG. 5 is a flow chart of a control method for the portable terminal of the second embodiment of the present application.

Referring to FIG. 5, FIG. 5 is a flow chart of a control method of the portable terminal of the second embodiment the present application, and the flow therein shows the control process from connection to disconnection between the master device and the slave device.

Step 501: detecting whether the second interface of the slave device is connected to the first interface of the master device, and generating a first detection result.

Step 502: when the first detection result indicates the second interface is connected to the first interface, transmitting a first notification instruction to the master device and the slave device, respectively, the first notification instruction is used to instruct the master device to connect with the slave device.

Wherein the portable terminal is in a connection state when the master device connects with the slave device; the first hardware system comprises a first peripheral, and the first OS connects to the first peripheral through a first switching logic, while the second hardware system comprises a second peripheral, and the second OS connects to the second peripheral through a second switching logic.

Step 503: controlling to perform the data processing before connection between the first OS and the second OS, when the master device and the slave device receive the first notification instruction.

Step 504: controlling the first OS to connect with the second switching logic and the second OS to connect with the first switching logic, the first switching logic and the second switching logic are controlled by the first OS.

Step 505: controlling the first hardware system and the second hardware system to compose a third hardware system, and the first OS and/or the second OS run(s) on the third hardware system, thus the portable terminals compose a hybrid system to operate.

Step 506: judging whether it is detected that the second interface of the slave device disconnects from the first interface of the master device in the hybrid system operation mode; if so, the process goes to step 507; if not, the process returns to step 505.

Step 507: transmitting a second notification instruction to the master device and the slave device, respectively, the second notification instruction is used to instruct the master device to disconnect from the slave device.

Wherein the portable terminal is in a disconnection state when the master device disconnects from the slave device.

Step 508: controlling to perform the data processing before disconnection between the first OS and the second OS.

Step 509: controlling the first OS to disconnect from the second switching logic and the second OS to disconnect from the first switching logic.

Step 510: controlling the third hardware system to be divided into the first hardware system and the second hardware system, and controlling the first OS to run on the first hardware system and the second OS to run on the second hardware system, thus the portable terminals is divided into two independent systems to operate, and terminating the current flow.

In terms of structure, the portable terminal provided by the embodiment of the present application comprises a first housing, a first hardware system and a first OS, the first hardware system is disposed in the first housing and at least includes a display unit and a first interface, and the first OS runs on the first hardware system.

Referring to FIG. 6, FIG. 6 is a block diagram of an embodiment of the portable terminal of the present application. Wherein the portable terminal comprises a detection unit 610, a notification unit 620 and a control unit 630.

The detection unit 610 is used for detecting whether the first interface is connected to a second interface of a second portable device and generating a first detection result, wherein the second portable device has a second housing, a second hardware system and a second OS, the second hardware system is disposed in the second housing and at least includes a second interface, and the second OS runs on the second hardware system.

The notification unit 620 is used for transmitting a first notification instruction to an embedded controller EC in the first hardware system and the second portable device, respectively, when the first detection result indicates the second interface is connected with the first interface, the first notification instruction is used to instruct the portable device to connect with the second portable device.

The control unit 630 is used for controlling the first hardware system and the second hardware system to compose a third hardware system after the portable device and the second portable device connect with each other according to the first notification instruction, and the first OS and/or the second OS run(s) on the third hardware system.

Further, the control unit 630 is also used for controlling to perform the data processing before connection between the first OS and the second OS, when the master device and the slave device receive the first notification instruction. The data processing before connection comprises: restoring data transmission according to the stored current state data and configuration files, and loading driver.

Further, the detection unit 610 is also used for detecting whether the second interface of the second portable device is disconnected from the first interface of the portable device and generating a second detection result, after the portable device connects to the second portable device; the notification unit 620 is also used for transmitting a second notification instruction to the portable device and the second portable device, respectively, when the second detection result indicates that the second interface is disconnected from the first interface, the second notification instruction is used to instruct the portable device to disconnect from the second portable device; the control unit 630 is also used for controlling the third hardware system to be divided as the first hardware system and the second hardware system, after the portable device and the second portable device disconnect with each other according to the second notification instruction, and controlling the first OS to run on the first hardware system.

Further, the control unit 630 is used for controlling to perform the data processing before disconnection between the first OS and the second OS after the portable device and the second portable device receive the second notification instruction. The data processing before disconnection comprises: stopping the data transmission between the first OS and the second OS, interacting the configuration files and uninstalling the driver, and storing current state data.

The portable device in the embodiment of the present application may be embodied as a notebook computer with a single OS, which is generally an X86 operating system with relatively strong computing capability and high power consumption, and this OS runs on the hardware system of the notebook computer. The second portable device may be embodied as a mobile phone with a single OS, which is generally an ARM operating system with relatively weak computing capability and low power consumption, and this OS runs on the hardware system of the mobile phone. A first interface is disposed on the notebook computer and a second interface is disposed on the mobile phone, and the mobile phone may connect to/disconnect from the first interface of the notebook computer via its second interface, in order to realize the connection/disconnection between the mobile phone and the notebook computer physically. After the mobile phone and the notebook computer connect with each other, their own OSs compose a complete hybrid architecture system and operate. The control process for composing the complete hybrid architecture system to operate is same as that for the above portable device, which is omitted herein.

For example, there are two ways for connecting the notebook computer and the mobile phone: one of which is by setting special interfaces on the notebook computer and the mobile phone, respectively, and these two special interfaces connect to each other via a data line so as to compose a hybrid system architecture; and the other of which is by setting a male plug with insertion pins on the notebook computer while correspondingly setting a female plug with insertion hole on the mobile phone, and composing the hybrid system architecture by inserting the female plug on the mobile phone into the male plug on the notebook computer.

Referring to FIG. 7, FIG. 7 is a flow chart of a control method of the portable device of the first embodiment of the present application, and the flow shows the process that the first portable device controls the second portable device connected thereon to compose a hybrid system.

Step 701: the first portable device detects whether the first interface thereof is connected to the second interface of the second portable device, and generates a first detection result.

Wherein the second portable device includes a second housing, a second hardware system and a second OS; the second hardware system is disposed in the second housing and at least includes a second interface, and the second OS runs on the second hardware system.

Step 702: when the first detection result indicates the second interface is connected to the first interface, transmitting a first notification instruction to an embedded controller EC in the first hardware system and the second portable device, respectively, the first notification instruction is used to instruct the first portable device to connect with the second portable device.

Step 703: the first portable device controls the first hardware system and the second hardware system to compose a third hardware system after the first portable device and the second portable device connect with each other according to the first notification instruction, and the first OS and/or the second OS run(s) on the third hardware system, and the current flow is terminated.

Figure 8:
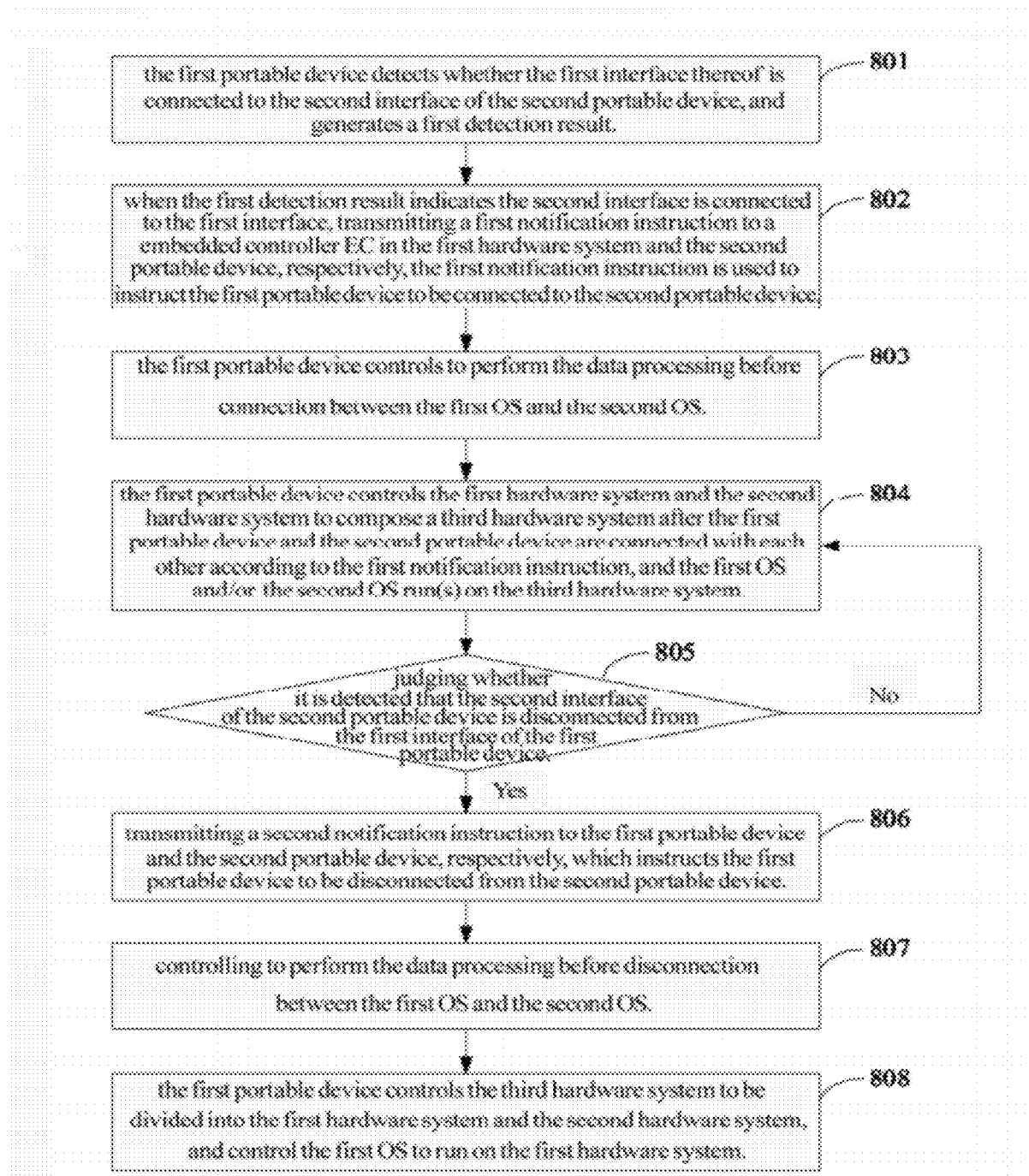
FIG. 8 is a flow chart of a control method for the portable device of the second embodiment of the present application.

Referring to FIG. 8, FIG. 8 is a flow chart of a control method of the portable device of the second embodiment of the present application, and the flow therein shows the control process from the connection to the disconnection between the first portable device and the second portable device.

Step 801: the first portable device detects whether the first interface thereof is connected to the second interface of the second portable device, and generates a first detection result.

Wherein the second portable device includes a second housing, a second hardware system and a second OS; the second hardware system is disposed in the second housing and at least includes a second interface, and the second OS runs on the second hardware system Step 802: when the first detection result indicates the second interface is connected to the first interface, transmitting a first notification instruction to an embedded controller EC in the first hardware system and the second portable device, respectively, the first notification instruction is used to instruct the first portable device to connect with the second portable device.

Step 803: the first portable device controls to perform the data processing before connection between the first OS and the second OS.

The data processing before connection comprises: restoring data transmission according to the stored data of the current state and configuration files, and loading driver Step 804: the first portable device controls the first hardware system and the second hardware system to compose a third hardware system after the first portable device and the second portable device connect with each other according to the first notification instruction, and the first OS and/or the second OS run(s) on the third hardware system.

Step 805: judging whether it is detected that the second interface of the second portable device disconnects from the first interface of the first portable device; if so, the process goes to step 806; if not, the process returns to step 804.

Step 806: transmitting a second notification instruction to the first portable device and the second portable device, respectively, the second notification instruction is used to instruct the first portable device to disconnect from the second portable device.

Step 807: controlling to perform the data processing before disconnection between the first OS and the second OS.

The data processing before disconnection comprises: stopping the data transmission between the first OS and the second OS, interacting the configuration files and uninstalling the driver, and storing current state data.

Step 808: the first portable device controls the third hardware system to be divided into the first hardware system and the second hardware system, and control the first OS to run on the first hardware system, and the current flow is terminated.

According to the description on the above implementations, it can be known that: the portable terminal composed of the master device and the slave device in the embodiment of the present application may control the master device and the slave device to compose a hybrid architecture system to operate, and also may control the master device and the slave device to separate and operate independently, by detecting the connection state of the interfaces; and for a portable terminal with an independent system, two such portable terminals may compose a hybrid architecture system and operate by detecting the connection state between the interface thereof and interfaces of other portable terminals with an independent system. The embodiment of the present application may apply control to terminals with different OSs, select freely to compose the terminals as a hybrid architecture system to operate or separate the terminals as independent systems to operate, which increases the application flexibility of the terminals.

Of course, those skilled in the art can understand that, the master device or the slave device of the portable terminal each has an independent OS, and the portable terminal also has an independent OS in the above embodiments. In the practice, however, one of the master device and the slave device connected with each other in the portable terminal may only has a hardware system made up of extended components without an OS, and one of the two portable terminals connected with each other may also only has a hardware system made up of extended components without an OS. In this case, the device without OS will use the OS in the other device with OS to operate during connection, so that a portable terminal or a portable device with a signal system and a uniform architecture may be formed.

For example, there is a docking device currently, and the mobile phone may connect to the docking to realize the cooperation. At this time, the docking device may be regard as the master device of the portable terminal and the mobile phone may be regard as the slave device of the portable terminal in the above embodiments, or inversely, the docking device may be regard as the slave device of the portable terminal and the mobile phone may be regard as the master device of the portable terminal in the above embodiments. Alternatively, the docking device may also be regard as the first portable terminal and the mobile phone may be regard as the second portable terminal in the above embodiments, or inversely, the docking device may also be regard as the second portable terminal and the mobile phone may be regard as the first portable terminal in the above embodiments.

Figure 9A:
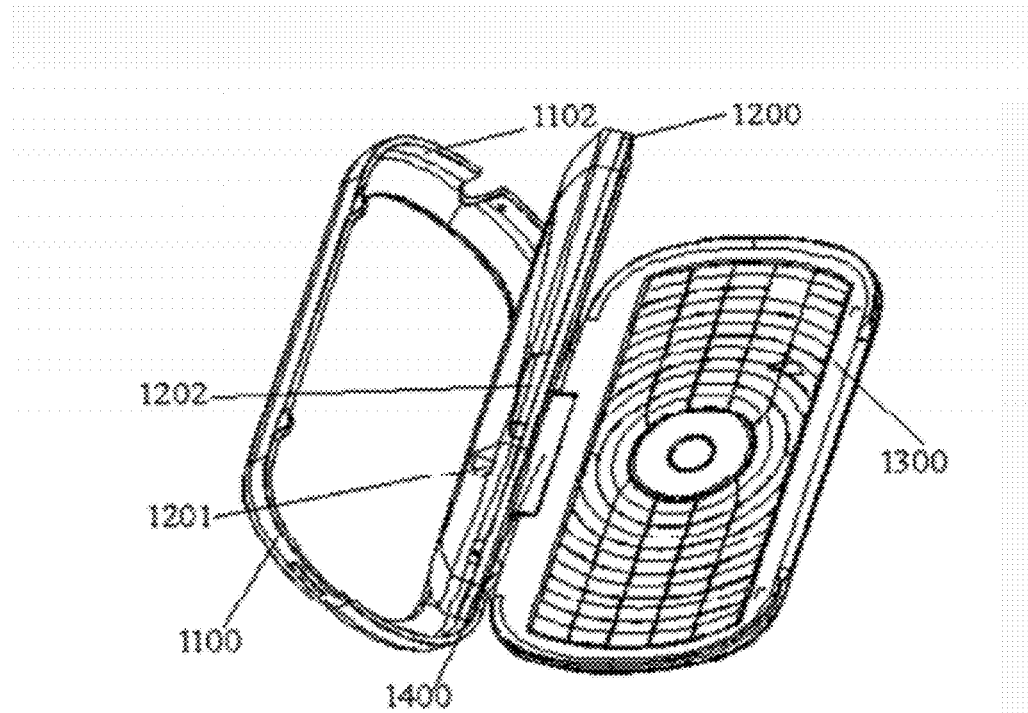
FIG. 9A is a view showing a first stereostructure of the connection between a mobile phone and a docking in prior art.
Figure 9B:
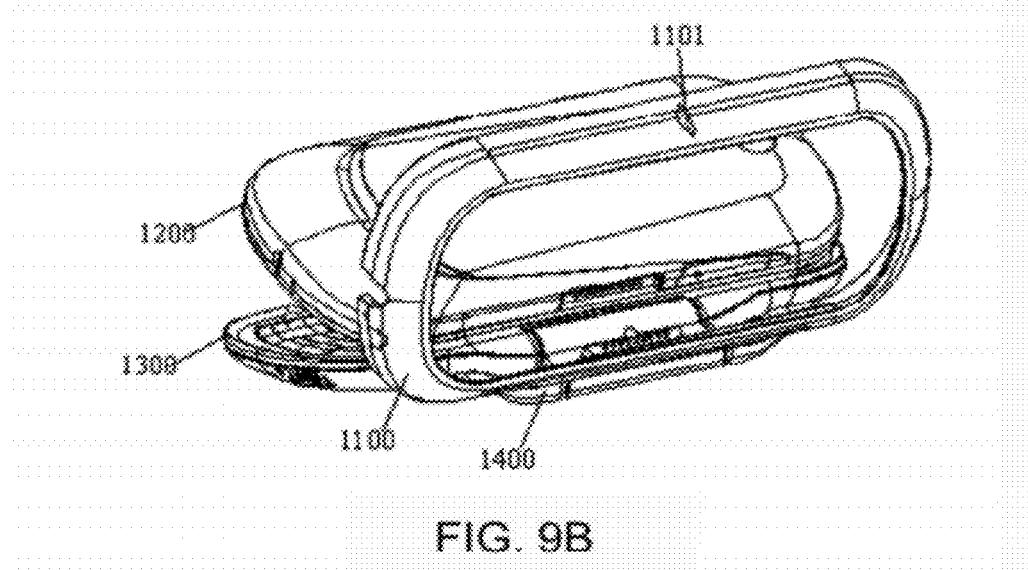
FIG. 9B is a view showing a second stereostructure of the connection between a mobile phone and a docking in the prior art.

FIG. 9 is a structure view of a docking device. FIG. 9A is a view showing the first stereo structure of the connection between a mobile phone and a docking; and FIG. 9B is a view showing the second stereo structure of the connection between a mobile phone and a docking. FIG. 9A and FIG. 9B show a same structure from different points of view. Referring to FIG. 9A and FIG. 9B, which simply show the basic components structure of the docking. The appearance of the docking is similar to that of a notebook computer, the docking comprises: a backboard 1100, a mobile phone 1200 and a base 1300. The mobile phone 1200 integrates a screen and basic hardware therein, and the base 1300 integrates a keyboard and other extended means therein. The backboard 1100 connects to the base 1300 via a spindle 1400, and the backboard 1100 may rotate around the spindle 1400 so as to open or close.

A protrusion 1101 is disposed at the side of the backboard 1100, while a first groove 1201 is disposed at one side of the mobile phone. A wall 1102 locates both sides of the mobile phone 1200 when the mobile phone 1200 is fixed at the inner side of the backboard 1100. The protrusion 1101 on the backboard 1100 snap-fits the first groove 1201 on the mobile phone, so that the mobile phone 1200 is fixed in the backboard 1100; a second groove 1202 is disposed on the mobile phone 1200, and the user may press the second groove 1202 to move the mobile phone 1200 down along the backboard 1100, so that a hook on the top of the backboard 1100 is off at first and then the mobile phone 1200 may be demounted.

When the docking is used in a desktop state, the mobile phone 1200 may be mounted in the backboard 1100 and the docking may provide entire functions to the user just like a notebook computer at this time; when the mobile phone 1200 needs to be used separately, the mobile phone 1200 may be taken out from the backboard 1100, and the docking only has the base 1300 and the backboard 1100 at this time.

The following problem exists when putting the mobile phone in the docking to realize cooperation:

After connecting the terminal with the docking, the sensors in the mobile phone still work normally, for example, a gravity sensor still works normally, which renders the screen switches its display mode between a landscape screen and a portrait screen with the rotation of the location of the mobile phone. Because the mobile phone will operate as a notebook computer after being inserted in the docking, switching the display mode of the mobile phone to the portrait screen is very inconvenient and may lead to a very low operation efficiency.

Although the above problem is explained by taking a mobile phone and a docking device as an example, those skilled in the art can understand that, the same problem will occur when the master device and slave device of the portable terminal connect with each other and when the first portable terminal connects to the second portable terminal in the above-mentioned embodiments.

Therefore, the embodiment of the present invention further provides a portable terminal and a state switching method thereof, which can avoid interferences from the sensors in the portable terminal when the master device and the slave device of the portable terminal connect with each other, and can increase the operation efficiency.

Furthermore, the embodiment of the present invention further provides a portable device and a state switching method thereof, which can avoid interferences from the sensors in the portable device when the portable device connects to a second portable device, and can increase the operation efficiency.

The embodiment of the present invention provides a state switching method of a portable terminal, which is applied to a portable terminal comprising a master device and a slave device, wherein the master device has a first state and a second state, all of modules in the master device are in an operation state when the master device is in the first state, and at least one module of all of the modules in the master device is in a non-operation state when the master device is in the second state; the method comprises: obtaining a detection result indicating that the master device is connected to the slave device; and controlling the master device to switch to the second state from the first state, according to the detection result.

Wherein when the master device is in the second state, the at least one module in the master device which is in the non-operation state is one of or the combination of: a gravity sensor, a virtual keyboard control module and an audio device module.

Wherein when the master device is in the second state, the module in the master device which is in the non-operation state further comprises a power supply module, and the master device gets the power from the slave device.

Wherein when the master device is in the second state, the module in the master device which is in the operation state comprises a power supply module, and the master device supplies power to the slave device.

Wherein the ways for controlling the master device to switch to the second state from the first state comprise: turning off the power supplies of the modules which are in the non-operation state, or disabling the functions of the modules which are in the non-operation state, or masking the instructions issued from the modules which are in the non-operation state.

Wherein the method further comprises: all of the modules in the master device are in the operation state when the master device switches to the first state from the second state.

The embodiments of the present invention further provides a terminal having a master device and a slave device, the master device has a first state and a second state, all of modules in the master device are in an operation state when the master device is in the first state, and at least one module of all of the modules in the master device is in a non-operation state when the master device is in the second state; the master device comprises: a management module for controlling all of modules in the master device to be in the operation state or controlling at least one module of the all of the modules in the master device to be in the non-operation state; a detection module for notifying a switching module of a detection result indicating that the master device is connected to the slave device after obtaining the detection result; and the switching module for controlling the master device to switch to the second state from the first state.

Wherein when the master device is in the second state, the at least one module in the master device which is in the non-operation state is one of or the combination of: a gravity sensor, a virtual keyboard control module and an audio device module.

Wherein when the master device is in the second state, the module in the master device which is in the non-operation state further comprises a power supply module. Wherein the switching module comprises a power supply control module for turning off the power supplies of the modules which are in the non-operation state, or the switching module comprises a function control module for disabling the functions of the modules which are in the non-operation state, or the switching module comprises a mask control module for masking the instructions issued from the modules which are in the non-operation state.

Of course, those skilled in the art can understand that, it can be the slave device of the portable terminal which has the first state and the second state and performs state switching in the above embodiment. Alternatively, it can be one of the first portable terminal and the second portable terminal which has the first state and the second state and performs state switching. The above embodiment may be applied equivalently to both of the cases that the slave device of the portable terminal which has the first state and the second state and performs state switching, and the case that one of the first portable terminal and the second portable terminal which has the first state and the second state and performs state switching.

By applying the portable terminal and the state switching method thereof provided by the embodiments of the present invention, interferences from the sensors or software modules in the portable terminal may be avoided and the operation efficiency is increased, by means of switching the master device of the portable terminal to the second state when the master device and the slave device of the portable terminal connect with each other.

The solutions of the embodiments of the present invention will be described clearly and fully below, in connection with the figures in the embodiments of the present invention. Obviously, the described embodiments are only part of the embodiments of the present invention but not all embodiments. Based on the embodiments of the present invention, other embodiments which can be obtained by those ordinary skilled in the art without any inventive labors fall into the scope sought for protection of the present invention.

In the description of the following embodiments, taking a combination of a mobile terminal and a docking as an example, and as described above, the docking may be regard as the master device of the mobile terminal and the mobile phone may be regard as the slave device of the mobile terminal, or inversely, the docking may be regard as the slave device of the mobile terminal and the mobile phone may be regard as the master device of the mobile terminal. Alternatively, the docking device may be regard as the first mobile terminal and the mobile phone may be regard as the second mobile terminal, or inversely, the docking device may also be regard as the second mobile terminal and the mobile phone may be regard as the first mobile terminal.

Figure 10:
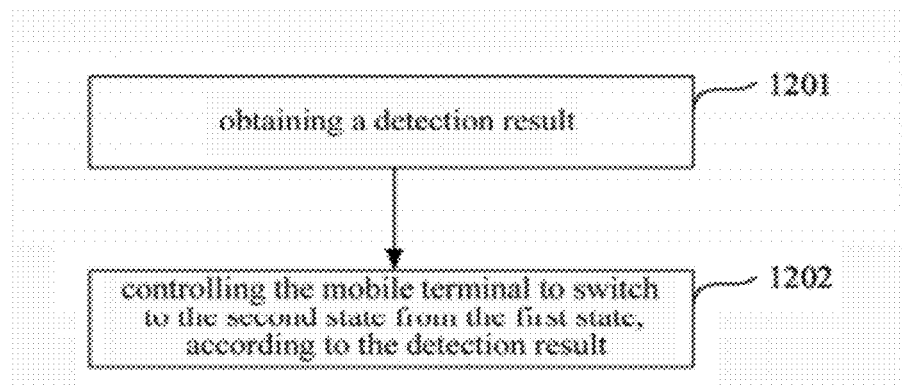
FIG. 10 is a flow chart of a state switching method of a mobile terminal according to an embodiment of the present invention.

Referring to FIG. 10, FIG. 10 is a flow chart of a state switching method of a mobile terminal according to an embodiment of the present invention. In this embodiment, the mobile terminal has a first state and a second state. All of modules in the mobile terminal are in an operation state when the mobile terminal is in the first state, and at least one module of all of the modules in the mobile terminal is in a non-operation state when the master device is in the second state; the state switching method comprises the steps as follows.

Step 201: obtaining a detection result indicating that the mobile terminal is connected to a docking.

Particularly, one of the possible detection ways is by setting pins at the spindle of the docking, and the pins insert into a specified interface of the mobile terminal side when the mobile terminal is put to the inner side of the backboard of the docking. When the mobile terminal inserts into the docking, the pins set on the docking contact the specified interface of the mobile terminal so as to generate a first trigger signal (that is, the detection result). The mobile terminal side receives the first trigger signal for informing the mobile terminal of the connection to the docking. When the mobile terminal disconnects from the docking, the pins set on the docking separate from the specified interface of the mobile terminal so as to generate a second trigger signal. The mobile terminal side receives the second trigger signal for informing the mobile terminal of the disconnection from the docking.

The above detection way is only one possible embodiment and the detection way is not limited thereto. Any detection way is possible as long as it can detect the connection between the mobile terminal and the docking.

Step 202: controlling the master device to switch to the second state from the first state, according to the detection result.

Please note, when the mobile terminal is in the second state, the number of the modules in the mobile terminal which is in the non-operation state may be one or more than one, and such module may be a hardware module or a software module. For example, such module may be one of or any combination of: a gravity sensor, a virtual keyboard control module and an audio device module.

The reason for making the gravity sensor being in the non-operation state is to prevent the mobile terminal which has connected with the docking from switching its screen mode because of the effect of the gravity sensor, such as switching to the portrait screen from the landscape screen, after the mobile terminal inserts into the docking, so that the problem of low operation efficiency caused by operating in the portrait screen in the case of inserting into the docking may be avoid.

The reason for making the virtual keyboard control module being in the non-operation state is to prevent the virtual keyboard from maintaining active, after the mobile terminal inserts into the docking, so that the problem of low operation efficiency caused by failing to utilize the resources on the docking (such as the keyboard provided on the docking) better in the case of inserting into the docking may be avoid.

The reason for making the audio device module being in the non-operation state is to prevent the audio device from maintaining active, after the mobile terminal inserts into the docking, because in general the docking also provides another audio device, which will results in a problem that the sounds are asynchronous in the case of inserting into the docking (the audio devices both in the mobile terminal and the docking make sounds).

Please note, when the mobile terminal is in the second state, the module which is in the non-operation state may further comprise a power supply module, and the mobile terminal gets power from the connected docking at this time. Further, another possible case is that the power supply module in the mobile terminal is in the operation state, that is, a power-on state, when the mobile terminal is in the second state, and the docking gets power from the mobile terminal at this time. Further, another possible case is that the power supply module in the mobile terminal is in the operation state, that is, a power-on state, when the mobile terminal is in the second state, while the power supply in the docking is also in the power-on state at this time, that is, the mobile terminal and the docking is powered respectively.

The listed modules which are in the non-operation state when the mobile terminal is in the second state are only embodiments, and different modules (including software module and hardware module) may be in the non-operation state depending on the requirement in practice.

Please note, there may be many possible methods for switching the terminal to the second state from the first state, and some examples are as follows.

Method 1: a management module in the mobile terminal turns off the power of the modules in the non-operation state by controlling a power supply management module, in order to realize the object of being in the non-operation state. For example, turning off the power supply of the gravity sensor in order to make it in the non-operation state.

Method 2: the management module in the mobile terminal disables the functions of the modules in the non-operation state by controlling a function management module, in order to realize the object of being in the non-operation state. For example, disconnecting the signal line of the gravity sensor in order to stop its sensing function, so that making it in the non-operation state.

Method 3: the management module in the mobile terminal masks the instructions issued from the modules in the non-operation state, in order to realize the object of being in the non-operation state. For example, any signals issued from the gravity sensor are masked although it operates normally, in order to make it in the non-operation state.

Those skilled in the art can understand that the above methods for switching the mobile terminal to the second state from the first state are only some possible embodiments, and any other possible implementations are available. The present application does not intend to be limited to any special switching method.

Please note, the method shown in FIG. 10 may further comprise: when the mobile terminal switches to the first state from the second state, all of the modules in the mobile terminal are in the operation state. That is to say, when the mobile terminal switches to the first state from the second state, the modules in the mobile terminal which are in the non-operation state need to be switched to the operation state, that is, making all modules in the non-operation state (including hardware modules and software modules) in the operation state, so that the mobile terminal may operate normally.

It can be seen that, by applying the state switching method of the portable terminal provided by embodiments of the present invention, interferences from the sensors or software modules in the portable terminal may be avoided and the operation efficiency is increased, by means of switching the master device of the portable terminal to the second state when the master device and the slave device of the portable terminal connect with each other.

Figure 11:
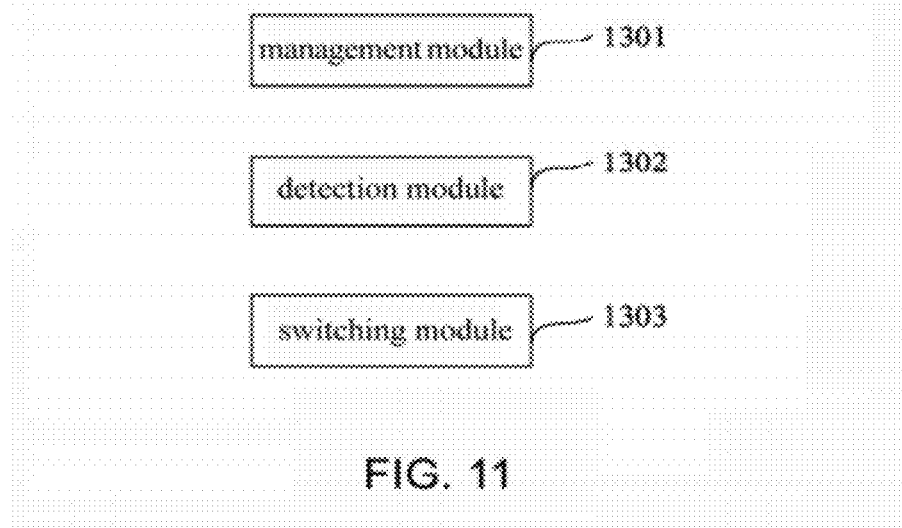
FIG. 11 is a schematic view of the structure of a mobile terminal according to an embodiment of the present invention.

The embodiment of the present invention further provides a mobile terminal. Referring to FIG. 11, in the embodiment of the present invention, the mobile terminal has a first state and a second state, all of modules in the mobile terminal are in an operation state when the mobile terminal is in the first state, and at least one module of all of the modules in the mobile terminal is in a non-operation state when the mobile terminal is in the second state; the mobile terminal particularly comprises:

a management module 1301 for controlling all of modules in the mobile terminal to be in the operation state or controlling the at least one module of all of the modules in the mobile terminal to be in the non-operation state;

a detection module 1302 for notifying a switching module of a detection result indicating that the mobile terminal is connected to a docking after obtaining the detection result; and the switching module 1303 for controlling the mobile terminal to switch to the second state from the first state.

When the mobile terminal is in the second state, the at least one module in the mobile terminal which is in non-operation state is one of or the combination of: a gravity sensor, a virtual keyboard control module and an audio device module.

When the mobile terminal is in the second state, the module in the mobile terminal which is in non-operation state further comprises a power supply module.

Wherein the switching module 1303 may particularly comprise a power supply control module for turning off the power supplies of the modules which are in the non-operation state, or the switching module 1303 may particularly comprise a function control module for disabling the functions of the modules which are in the non-operation state, or the switching module 1303 may particularly comprise a mask control module for masking the instructions issued from the modules which are in the non-operation state.

By applying the mobile terminal provided by embodiments of the present invention, interferences from the sensors or software modules in the portable terminal may be avoided and the operation efficiency is increased, by means of switching the master device of the portable terminal to the second state when the master device and the slave device of the portable terminal connect with each other.

The embodiments of the mobile terminal are substantively similar to that of the method embodiments, therefore they are described simply and for the related parts please refer to the description about the method embodiments.

The docking in any one of the above embodiments may further comprise a set of hardware system and a OS adapted to the hardware system, and such docking may independently act as a home server for accomplishing tasks such as download, data store, etc. When the mobile terminal connects with the docking, the display unit in the mobile terminal acts as the display device of the hardware system, and the remaining hardware in the mobile terminal are in the non-operation state. At this time, the demands from the user are responded to by the OS and the hardware system in the docking. Further, the mobile terminal with a display unit may also be a tablet computer having a second hardware system and a second OS. The host, that is the tablet computer, may be used individually to complete the user's demands independently. When the mobile terminal (that is, the tablet computer) connects to the docking having the hardware system and the OS, they may compose a system with hybrid architecture. The system with hybrid architecture may select one of the host and the docking or let they two cooperate to satisfy the user's demands, according to the user's demands and the processing capability between the host and the docking.

In the above embodiment, during the process for connecting the master device and the slave device of the portable terminal with each other or connecting the first portable device and the second portable device with each other to form a single device, it is desired a stable and firm physical connection and electrical connection between the master device and the slave device of the portable terminal or between the first portable device and the second portable device. Therefore, the embodiments in the present invention also relate to a connection structure between the master device and the slave device of the portable terminal or between the first portable device and the second portable device.

For example, recently, the profile of an electrical digital product tends to be lighter and thinner for the sake of portability of the electrical digital product. However, while the mobile portable device is expected to be light and fashionable, the development of the product functions is limited to some extent because of the decreased size of the product. In view of this, currently, in the electric device field, a product having a docking has been developed which may extend the functions of the electric device product through configurations in the docking.

When the electric device product comprises both functions in the host and the docking, the screen in the host generally has a touch operation function, and the basic functions of the electric device product can be performed by using the host alone; while the host and the docking are combined to be used together, the configurations in the docking may greatly extend the available functions in the electric device product, such as more broader volume scope, a big keyboard and large storage capability, etc., which further enhances the functions of the electric device product.

Based on the structure characteristics of such electric digital product, since the more powerful functions of the digital product may be realized by the docking, the host of the digital product having a docking is lighter than the host of other digital products with similar functions, so that the user may carry only the host with him/her when going out. Therefore, it is convenient to be carried when going out and the effect of having powerful extended functions can be achieved.

Generally, in a mobile portable electric device product with the above structure, the host and the docking are electrically connected with each other via a connector. When a male terminal and a female terminal of the connector are jointed, the male terminal and the female terminal should be aligned to realize connection. However, since the tolerable deviation in connection is very small, usually about ±0.3, such strict alignment requirement results in that the host and the docking must be accurately aligned carefully when the host is inserted into the docking, thus it is very inconvenient for mounting and using the electric device product. Further, such alignment often causes some pins being connected while others not, such that a problem of failed electrical connection occurs between the host and the docking.

Therefore, there is a need to improve the mobile electric device product so that the accurate alignment may be realized conveniently when the host of the electric device is inserted in the docking.

Also, although the above description sets forth the connection problem taking the host and docking as a example, as described above, those skilled in the art can understand that the similar problem will occur when the master device and the slave device of the portable terminal are connected and when the first portable device and the second portable device are connected.

Therefore, one object of the embodiment of the present invention is to provide a portable terminal and a master device, a slave device thereof, wherein the portable terminal has a connector configured for the master device and the slave device, wherein a connection way between a first connection joint and a second connection joint is plane-to-plane contact alignment connection, which enables the respective joint points in both of the connection joints to be contact connected simultaneously and obtain a object of accurate alignment.

Also, one object of the embodiment of the present invention is to provide a connector configured for a first portable device and a second portable device, wherein a connection way between a first connection joint and a second connection joint is plane-to-plane contact alignment connection, which enables the respective joint points in both of the connection joints to be in a contact connection simultaneously and obtain a object of accurate alignment.

According to the embodiments of the present invention, a portable terminal is provided, and the portable terminal comprises: a master device, including a display unit, a first housing and a first connection part, the first connection part is disposed on the first housing, and the first connection part has a first surface on which a first connection joint is disposed, the first connection joint includes at least one first connection terminal; a slave device, including a keyboard, a second housing and a second connection part, the second connection part is disposed on the second housing, and the second connection part has a second surface on which a second connection joint is disposed, the second connection joint includes at least one second connection terminal, wherein the master device connects slidabely with the slave device through the first connection part and the second connection part, the first surface fits onto the second surface, and one of the at lease one first connection terminal connects to the one of the at least one second connection terminal correspondingly.

A mating slot for fixing the master device is formed on the slave device, and the mating slot is formed as the second connection part, the second surface is located inside the mating slot; a insertion part for mating the mating slot is formed on the master device, and the insertion part is formed as the first connection part, one side of the insertion part forms the first surface; the master device connects to the slave device, the insertion part inserts into the mating slot, and the first surface fits onto the second surface.

The second connection part is connected to the housing of the docking through a spindle.

The second connection part comprises a containing space with an opening, the shape of the containing space corresponds to the shape of the first housing of the master device; and when the master device connects to the slave device, the master device is inserted slidabely into the containing space, and the display screen of the display unit exposes via the opening.

The second surface is a bottom surface of the containing space, the first surface is a lower side surface of the first housing of the master device; and in a first inner side surface and the second inner side surface, guide rail tracks are formed, respectively, along the length direction of the first inner surface and the second inner surface. The first inner surface is opposite to the second inner surface, the master device is disposed in the connection pedestal, and the left side surface and right side surface of the master device are matingly connected with the guide rail tracks of the first inner surface and the second inner surface.

The second connection part further comprises a locking mechanism disposed in the inner side of the top surface of the containing space, wherein the top surface is opposite to the bottom surface.

The locking mechanism comprises a spring and a connection linkage, wherein one end of the spring is fixed on one side of the containing space, the other end of the spring connects to the connection linkage, and the connection linkage is arranged to be in parallel to the top surface.

A hook is formed at left end and right end of the connection linkage, respectively, and a trigger part which is protrusive is formed at the middle of the connection linkage, the trigger part is inserted into an opening formed on the top surface; the back surface of the first housing of the master device fits and contacts to a rear bottom surface of the containing space and the hook hooks up the first housing of the master device, when the trigger part is at a first position in the opening; the hook hooks away from the first housing of the master device, and the back surface of the first housing of the master device departs from the rear bottom surface of the containing space, when the trigger part is at a second position in the opening.

The connection joint further comprises a first magnetic absorbing element, the connection joint further comprises a second magnetic absorbing element, the master device connects to the slave device, and the first magnetic absorbing element is attracted to the second magnetic absorbing element.

The embodiment of the present invention provides a portable terminal comprising a master device and a slave device, the master device comprises: a first housing; a display unit disposed in the first housing, a display screen of the display unit is exposed from the first housing of the master device; a first connection part disposed on the first housing of the master device, and the first connection part has a first surface on which a first connection joint which electrically connects to a second connection joint of the slave device is disposed, the first connection joint includes at least one first connection terminal; wherein when the master device connects with the slave device, the first connection part connects to the second connection part of the slave device, the first surface fits onto a second surface of the slave device on which a second connection joint is formed, and one of the at lease one first connection terminal connects to the one of the at least one second connection terminal of the second connection joint one-to-one correspondingly.

The embodiment of the present invention provides a portable terminal comprising a master device and a slave device, and the slave device comprises at least: a keyboard; a second housing; a second connection part disposed on the second housing of the slave device, and the second connection part has a second surface on which a second connection joint which electrically connects to a first connection joint of the master device is disposed, the second connection joint includes at least one second connection terminal; wherein when the master device connects with the slave device, the second connection part connects to the first connection part of the master device, the second surface fits onto a first surface of the master device on which the first connection joint is formed, and one of the at lease one second connection terminal connects to the one of the at least one first connection terminal of the first connection joint one-to-one correspondingly.

The above embodiments of the present invention possess the following advantageous effects:

1. the master device connects to the slave device via a connector, and a connection way between a first connection joint and a second connection joint of the connector is plane-to-plane contact alignment connection, which enables the respective connection terminals in both of the connection joints on the connector to be in a contact connection simultaneously and obtain a object of accurate alignment;

2. the connector is configured as a magnetic connector and the host is supported and fixed by setting the second connection part, which enables the connecting operation between the master device and the slave device to be more convenient, strengthens the connection stability between the master device and the slave device and settles a problem occurred in the prior art of hooking away too easily of the connection joint of the magnetic connecter;

3. a guide rail track is disposed on the connection pedestal, which further enhances the alignment precision when connecting the master device to the slave device;

4. Usage of the locking mechanism makes it more convenient to remove the master device from the slave device.

Of course, those skilled in the art can understand that the relationship between the master device and the slave device may interchange in the description about the above embodiments. For example, the slave device may comprises a display unit, a first housing and a first connection part, while the master device may comprises a keyboard, a second housing and a second connection part. Further, the above embodiment may be applied to the connection between the first portable device and the second portable device in the embodiment of the present invention. For example, the first portable device may comprises a display unit, a first housing and a first connection part, while the second portable device may comprises a keyboard, a second housing and a second connection part. Of course, those skilled in the art can understand that the second portable device may comprises a display unit, a first housing and a first connection part, while the first portable device may comprises a keyboard, a second housing and a second connection part.

Furthermore, those skilled in the art can understand that, the first connection part and the second connection part in the above embodiment are used to the connection between the master device and the slave device of the portable terminal or the connection between the first portable device and the second portable device, therefore they are equivalent to the connection support apparatus and the connection adaptation apparatus in the previous embodiment, or are also equivalent to the master device and the slave device of the portable terminal, or the first interface and the second interface of the first portable device and the second portable device. Further, those skilled in the art can understand that the embodiment is not limited to the first connection part being equivalent to the connection support apparatus or the first interface while the second connection part being equivalent to the connection adaptation apparatus or the second interface, it is also possible that the second connection part is equivalent to the connection support apparatus and the first interface while the first connection part is equivalent to the connection adaptation apparatus or the second interface.

To make the objects, solutions and advantages of the embodiments of the present invention become clearer, the embodiments of the present invention will be described below in connection with the figures and detailed embodiments.

In the description of the embodiments of the present invention, taking a mobile portable device comprising a host and a docking and the connection between the host and docking as an example. As described above, herein the host may be regard as the master device of the mobile terminal and the docking may be regard as the slave device of the mobile terminal, or inversely, the host may be regard as the slave device of the mobile terminal and the docking may be regard as the master device of the mobile terminal. Alternatively, the host and the docking can be considered as two individual devices but not two components of the mobile portable device, and the host may be regard as the first mobile terminal and the docking may be regard as the second mobile terminal, or inversely, the host may also be regard as the second mobile terminal and the docking may be regard as the first mobile terminal.

In the embodiment of the present invention, a portable device comprises a host and a docking, and the host electrically connects to the docking via a connector, and a connection way between a first connection joint and a second connection joint of the connecter is plane-to-plane contact alignment connection, which enables the respective connection terminals in both of the connection joints on the connector to be in a contact connection simultaneously and obtain a object of accurate alignment.

The mobile portable device according to the embodiment of the present invention comprises: a host including a display unit, a host housing and a first connection part, the first connection part is disposed in the host housing, and the first connection part has a first surface on which a first connection joint is disposed, the first connection joint includes at least one first connection terminal, and a docking including a keyboard, a docking housing and a second connection part, the second connection part is disposed in the docking housing, and the second connection part has a second surface on which a second connection joint is disposed, the second connection joint includes at least one second connection terminal.

The host and the docking connects slidably with each other through the first connection part and the second connection part, and when the host electrically connects with the docking, the first connection joint connects to the second connection joint. When the first connection joint connects to the second connection joint, the first surface fits onto a second surface, and one of the at lease one first connection terminal connects to the one of the at least one second connection terminal one-to-one correspondingly. Preferably, the at lease one first connection terminal corresponds to the at least one second connection terminal. Thus, when the host connects to the docking, the contact alignment between the first surface and the second surface enables a simultaneous connection between the at least one first connection terminal and one of second connection terminals. Wherein the first connection terminal may be embodied as a pin, and the second connection terminal may be embodied as a sheet metal. When the host connects to the docking, the pin and the sheet metal connect with each other one-to-one correspondingly and the connection way between the pin and the sheet metal is a point-to-plane contact way, thus the electrically connection between the host and docking is realized by using the point-to-plane contact way between the first connection terminal and the second connection terminal. Of course, it can understand that data or signals may be transferred through the first connection terminals and the second connection terminals, if the number of the first connection terminal is more than one and the number of the corresponding second connection terminal is also more than one.

In the embodiment of the present invention, the mating ways between the first connection part and the second connection part may be embodied as a structure wherein a protruded part is mating to a mating slot. By such structure, during the connection process between the host and docking, an alignment correction is performed when the host connects to the docking through a slidable insertion process from the protruded part to the mating slot. In particular, the first connection part and the second connection part could be implemented in the following way: an mating slot for fixing the host is formed on the docking, and the mating slot is formed as the second connection part, the second surface is located inside the mating slot; an insertion part for mating to the mating slot is formed on the host, and the insertion part is formed as the first connection part, one side on the insertion part forms the first surface; the host connects to the docking, the insertion part inserts into the mating slot, and the first surface fits onto the second surface.

Alternatively, the above adapting structure could be formed in the following way: a mating slot is formed on the first connection part of the host, and an insertion part is formed on the second connection part of the docking.

Furthermore, when the host connects with the docking, the first connection part and the second connection part also provides a function for supporting and fixing the host, besides the function for accurately electrically connecting the host and the docking.

In the embodiment of the present invention, the host has basic operation functions, the screen in the host has a touch operation function, and the basic functions of the mobile portable device can be performed by using the host alone, such as input of information and playback of music and image; while the docking may further extend the functions for the host, such as more broader volume scope, a big keyboard and large storage capability, etc., and even may provide an independent OS for the host, besides the basic functions of the host.

The detailed structure of the mobile portable device of the embodiment of the present invention will be described below in detail.

Figure 12:
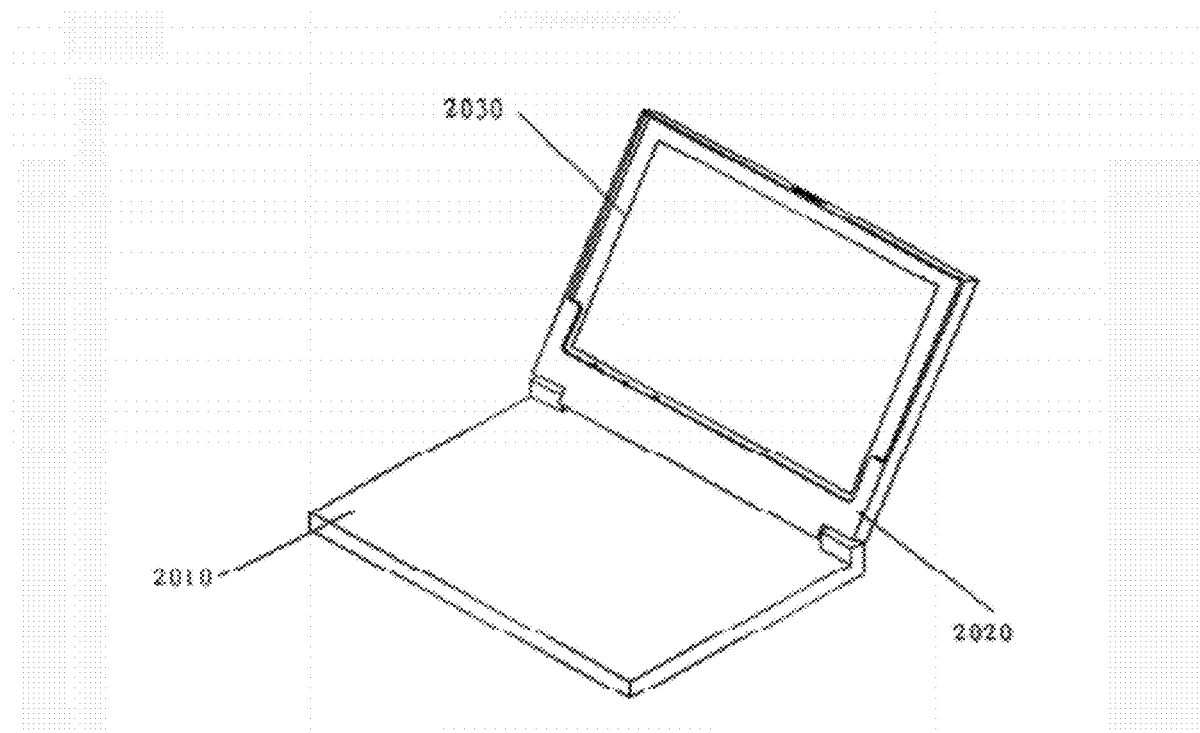
FIG. 12 is a schematic view of a combination structure of a mobile portable device described in the embodiment of the present invention.

FIG. 12 is a schematic view of a combination structure of a mobile portable device described in the embodiment of the present invention. Referring to FIG. 12, the host and the docking of the mobile portable device connect with each other through a magnetic connector, in particular, the mobile portable device comprises:

a docking 2010; a connection pedestal 2010, as shown in FIG. 12, the connection pedestal 2020, which is formed as the second connection part, connects to the docking 2010, and the connection way between the connection pedestal 2010 and the docking 2010 is same as that between a host and a display in a notebook computer which generally opens in a flip-style, that is, connects with each other via a spindle, which enables the connection pedestal 2020 to flip around the spindle with respect to the docking 2010; further, a first connection joint of the magnetic connecter is disposed on the connection pedestal 2020, and the first connection joint includes a first connection terminal and a first magnetic absorbing element, the first connection terminal may be embodied as a pin and the number thereof may be more than one, and the first connection terminal electrically connects to the docking 2010;

a host 2030, a second connection joint of the magnetic connecter is disposed thereon, the second connection joint includes a second connection terminal and a second magnetic absorbing element. The second connection terminal may be embodied as sheet metal and the number thereof may be more than one; when the host 2030 is inserted into the connection pedestal 2020, the host 2030 is supported by the connection pedestal 2020, and the host 2030 electrically connects to the docking 2010 through the electrical connection between the first connection joint of the host 2030 and the second connection joint disposed on the connection pedestal 2020. Wherein, regarding the electrical connection between the first connection joint and the second connection joint, the pin of the first connection joint and the sheep metal of the second connection joint are connected correspondingly through a magnetic attraction between the set of the first magnetic absorbing elements and the set of the second magnetic absorbing elements.

In the mobile portable device according to the embodiment of the present invention, when the host 2030 is connected to the docking 2010, it only needs to insert the host 2030 correspondingly to the connection pedestal 2020 through a location-orientation function of the connection pedestal 2020 and the magnetic attraction between the magnetic absorbing elements on the connection joints, which cause the insertion and connection between the host 2030 and the docking 2010 very convenient.

Wherein the first magnetic absorbing element connects to the second magnetic absorbing element by absorbing. When the first magnetic absorbing element is a magnetic body element, the second magnetic absorbing element may be a magnetic body element or a metal body (for example, ferrous metal) element; and when the second magnetic absorbing element is a magnetic body element, the first magnetic absorbing element may be a magnetic body element or a metal body element.

Figure 13:
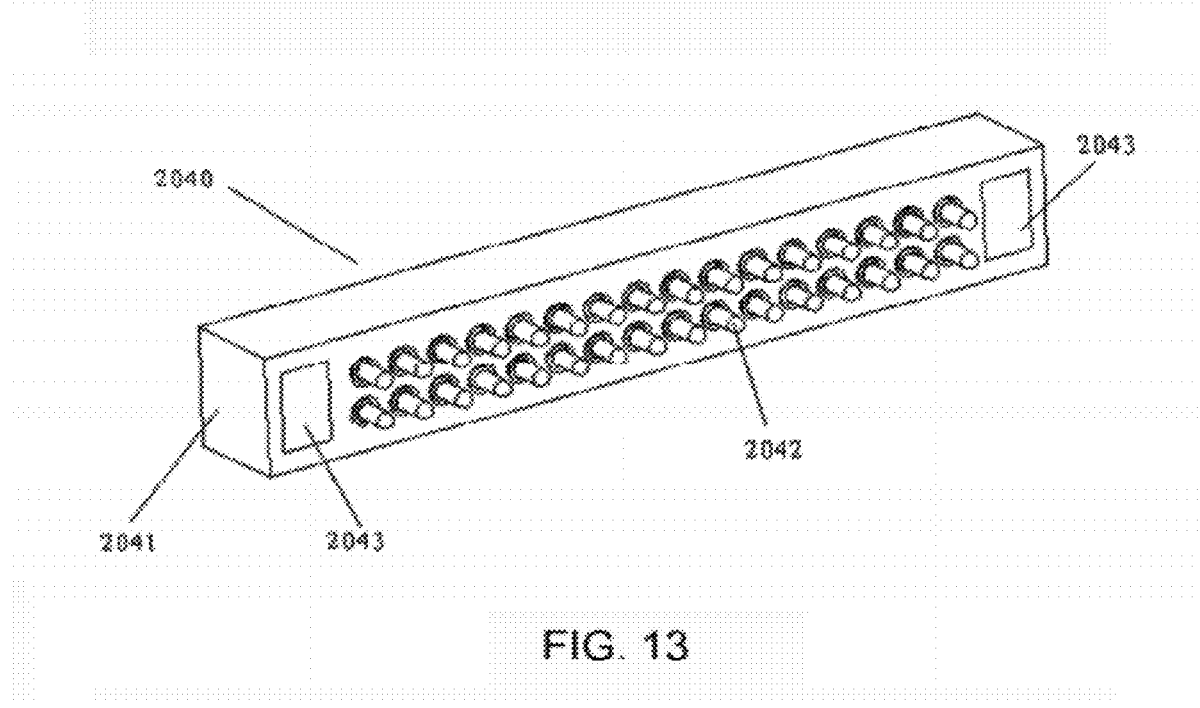
FIG. 13 is a schematic view of one structure of a connection joint of a magnetic connector, in the mobile portable device described in the embodiment of the present invention.

FIG. 13 is a schematic view of one structure of a connection joint of a magnetic connector, in the mobile portable device described in the embodiment of the present invention. Referring to FIG. 13, the first connection joint 2040 of the magnetic connecter comprises a substrate 2041, a plurality of pins 2042 and two magnetic elements 2043, wherein the pins 2042 and the magnetic absorbing elements 2043 are disposed on the substrate 2041, and the two magnetic elements 2043 are disposed at both sides of the pins set, respectively.

The second connection joint which is used with the first connection joint 2040 in pairs has a structure corresponding to that of the first connection joint 2040, that is, the number of the sheet metals is same as the number of the pins and their positions are set to be corresponding with each other; further, the number and positions of the magnetic elements thereon are also set to be the same or corresponding, so that the pins on the first connection joint may connect to the sheet metals on the second connection joint one-to-one correspondingly through the magnetic attraction between the magnetic elements 2043 on these two connection joints, when the first connection joint approximates the second connection joint.

A second connection terminal of the second connection joint which is used with the first connection joint in pairs may be designed as a sheet metal body which is not exposed from the plane. Pins 2042 of the first connection joint 2040 may connect to the substrate 2041 via a spring (not shown in the figure), respectively. By the spring set under the pins 2042, when the pins 2042 of the first connection joint contact the contact points of the second connection joint through a push force and/or gravity function, pins 2042 are pressed down inside the substrate 2041 through the elasticity of the springs, thus the pins of the first connection joint connect with the sheet metals of the second connection joint one-to-one correspondingly, and a point-to-plane contact connection is implemented between the pins and the sheet metals.

In the embodiment of the present invention, the first connection joint and the second connection joint are disposed at top surfaces of the host and the docking where a relative movement therebetween occurs. When the first connection joint and the second connection joint are disposed at two side surfaces of the host and the docking where a relative movement therebetween occurs, the protrude connection terminals of the connection joint of the magnetic connecter may be set as an inclined plane structure in order to match the relative movement between the host and the docking.

Further, those skilled in the art can understand, the substrates in the first connection joint and the second connection joint may be made of metal (for example, ferrous metal) material. If a magnetic element is disposed on the first connection joint or the second connection joint, the substrate on one magnetic element can absorb to the counterpart on the other magnetic element without disposing any magnetic elements on the other connection joint, so that two connection joints connect with each other correspondingly and the same technical effect as above described can be obtained.

Figure 14:
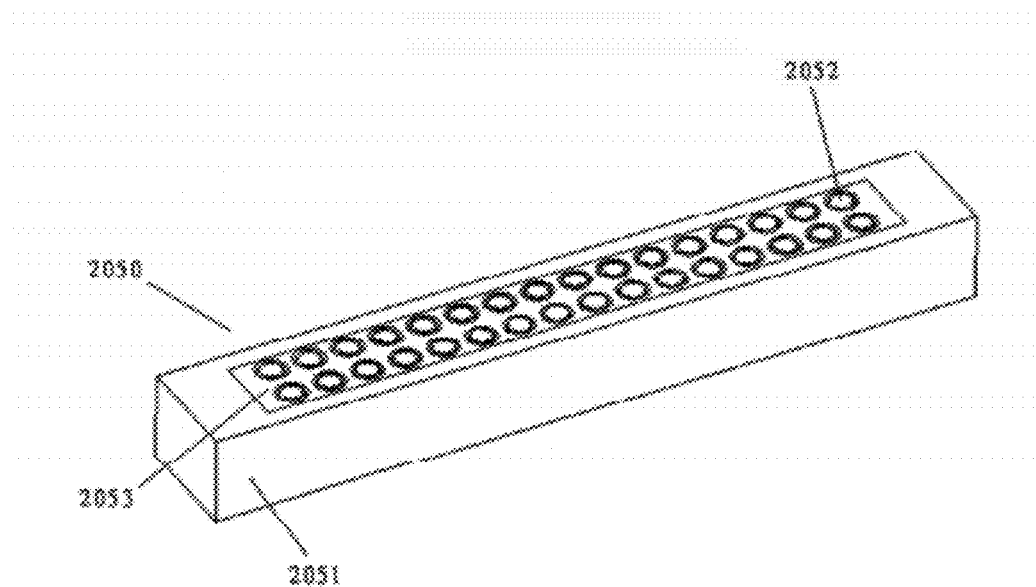
FIG. 14 is a schematic view of another structure of the connection joint of the magnetic connector, in the mobile portable device described in the embodiment of the present invention.

The configuration of the magnetic element on the connection joint of the magnetic connecter is not limited to what is shown in FIG. 13. FIG. 14 is a schematic view of another structure of the connection joint. Referring to FIG. 14, the first connection joint 2050 of the magnetic connecter also comprises a substrate 2051, a plurality of pins 2052 and a magnetic element 2053, and the differences are that the magnetic element 2053 of the first connection joint 2050 is embedded in the middle of the substrate 2051, and a plurality of pins 2052 are disposed above the magnetic element 2053. Also, regarding the second connection joint which is used with the first connection joint 2050 in pairs, the position on which the magnetic element is disposed may correspond to the magnetic element 2053, it is also possible that no magnetic element is disposed on the second connection joint and the substrate is made of metal material, the first connection joint 2050 connects to the second connection joint through the attraction between the magnetic element 2053 and the substrate of the second connection joint.

The connection joint of the magnetic connecter disposed on the host 2030 and the connection pedestal 2020 may have various structural forms, details are omitted.

The structure of the connection pedestal 2020 in the mobile portable device according to the embodiment of the present invention will be described below in detail.

Figure 15:
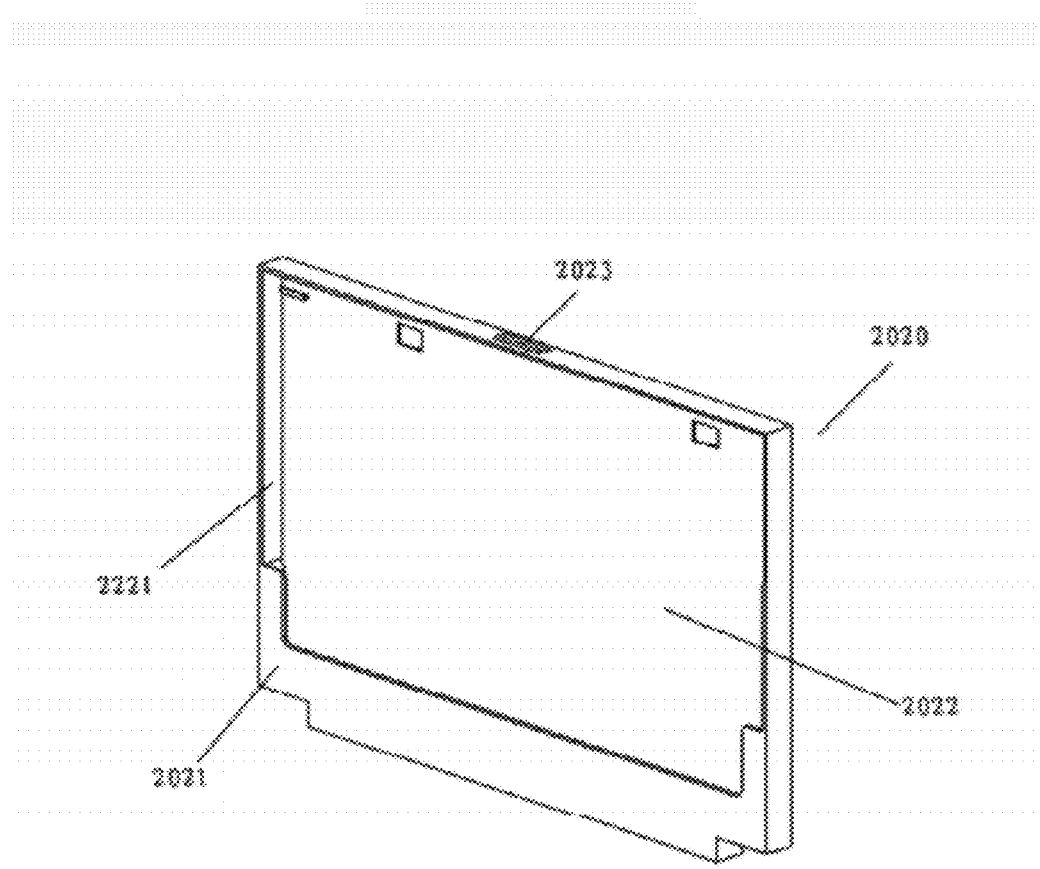
FIG. 15 is a schematic view of the stereostructure of the connection pedestal.

FIG. 15 is a schematic view of the stereo structure of the connection pedestal 2020. Referring to FIG. 15, in the embodiment of the present invention, the inside of the connection pedestal 2020 is formed as a containing space 2022 with a opening on the front surface 2021, the shape of the containing space 2022 corresponds to the shape of the housing of the host 2030, so that the host 2030 may be nicely fixed inside the containing space 2022 without shaking when it is placed in the containing space 2022, which in turn enables an accurate location between the second connection joint of the host 2030 and the first connection joint on the connection pedestal 2020.

Figure 16:
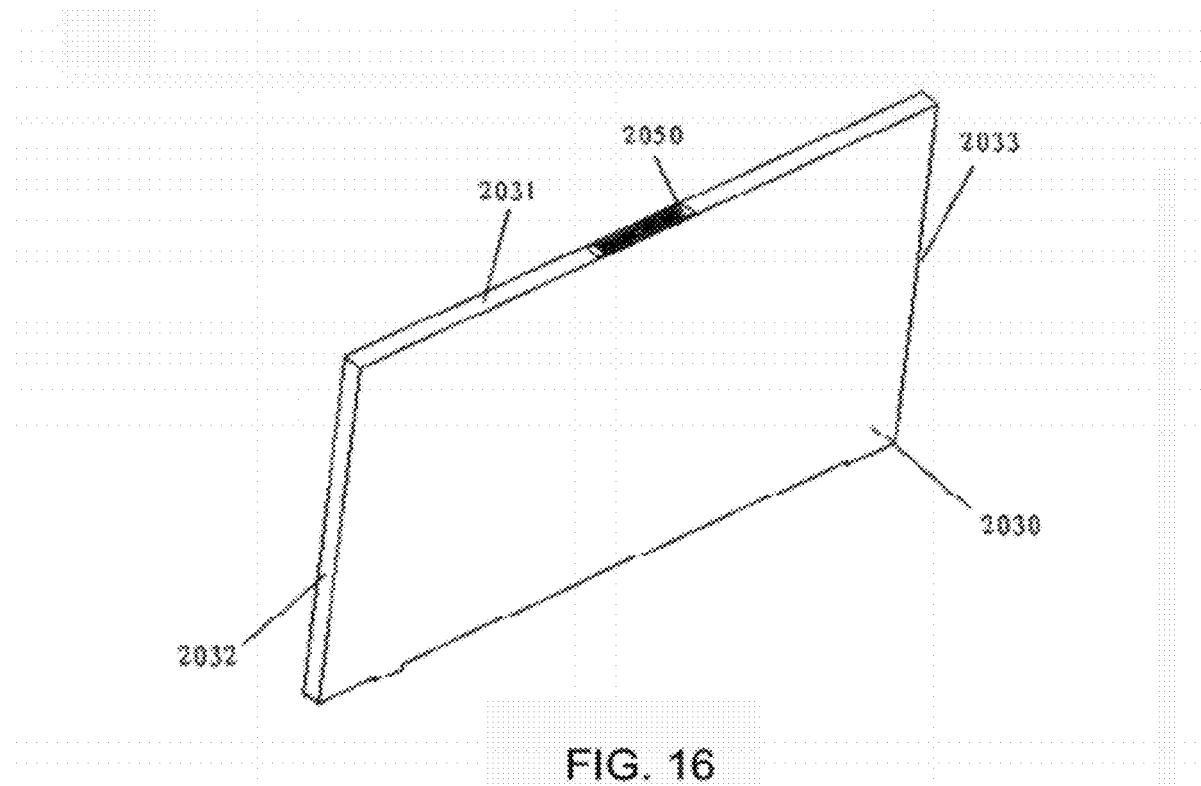
FIG. 16 is a schematic view of the stereostructure of the host.

In the mobile portable device according to the embodiment of the present invention, the first connection joint is located on the bottom surface of the containing space 2022, and the second connection joint is located correspondingly on one side surface 2031 of the host 2030 (such as the schematic view of the host 2030 shown in FIG. 16). When the host 2030 in inserted into the connection pedestal 2020, the side surface 2031 of the host 2030 faces down so as to fit the bottom surface of the containing space 2022 correspondingly.

Further, in the connection pedestal 2020, in a first inner side surface 2221 and the second inner side surface, that is the side opposite to the first inner side surface, of the containing space 2022, guide rail tracks are formed, respectively, along the length direction of the first inner surface 2221 and the second inner surface, the shape of the guide rail tracks correspond to the first side surface 2032 and the second side surface 2033 of the host 2030. When the host 2030 is inserted into the connection pedestal 2020, the first side surface 2032 and the second side surface 2033 mate to the two guide rail tracks on the containing space 2022, respectively, so that the host 2030 may slide along the rail tracks.

Through the above structure, when the host 2030 is inserted into the connection pedestal 2020, the side surface 2031 of the host 2030 faces down and orients towards the bottom surface of the containing space 2020, and at this time, the host 2030 slides down along the guide rail tracks under functions of the attraction between the magnetic elements on the magnetic connecter and of the gravity of the host 2030 itself, thus a alignment deviation between the host 2030 and the connection pedestal 2020 is corrected to a small extent from a relative big extent. Thus, under the function of composition of force of the gravity and the magnetic force, in the period of time during which the host 2030 continues to slide, the side surface 2031 of the host 2030 contacts with the bottom surface of the containing space 2022 while the first connection joint connects to the second connection joint of the magnetic connecter, then the host 2030 slides along the new location structure and is located finally, such that the host 2030 electrically connects to the docking 2010 and the system starts to communicate. Therefore, disposing the guide rail tracks inside the containing space 2022 further enhances the accurate alignment connection between both of the connection joints of the magnetic connecter.

In the mobile portable device according to the embodiment of the present invention, during the contact process of the two connection joints, through a whole contact alignment of two planes, the two connection joints are ensured to be in a contact connection simultaneously, avoiding a problem of electrical connection failure between the display and the host caused by a phenomenon that some pins contact at first while the others contact then; further, by the guide rail tracks on the connection pedestal, it also ensures that the two connection joints of the magnetic connecter can be connected in an accurate alignment.

Figure 17:
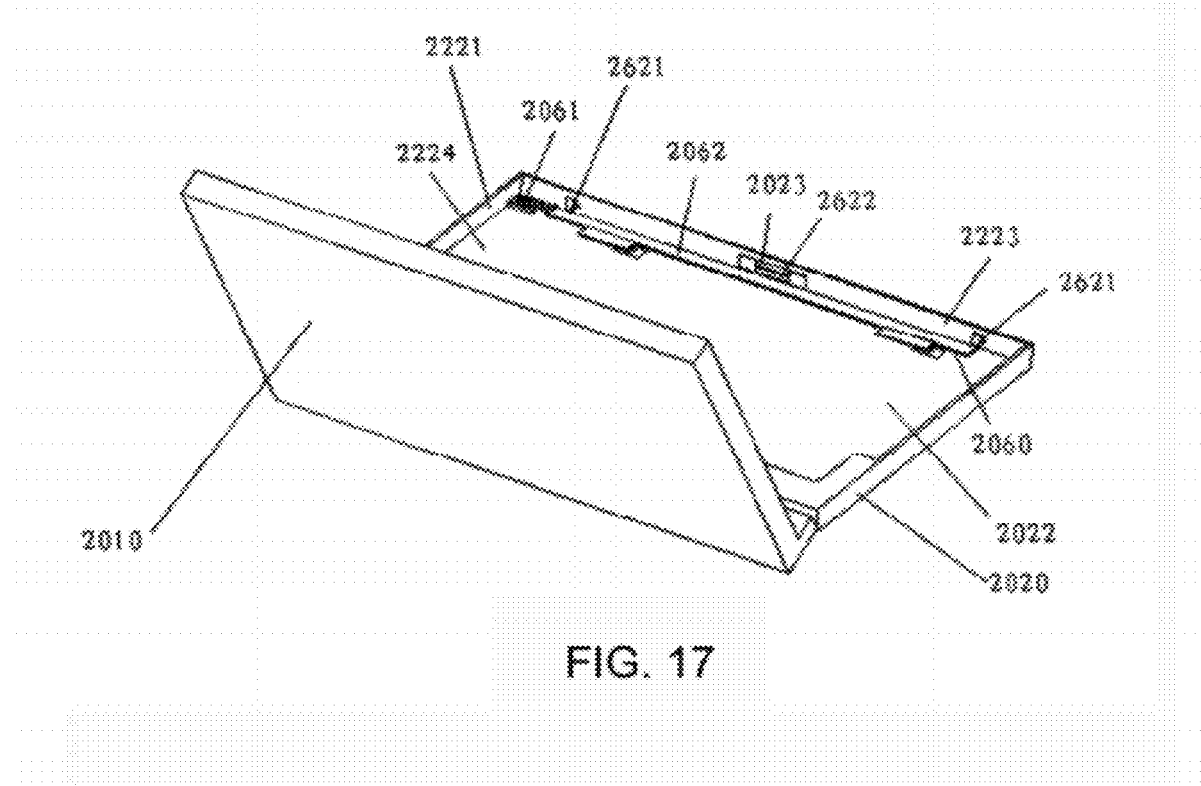
FIG. 17 is a schematic view of another stereostructure of the mobile portable device described in the embodiment of the present invention.

Further, as shown in FIG. 17, the connection pedestal of the mobile portable device according to the embodiment of the present invention also comprises a locking mechanism 2060 disposed on the top of the containing space 2022 and located in the inner of the top surface 2223 of the containing space 2022. As shown in FIG. 17, the locking mechanism comprises a spring 2061 and a connection linkage 2062. One end of the spring 2061 is fixed on the first inner side surface 2221 of the containing space 2022, and the other end is connected fixedly to the connection linkage 2062. The connection linkage 2062 is disposed to fit the back bottom surface 2224 of the containing space 2022 along the horizontal direction. Further, on the left end and right end of the connection linkage 2062, a hook 2621 is disposed to protrude in a direction perpendicularly to the back bottom surface 2224, respectively, and a trigger part 2622 is disposed on the middle of the connection linkage 2062 and extends into a opening 2023 set on the housing of the connection pedestal 2020.

After the host 2030 inserts into the connection pedestal 2020 and is located fixedly, the host 2030 attaches to the surface of the connection linkage 2062 and two hooks 2621 hook up the external housing of the host 2030, respectively, which further enhances the stable installation effect of the host 2030 in the connection pedestal 2020. If the user wants to take out the host 2030 from the connection pedestal 2020, he/she only needs to push the trigger part 2622 outwards in the opening 2023 along the direction perpendicularly to the back bottom surface 2224 of the containing space 2022, the trigger part 2622 brings the entire connection linkage 2062 to move far away from the back bottom surface 2224, so that the host 2030 is removed from the containing space 2022, while the elasticity force of the spring 2061 releases and the hooks 2621 hook away from the host 2030. Thus, only a gravity function has to be overcome when taking out the host 2030, and the host 2030 may be taken out from the connection pedestal 2020 by being lifted up slightly.

The above locking mechanism 2060 further enhances the connection stability between the host 2030 and the connection pedestal 2020 and facilitates the detachment of the host 2030 when detaching the host 2030, because it only needs to push the trigger part outwards so that the connection linkage can push the host 2030 to overcome the magnetic force and turn outside.

In the mobile portable device according to the embodiment of the present invention, as shown in FIG. 12, the connection pedestal 2020 connects to the docking 2010 through the configured spindle, the configuration ways of the spindle is same as that of the spindle of a general flip-style notebook computer, so that the host 2030 can flip around the spindle with respect to the docking 2010 together with the connection pedestal 2020 so as to be opened or closed similarly as the flip-style notebook, when it is inserted into the connection pedestal 2020.

Further, another aspect of the embodiment of the present invention provides a host, and the host comprises: a host housing; a display unit disposed inside the housing, a display panel of the display unit is exposed from the host housing; a first connection part disposed on the host housing, and the first connection part includes a first surface on which a first connection joint electrically connecting with a second connection joint of a docking is disposed, the first connection joint includes at least one first connection terminal; wherein when the host connects to the docking, the first connection part connects to the second connection part of the docking, the first surface fits onto a second surface of the docking on which the second connection joint is disposed, and one of the at lease one first connection terminal connects to the one of the at least one second connection terminal of the second connection joint one-to-one correspondingly.

A still one aspect of the embodiment of the present invention further provides a docking, and the docking at least comprises: a keyboard; a docking housing; a second connection part, the second connection part is disposed on the docking housing, and the second connection part has a second surface on which a second connection joint electrically connecting with a first connection joint of a host is disposed, the second connection joint includes at least one second connection terminal; wherein when the host connects to the docking, the second connection part connects to the first connection part of the host, the second surface fits onto a first surface of the host on which the first connection joint is disposed, and the at lease one second connection terminal connects to the one of the at least one first connection terminal of the first connection joint one-to-one correspondingly.

In the host and the docking of the embodiment of the present invention, the mating ways between the first connection part and the second connection part may be embodied as a structure wherein a protruded part is mated to a mating slot. By such structure, during the connection process between the host and docking, an alignment correction is performed when the host connects to the docking through a slidable insertion process from the protruded part to the mating slot. For the detailed structures of the host and docking and the structures of the connecters disposed on the host and docking, please refer to those shown in FIGS. 12 to 17, and details are omitted therein.

The docking in any one of the above embodiments at least comprises a keyboard, and may also comprises an external Graphic Card, a speaker, a camera, a mini-projector, etc. Of course, the docking may further comprise a set of first hardware system and a first OS adapted to the first hardware system, and such docking may independently act as a home server for accomplishing tasks such as download, data store, etc. When the host connects with the docking, the display unit in the host acts as the display device of the first hardware system, and the remaining hardware in the host are in the non-operation state. At this time, the demands from the user are responded to by the first hardware system in the docking and the first OS. Further, the host with a display unit may be a tablet computer having a second hardware system and a second OS. The host, that is the tablet computer, may be used individually to satisfy the user's demands independently. When the host (that is, the tablet computer) connects to the docking having the first hardware system and the first OS, they may compose a system with hybrid architecture. The system with hybrid architecture may select one of the host and the docking or let they two cooperate to satisfy the user's demands, according to the user's demands and the processing capability between the host and the docking.

Those skilled in the art can understand, it is not limited to the structure in the above detailed embodiments that utilizing a plane-to-plane contact alignment connection to connect the connection joints of the mobile portable device and disposing the connection parts on the docking, in order to obtain a object of further fixing the connection between the host and the docking and enhancing the alignment accuracy when the first connection joint contact with the second connection joint, and it may have various implementations. For example, the connection pedestal including the second surface (on which one of the connection joints of the magnetic connecter is disposed) and guide rail tracks may be integrated with the docking housing. The different varieties to the mobile portable device according to the embodiments of the present invention will not be described in detail herein.

In the mobile portable device of the embodiment of the present invention, the pins on the two connection joints of the magnetic connecter may contact and connect with each other simultaneously and are aligned accurately when the host connects with the docking. Further, the installation and uninstallation between the host and the docking are very convenient.

Figure 18:
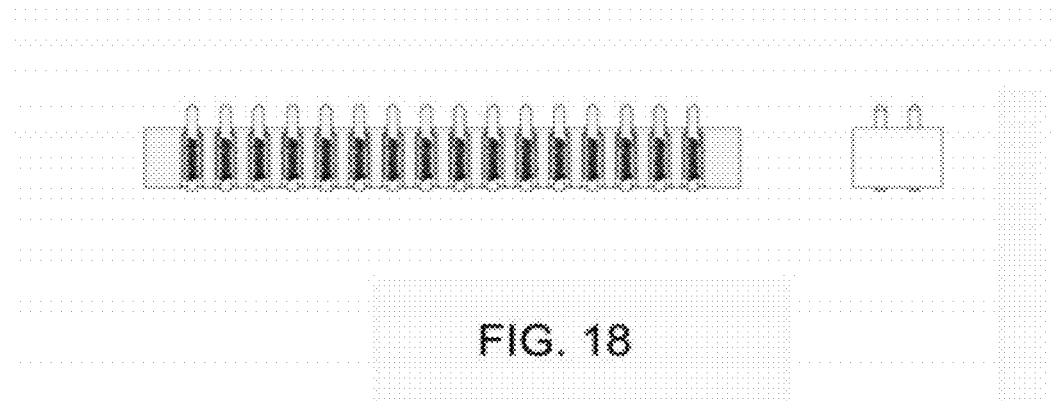
FIG. 18 is a view showing the structure of an existing spring connector.

With respect to the first connection part and the second connection part used in the host and the docking according to the embodiment of the present invention, of course they may be spring connecters, because the spring connecter is a common-used electrical connection measure and is characterized in that the connecter could disconnect from or connect to the apparatus to be connected quickly. Referring to FIG. 18, FIG. 18 is a view showing the structure of an existing spring connector comprising a body 3001 and pins 3002. The pins 3002 arrange inside the body 3001 trimly and closely, and the contact parts of the pins 3002 are exposed from the top surface 3011 of the body 3001.

Figure 19:
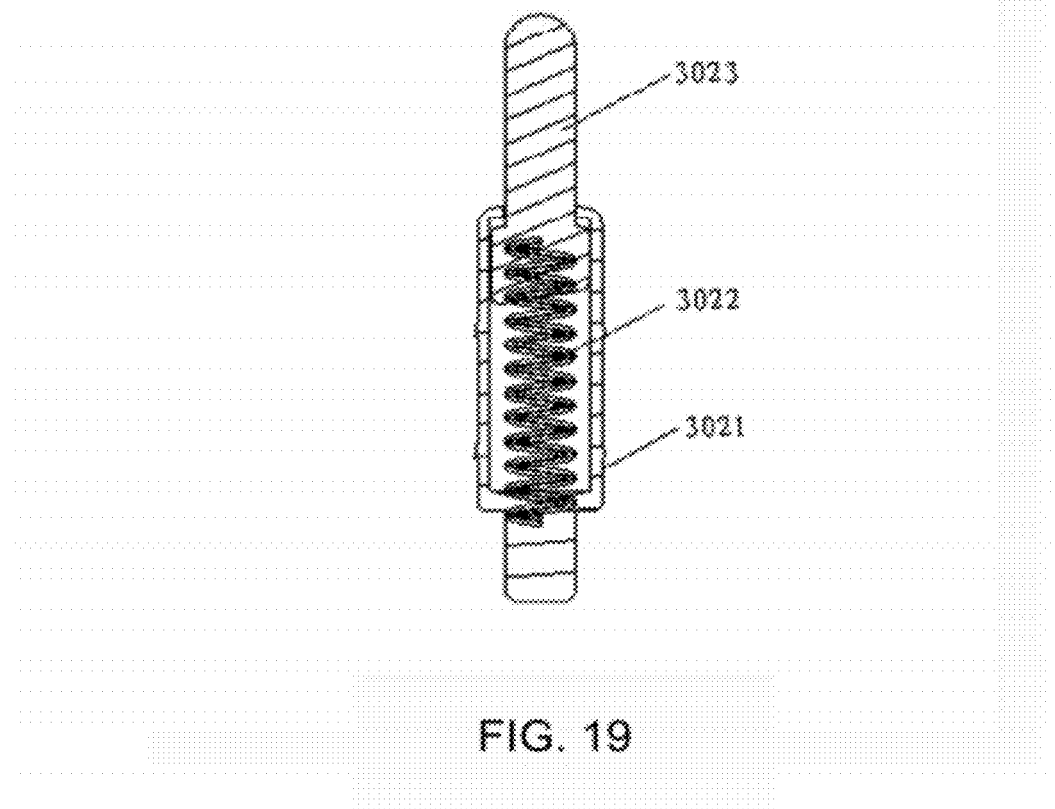
FIG. 19 is a view showing the structure of an existing pin.

The pins 3002 have a spring structure, as shown in FIG. 19, and each pin comprises a pin body 3021, a spring 3022 and a pin contact part 3023. The pin contact part 3023 may slide up and down by cooperating with the spring 3022. When the pin contact part 3023 is compressed, enough pre-pressure can be ensured so that the connecter and the apparatus to be connected may be connected closely.

However, the pin contact part of the spring connecter is extruded and exposed in a non-connection state. In a case of arranging a plurality of contact points densely, a problem of short-circuit among the contact points will occur if some conductive objects fall among them, so that the connecter or devices connecting with the connecter is destroyed.

Therefore, one object of the embodiment of the present invention is to provide a connecter and a device to which the connecter is applied, which prevents objects falling among the contact points so as to avoid short-circuit.

When applying the connecter according to the embodiment of the present invention to a master device or a slave device in a portable terminal or an independent portable device of the above embodiments, those skilled in the art can understand that the first connection joint or the second connection joint in the above first connection part or second connection part is equivalent to the body 3001 in FIG. 18, while the plurality of first connection terminals or second connection terminals are equivalent to the pins 3002 in FIG. 19.

The embodiment of the present invention provides a connecter of a portable terminal, the portable terminal comprises a master device and a slave device, the connecter is used to connect the master device with the slave device of the portable terminal, the connecter comprises: connection joints, on which at least one connection terminal is disposed; a protection cover having at least one hole, each of the at least one hole corresponds to each of the at least one connection terminal, the at least one hole is positioned at a top board of the protection cover; a spring connection part disposed between the connection joints and the protection cover, the protection cover connects with the connection joint via the spring connection part; wherein the top board of the protection cover is higher than the top of the contact part of the at least one connection terminal when the spring connection part is at a first position, and the contact part of the at least one terminal passes through the corresponding hole on the protection cover and exposes itself from the top board of the protection cover when the spring connection part is at a second position.

Wherein the spring connection part comprises at least one spring support part, and one end of the spring support part is fixed on the connection joint while the other end contacts with the protection cover.

Wherein the spring connection part further comprises at least one location part, and the location part comprises: a first fix part located on the connection joint, a second fix part located on a side board of the protection cover, and the first fix part clips on the second fix part when the spring connection part is at the first position.

Wherein the spring support part comprises a spring and a support body, one end of the spring is fixed on the connection joint, and the other end is fixed to a first end of the support body; a second end of the supporting part contacts with a position without holes on the inner wall of the top board of the protection cover; when the spring connection part is at the first position, the spring is in a free state and the support body lifts up the protection cover.

Wherein the spring support part is embodied as a spring, one end of the spring is fixed on the connection joint, and the other end is fixed to the protection cover.

Wherein the spring support part is a connection terminal without electrical signal.

The embodiment of the present invention further provides a portable terminal, comprises: a master device; a spindle; a first connection part, which connects to the master device through the spindle; a first interface disposed on the first connection part and including a protection cover; at least one connection terminal, holes corresponding to each of the connection terminals are disposed on the protection cover, respectively; a slave device having display function, which connects to the master device through the first connection part; a second interface having at least one contact point, disposed on the slave device having display function, the number of the contact points are same as the number of the connection terminals; wherein the at least one connection terminal in the first interface contacts with the at least one contact point in the second interface by passing through the corresponding hole on the protection cover, when the slave device having display function connects to the master device through the first connection part; and the protection cover covers the top of the contact part of the at least one connection terminal, when the slave device having display function disconnects from the master device through the first connection part.

Wherein the protection cover connects with the first interface through the spring connection part.

Wherein the spring connection part comprises at least one spring support part, one end of the spring support part is fixed on the connection joint of the first interface, while the other end contacts with the protection cover.

Wherein the spring connection part further comprises at least one location part, and the location part comprises: a first fix part located on the connection joint of the first interface, a second fix part located on a side board of the protection cover, and the first fix part clips on the second fix part when the spring connection part is at the first position.

By applying the connecter provided by the embodiment of the present invention, the protection cover is at a first position when the connecter is in a disconnection state, that is, the protection cover is higher than the height of the contact points of the connection terminals, thus it can effectively avoid the problem of short-circuit caused by objects falling among the contact points of the connection terminals, etc.

By applying the portable terminal or portable device according to the embodiment of the present invention, the protection cover covers the top of the contact part of the at least one connection terminal, when the slave device having display function disconnects from the master device through the first connection part, that is, the protection cover is higher than the height of the contact points of the connection terminals, thus it can effectively avoid the problem of short-circuit caused by objects falling among the contact points of the connection terminals, etc.

Of course, those skilled in the art can understand that the relationship between the master device and the slave device of the portable terminal may interchange in the description for the above embodiments. For example, the master device may have the display function and connect with the slave device through the first connection part. Further, the connecter in above embodiment may be applied to the portable device and the second portable device in the above embodiment. That is to say, the portable device may have the display function and connect with the second portable device through the first connection part, or alternatively, the second portable device may have the display function and connect with the portable device through the first connection part. The embodiment of the present invention does not intend to be limited to this.

The solutions in the embodiments of the present invention will be described below clearly and fully, in connection with the figures in the embodiments of the present invention. Obviously, the described embodiments are only part of the embodiments of the present invention but not all embodiments. Based on the embodiments of the present invention, other embodiments which can be obtained by those ordinary skilled in the art without any inventive labors fall into the scope sought for protection of the present invention.

In the description about the following embodiments, as described above, when applying the connecter according to the embodiment of the present invention to a master device or a slave device of a portable terminal or an independent portable device of the above embodiments, those skilled in the art can understand that the first connection joint or the second connection joint in above first connection part or second connection part is equivalent to the body described thereafter, while the plurality of first connection terminals or second connection terminals are equivalent to the pins described thereafter.

Further, in the device provided by the embodiment of the present invention, the docking may be regard as the master device of the mobile terminal and the device having display function may be regard as the slave device of the mobile terminal, or inversely, the docking may be regard as the slave device of the mobile terminal and the device having display function may be regard as the master device of the mobile terminal. Alternatively, the docking may be regard as the first portable device and the device having display function may be regard as the second portable device, or inversely, the docking may also be regard as the second portable device and the device having display function may be regard as the first portable device.

Figure 20:
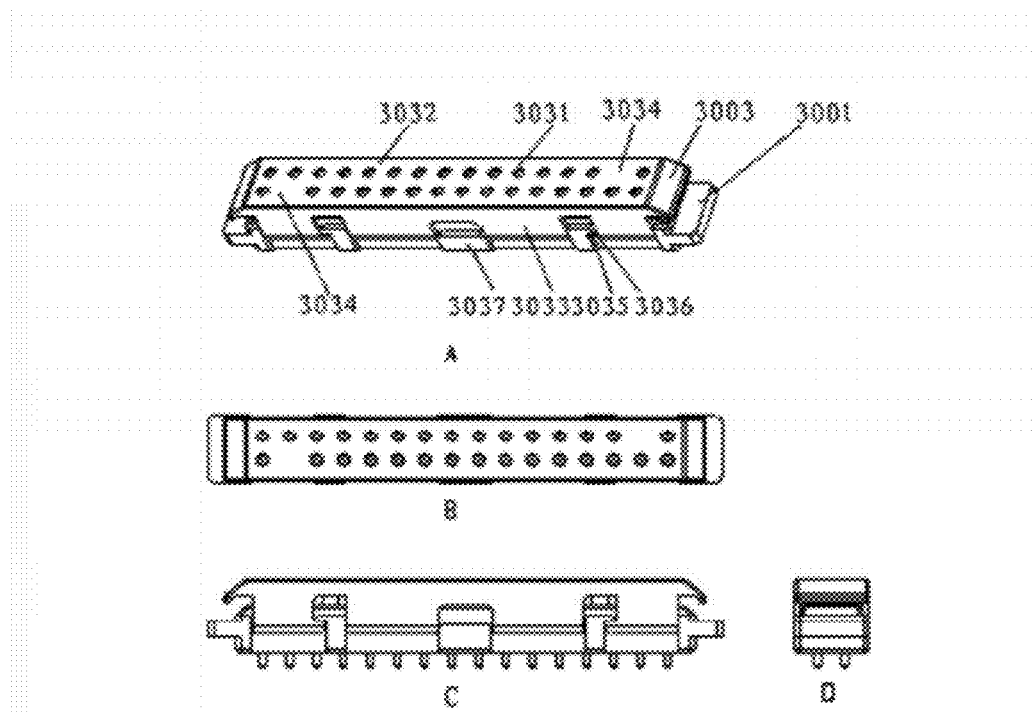
FIG. 20A is a schematic view of the stereostructure when a protection cover in the connector is at a first position, according to the embodiment of the present invention.
FIG. 20B is a top view when the protection cover in the connector is at the first position, according to the embodiment of the present invention.
FIG. 20C is a front view when the protection cover in the connector is at the first position, according to the embodiment of the present invention.
FIG. 20D is a left view when the protection cover in the connector is at the first position, according to the embodiment of the present invention.

Referring to FIG. 20, it shows related figures when a protection cover in the connector is at a first position, wherein FIG. 20A is a schematic view of the stereo structure when a protection cover in the connector is at a first position, according to the embodiment of the present invention; FIG. 20B is a top view when the protection cover in the connector is at the first position, according to the embodiment of the present invention; FIG. 20C is a front view when the protection cover in the connector is at the first position, according to the embodiment of the present invention; and FIG. 20D is a left view when the protection cover in the connector is at the first position, according to the embodiment of the present invention.

Figure 21:
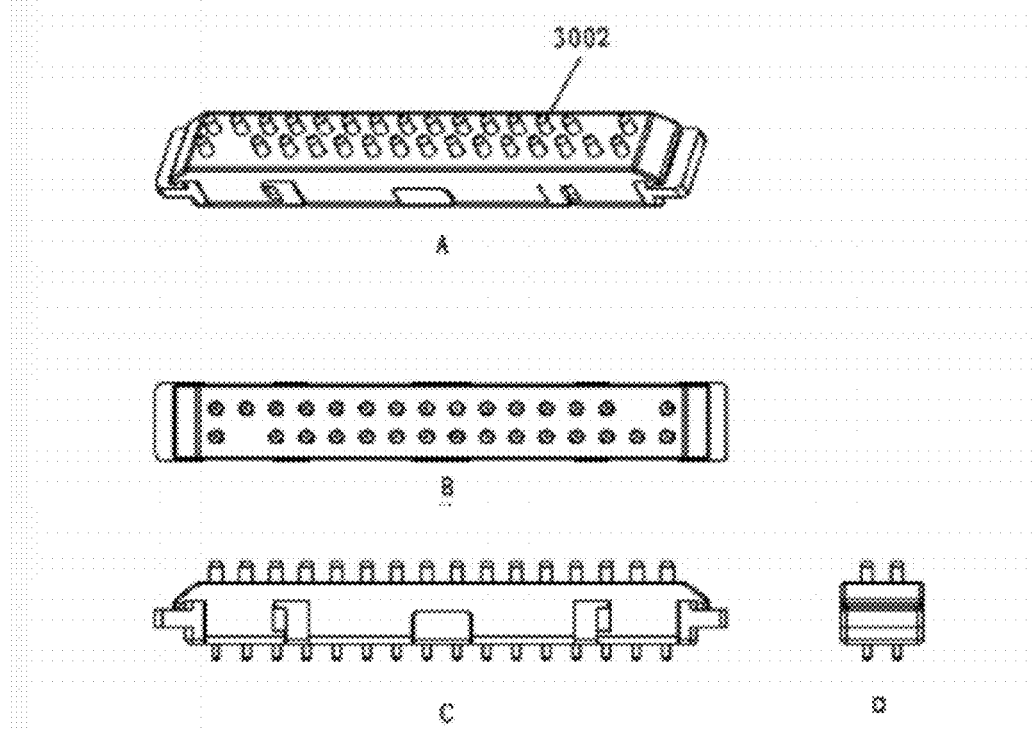
FIG. 21A is a schematic view of the stereostructure when a protection cover in the connector is at a second position, according to the embodiment of the present invention.
FIG. 21B is a top view when the protection cover in the connector is at the second position, according to the embodiment of the present invention.
FIG. 21C is a front view when the protection cover in the connector is at the second position, according to the embodiment of the present invention.
FIG. 21D is a left view when the protection cover in the connector is at the second position, according to the embodiment of the present invention.

Referring to FIG. 21, it shows related figures when a protection cover in the connector is at a second position, wherein FIG. 21A is a schematic view of the stereo structure when a protection cover in the connector is at a second position, according to the embodiment of the present invention; FIG. 21B is a top view when the protection cover in the connector is at the second position, according to the embodiment of the present invention; FIG. 21C is a front view when the protection cover in the connector is at the second position, according to the embodiment of the present invention; and FIG. 21D is a left view when the protection cover in the connector is at the second position, according to the embodiment of the present invention.

Referring to FIG. 20 and FIG. 21, the connecter according to the embodiment of the present invention comprises:

a body 3001, at least one pin 3002 is disposed on the body 3001, and the material of the body 3001 may be plastic or other nonconductive materials;

pins 3002 arranged inside the body 3001 closely, contact parts of the pins 3002 is exposed from the top surface 3011 of the body 3001;

a protection cover 3003 having at least one hole 3031, each of the at least one hole corresponds to each of the at least one pin, the at least one hole is positioned at a top board 3032 of the protection cover;

a spring connection part 3004 disposed between the body 3001 and the protection cover 3003, the protection cover 3003 connects with the body 3001 via the spring connection part 3004; wherein the top board of the protection cover is higher than the top of contact part of the at least one pin when the spring connection part 3004 is at a first position (as shown in FIG. 20), and the contact part of the at least one pin passes through the corresponding hole on the protection cover and exposes itself above the top board of the protection cover 3003 when the spring connection part is at a second position (as shown in FIG. 20b).

The above spring connection part 3004 may comprise at least one spring support part, and one end of the spring support part is fixed on the body 3001 while the other end contacts with the protection cover 3003.

The detailed structure of the spring support part may be various, and herein two possible implementations will be described only as an example.

As one of the possible implementation of the spring support part, the spring support part comprises a spring and a support body, one end of the spring is fixed on the body, and the other end is fixed to one end of the support body; the other end of the support body contacts with a position without holes on the inner wall of the top board of the protection cover, when the spring connection part is at the first position, the spring is in a free state and the support body lifts up the protection covert.

Please note, regarding the above possible implementation, the spring support part may be implemented by pins without electrical signal. In particular, referring to FIG. 20A and FIG. 20B, both ends of the protection cover of the connecter have a facet 3034 without holes, a pin without electrical signal is under the facet 3034. The pin is pressed when the protection cover is at the first position, while the spring in the pin extends freely and the contact part of the pin lifts up the protection cover when the protection cover is at the second position.

In the above possible implementation, the spring connection part may further comprise at least one location part. Still referring to FIG. 20A and FIG. 20B, the location part may comprise: a first fix part 3035 located on the body 3001; a second fix part 3036 located on a side board of the protection cover 3003, and the first fix part 3035 clips on the second fix part 3036 when the spring connection part is at the first position, which ensures the protection cover not being popped-up by the spring and fallen out.

As another possible case of the spring support part, the spring support part only comprises a spring, one end of the spring is fixed on the body 3001, and the other end is fixed to the protection cover 3003. In this case, no location parts are needed because the spring has fixed the body and protection cover, which may also ensure the protection cover not being popped-up by the spring and fallen out.

Please note, regarding the connecter shown in FIG. 20A and FIG. 20B, the connecter may further comprises a holding part 3037 regardless of the implementation of the spring support part. The holding part is disposed at the bottom of the body 3001, and the protruded thickness corresponds to the thickness of the protection cover 3003. The holding part 3037 is used to facilitate taking up or putting down the protection cover as operated in manual by a person.

By applying the connecter provided by the embodiment of the present invention, the protection cover is at a first position when the connecter is in a disconnection state, that is, the protection cover is higher than the height of the contact points of the pins, thus it can effectively avoid the problem of short-circuit caused by objects falling among the contact points of the connection terminals, etc. This embodiment of the present invention is designed skillfully and can be applied simply, and has an excellent market prospect.

Figure 22:
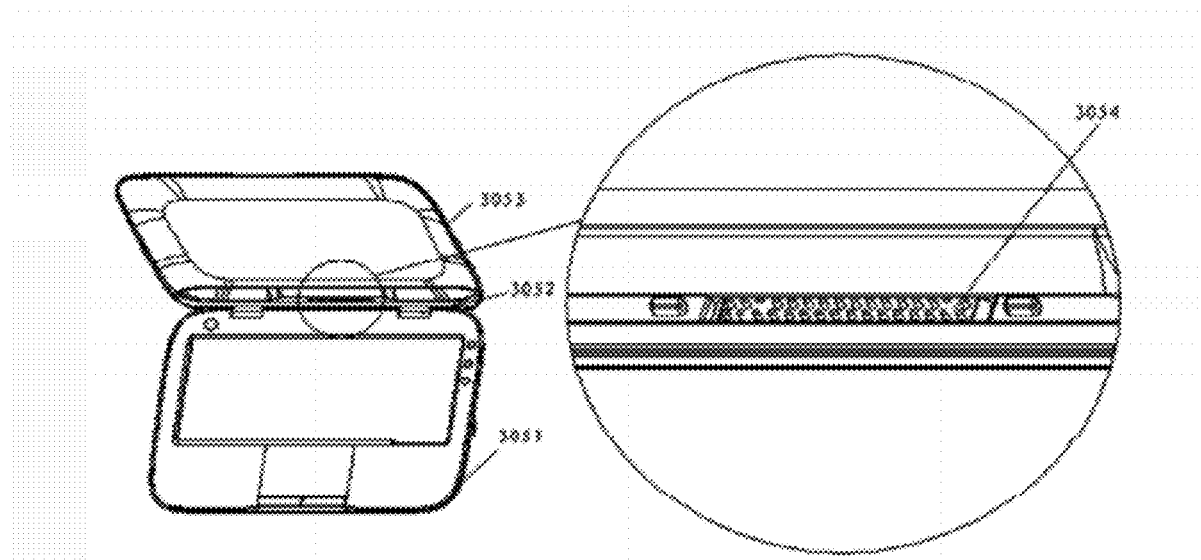
FIG. 22 is a view showing the structure of a device to which the connector described in the embodiment of the present invention is applied.

The embodiment of the present invention also provides a device. Referring to FIG. 22, it is a view showing the structure of a device to which the connector described in the embodiment of the present invention is applied, which comprises: a docking 3051; a spindle 3052; a first connection part 3053, which connects to the docking through the spindle; a first interface 3054 disposed on the first connection part and including a protection cover; at least one pin, holes corresponding to each of the pins are disposed on the protection cover, respectively; a device 3055 (not shown in figure) having display function, which connects to the docking through the first connection part; a second interface 3056 (not shown in figure) having at least one contact point, disposed on the device 3055 having display function, the number of the contact points are same as the number of the pins; wherein the pins in the first interface 3054 contact with the contact point in the second interface by passing through the corresponding holes on the protection cover, when the device 3055 having display function connects to the docking 3051 through the first connection part 3053; and the protection cover covers the top of the contact part of the at least one pin, when the device 3055 having display function disconnects from the docking 3051 through the first connection part 3053.

Regarding the device having display function, one possible implementation is embodied as a mobile phone, that is, the mobile phone may be placed in the first connection part and performs connection with the docking through the first interface; at this time, the display screen of the mobile phone acts as the display device of the docking. The interface for connecting with the docking on the device having display function is the second interface. Wherein the docking at least comprises a keyboard, and may also comprise an external Graphic Card, a speaker, a camera, a mini-projector, etc. Of course, the docking may further comprise a set of first hardware system and a first OS adapted to the first hardware system, and when a device having display function is inserted into the docking, it acts as the display device of the first hardware system. When the device having display function separates from the docking, such docking may act as a home server for accomplishing tasks such as download, data store, etc.

Further, the device 3055 having display function may be a tablet computer, which may be used individually to satisfy the user's demands independently, that is, the device having display function has independent hardware system and an OS adapted to the independent hardware system. When the device 3055 having display function, with independent hardware system and independent OS, inserts into the docking having the first hardware system and the first OS, they may compose a system with hybrid architecture. The system with hybrid architecture may select one of the device 3055 having display function and the docking or let they two cooperate to satisfy the user's demands, according to the user's demands and the processing capability between the device 3055 having display function and the docking.

The protection cover in the above first interface connects to the first interface through the spring connection part.

The above spring connection part comprises at least one spring support part, and one end of the spring support part is fixed on the body of the first interface while the other end contacts with the protection cover.

The above spring connection part further comprises at least one location part, and the location part comprises: a first fix part located on the body of the first interface; a second fix part located on a side board of the protection cover, and the first fix part clips on the second fix part when the spring connection part is at the first position.

With respect to the device embodiment, since it is substantively similar to the above connecter embodiment, the description about it is relatively simple and the please refer to the description about the connecter embodiment for their similar parts.

By applying the device provided by the embodiment of the present invention, the protection cover covers the top of the contact part of the at least one pin when the device having display function disconnects from the docking through the first connection part, that is, the protection cover is higher than the height of the contact points of the pins, thus it can effectively avoid the problem of short-circuit caused by objects falling among the contact points of the connection terminals, etc. This embodiment of the present invention is designed skillfully and can be applied simply, and has an excellent market prospect.

The descriptions about the above embodiments focus on the physical connection and electrical connection between the master device and the slave device of the portable terminal or between the first portable device and the second portable device, that is, possible structures of the connection part, of the connection support apparatus and connection mating apparatus or the first interface and the second interface, adopted in the master device and slave device of the portable terminal or the first portable device and the second portable device. Further, after connecting the master device of the portable terminal with the slave device, or the first portable device with the second portable device, and composing them as a single device, it also needs to ensure a reliable connection between the master device and the slave device of the portable terminal or between the first portable device and the second portable device.

For example, the mobile electrical product keeps being innovated with the development of the science and technology. For the notebook computer, in the base of satisfying the basic performance specifications of a computer, it has a trend towards more convenient and more interesting optimization design.

In view of this, a method in the prior art recombines the components of a notebook computer, integrates a screen and a system with low functions together, that is, as a tablet (SLATE) computer, and sets a mainstream system in a pedestal of the notebook computer, so that they can be separated and composed simply and conveniently. In practice, the SLATE computer may be removed to operate individually and provide some simple functions, simpler and lighter, greatly enhancing the portability of the notebook computer; when the screen (SLATE computer) is combined with the pedestal, the combination of them is a notebook computer with powerful functions. A typical combination method is to compose the tablet computer with the pedestal directly, and they two are divided or composed via a hinge part. Obviously one disadvantage of this form is that dusts often fall onto the operation panel of the unused pedestal when the SLATE computer is used alone.

To this end, it urgently needs to try another way to optimize the locking mechanism of a tablet computer embedded in a housing so as to enhance the stability of a product.

To the above disadvantages, it needs to provide a locking mechanism, which ensures a reliable connection between a tablet computer and a housing embedding it and enhances a usage stability of a product. Besides, the embodiment of the present invention further provides a notebook computer having the locking mechanism.

Therefore, for the above problem, the embodiment of the present invention provides a locking mechanism applied between a master device and a slave device of the portable terminal or between a first portable device and a second portable device, which is used to reliably connect the master device with the slave device of the portable terminal or connect the first portable device with the second portable device.

According to the embodiment of the present invention, a locking mechanism for a portable terminal comprising a master device and a slave device is provided, which is used for connecting the master device with the slave device embedding the master device, and comprising a pushing rod and a locking tab both disposed between the master device and the slave device, a second housing of the slave device has a slot disposed correspondingly to the locking tab thereon; the pushing rod shifts transversely along a outer edge of a second housing of the slave device, in order to make the locking tab shift lengthways until an extended end of the locking tab is inserted into the slot of the second housing of the slave device.

The pushing rod has a protruded sliding block and a position limiting part; the locking tab has a mating slope butting against the sliding block on the pushing rod, the locking tab is disposed between two lengthways position limiting parts set face-to-face and may shift lengthways along the two lengthways position limiting parts; there is a angle between the mating slope and the length direction of the pushing rod so that the transverse shift of the pushing rod brings the locking tab to shift lengthways; and the locking mechanism further comprises:

a position limiting component disposed between the tablet computer and the housing, the position limiting component is mated with the position limiting part on the pushing rod; and a first return spring part connecting to the pushing rod and the tablet computer, respectively; and the housing has a protrude part disposed correspondingly to the position limiting component thereon; wherein when the locking tab is in a returning state, the first return spring part is deformed by force under the function of the pushing rod, and the position limiting component butts against the position limiting part on the pushing rod so as to limit the transverse shift of the pushing rod; when the tablet is embedded into the housing, the protrude part presses the position limiting component to be separated from the position limiting part on the pushing rod, so that the first return spring part brings the pushing rod to shift transversely and the locking tab extends to be inserted into the slot of the housing.

Both of the numbers of the locking tab and the sliding block on the pushing rod are at least two, and they are disposed correspondingly and sequentially along the length direction of the pushing rod, respectively; and the mating slope on the locking tab is embodied as a strip sliding slot.

A transverse groove for accepting the pushing rod is disposed on the surface of the first housing of the master device, the length of the transverse groove is more than or equal to a sum of the length of the pushing rod and its displacement course.

A lengthways groove for accepting the locking tab is disposed on the surface of the first housing of the master device, and the lengthways groove extends to the outer edge of the master device.

The position limiting component further comprises: a position limiting means hinging with the body of the master device, a first end on one side of the hinging point cooperates with the protrude part on the second housing of the slave device while the second end on the other side of the hinging point cooperates with the position limiting part on the pushing rod; and a second return spring part disposed between the position limiting part and the master device; one side of the position limiting part has a first operation plane perpendicularly to the length direction of the pushing rod, and the other side of the position limiting part has a second operation plane inclining to the body of the pushing rod from the top of the position limiting part; the second housing of the slave device has a strip opening set along the length direction of the pushing rod thereon, and the pushing rod has a toggle button extending outwards through the strip opening of the second housing of the slave device; and in a course during which the locking tab transits to the returning state from the exposing state, a second end of the position limiting means rotates around its hinging point under the function of the second operation plane of the position limiting part, so that it butts against the first operation plane of the position limiting part under the function of the second return spring part; in a course during which the locking tab transits to the exposing state from the returning state, a first end of the position limiting means rotates around its hinging point under pressing by the protrude part of the second housing of the slave device, so that it breaks away from the first operation plane of the position limiting part.

The first return spring part is embodied as a tension spiral spring, and the second return spring part is embodied as a compressed spiral spring.

According to the embodiment of the present invention, a portable terminal is provided, the portable terminal comprises a master device and a slave device, the master device is embedded in a second housing of the slave device hinged with the slave device, wherein: a pushing rod and a locking tab are disposed between the master device and the slave device, the second housing of the slave device has a slot disposed correspondingly to the locking tab thereon; the pushing rod shifts transversely along a outer edge of the second housing of the slave device, in order to make the locking tab shift lengthways until an extended end of the locking tab is inserted into the slot of the second housing of the slave device.

The pushing rod has a position limiting part and a sliding block having protrusion; the locking tab has an mating slope butting against the sliding block on the pushing rod, the locking tab is disposed between two lengthways position limiting parts set face-to-face and may shift lengthways along the two lengthways position limiting parts; there is a angle between the mating slope and the length direction of the pushing rod so that the transverse shift of the pushing rod brings the locking tab to shift lengthways; and further comprises: a position limiting component disposed between the master device and the second housing of the slave device, the position limiting component is mated with the position limiting part on the pushing rod; and a first return spring part connecting to the pushing rod and the master device, respectively; and the second housing of the slave device has a protrude part disposed correspondingly to the position limiting component thereon; wherein when the locking tab is in a returning state, the first return spring part is deformed by force under the function of the pushing rod, and the position limiting component butts against the position limiting part on the pushing rod so as to limit the transverse shift of the pushing rod; when the master device is embedded into the second housing of the slave device, the protrude part presses the position limiting component to be separated from the position limiting part on the pushing rod, so that the first return spring part brings the pushing rod to shift transversely and the locking tab exposes to be inserted into the slot of the housing.

Both of the numbers of the locking tab and the sliding block on the pushing rod are at least two, and they are disposed correspondingly and sequentially along the length direction of the pushing rod, respectively; and the mating slope on the locking tab is embodied as a strip sliding slot.

A transverse groove for accepting the pushing rod and a lengthways groove for accepting the locking tab are disposed on the surface of the first housing of the master device, wherein the length of the transverse groove is more than or equal to a sum of the length of the pushing rod and its displacement course, and the lengthways groove extends to the outer edge of the master device.

The position limiting component further comprises: a position limiting means hinging with the first housing of the master device, a first end on one side of the hinging point cooperates with the protrude part on the second housing of the slave device while the second end on the other side of the hinging point cooperates with the position limiting part on the pushing rod; and a second return spring part disposed between the position limiting part and the master device; one side of the position limiting part has a first operation plane perpendicularly to the length direction of the pushing rod, and the other side of the position limiting part has a second operation plane inclining to the body of the pushing rod from the top of the position limiting part; the second housing of the slave device has a strip opening set along the length direction of the pushing rod thereon, and the pushing rod has a toggle button extending outwards through the strip opening of the second housing of the slave device; and in a course during which the locking tab transits to the returning state from the exposing state, a second end of the position limiting means rotates around its hinging point under the function of the second operation plane of the position limiting part, so that it butts against the first operation plane of the position limiting part under the function of the second return spring part; in a course during which the locking tab transits to the exposing state from the returning state, a first end of the position limiting means rotates around its hinging point under pressing by the protrude part of the second housing of the slave device, so that it breaks away from the first operation plane of the position limiting part.

The locking mechanism provided by the embodiment of the present invention is used for the outer edge of the second housing of the slave device of the portable terminal, and the pushing rod and the locking tab are disposed between the master device and the second housing of the slave device. In practice, the locking tab is brought to shift lengthways by the transverse shift of the pushing rod along the outer edge of the housing until the exposed end thereof is inserted into the slot of the second housing of the slave device, so that the master device may connect with the second housing of the slave device embedding the master device reliably. Inversely, after the master device is detached from the second housing of the slave device, the second housing of the slave device may still cover the slave device by turning, which efficiently avoids the problem that dusts attack the operating panel of the slave device and greatly increases the usage stability of the portable terminal.

Further, the shift directions of the pushing rod and the locking tab are substantively perpendicular in this solution, that is, the shift direction of a forcing part is different from that of a performing part, so that the arrangement space of the above shift parts is greatly saved, the structure is designed closely, which meets to the requirements for miniaturization trend of the shape size of the portable terminal.

The detailed operation process in one preferred solution of the embodiment of the present invention is as follows: when the master device is embedded in the second housing of the slave device, the protruded part on the second housing of the slave device presses the position limiting component, which causes the position limiting components to be separate from the position limiting part on the pushing rod, at this time, the pushing rod transverse shifts with respect to the master device brought by the first return spring part, and because the sliding block on the pushing rod butts against the mating slope on the locking tab, the sliding block pushes the locking tab mated thereto to shift lengthways as the shift of the pushing rod until the exposed end of the locking tab is inserted into the slot of the second housing of the slave device; after the assembling is completed, the master device is embedded reliably with the second housing of the slave device as a whole, through the limitation of the locking mechanism. When the master device is needed to be detached, toggling the pushing rod to push the locking tab to be shifted lengthways, and after the exposed end of the locking tab breaks away from the slot of the second housing of the slave device, the position limiting component butts against the position limiting part on the pushing rod, so that the master device may be taken out from the second housing of the slave device. As compared with the prior art, the structure of the locking mechanism provided by the present invention is designed reasonably, applied between the master device and the second housing of the slave device, and convenient for the detachment operation of the master device; further, the present invention may efficiently avoid the phenomenon of abnormal unlocking, so that the operate stability of the product may be enhanced.

In another preferred solution of the embodiment of the present invention, the surface of the first housing of the master device has a transverse groove for accepting the pushing rod and a lengthways groove for accepting the locking tab thereon; and such design ensures the structure to be compacter.

In a still preferred solution of the embodiment of the present invention, one side of the position limiting part has a first operation plane perpendicularly to the length direction of the pushing rod, which may cooperate with the position limiting means to remain the locking tab in the returning state; and the other side of the position limiting part has a second operation plane inclining to the pushing rod body from the top of the position limiting part, which may cooperate with the position limiting means so that the locking tab may transit between the exposing state and the returning state. Thus, it may enhance the operability of the mechanism.

Of course, those skilled in the art can understand that the relationship between the master device and the slave device may interchange in the description about the above embodiments, for example, the slave device may be embedded in the first housing of the master device. Further, the above locking mechanism may be applied to the embodiments of the first portable device and the second portable device, that is, applied to the embodiment of embedding the first portable device in the second housing of the second portable device or the embodiment of embedding the second portable device in the first housing of the first portable device. As described above, the locking mechanism provided by the embodiment of the present invention is suitable for any connection between any tablet electric products and the housing embedding it, especially for a notebook computer.

In the description about the following embodiments, taking the notebook computer as an example to describe the portable terminal according to the embodiment of the present invention. Herein, those skilled in the art can understand that in the following description, a tablet computer may be regard as the master device of the portable terminal and the pedestal may be regard as the slave device of the portable terminal, or inversely, the tablet computer may be regard as the slave device of the portable terminal and the pedestal may be regard as the master device of the portable terminal. Alternatively, the tablet computer may be regard as the first portable terminal and the pedestal may be regard as the second portable terminal, or inversely, the tablet computer may also be regard as the second portable terminal and the pedestal may be regard as the first portable terminal.

The point of the embodiment of the prevent invention is to provide a locking mechanism used between a tablet computer and the housing embedding the tablet computer, the locking mechanism comprises a pushing rod and a locking tab which are disposed between the tablet computer and the housing, the housing has a slot disposed correspondingly to the locking tab thereon; the pushing rod shifts transversely along an outer edge of the housing, in order to make the locking tab shift lengthways until an exposed end of the locking tab is inserted into the slot of the second housing; thus, it ensures a reliable connection between the tablet computer and the housing embedding the tablet computer, and enhances a usage stability of the product.

Without loss of generality, the embodiment of the prevent invention will be described below in detail taking a notebook computer as an example.

The transverse direction or lengthways direction related in the present specification are defined by taking the pushing rod part as a reference: in a plane in parallel with the tablet computer, the transverse direction is the shift direction of the pushing rod, and the lengthways direction is the direction which is perpendicular to the shift direction of the pushing rod; those skilled in the art should understand the used orientation terms, such as transverse or lengthways, will not limit the scope sought for protection in the embodiment of the prevent invention.

Figure 23:
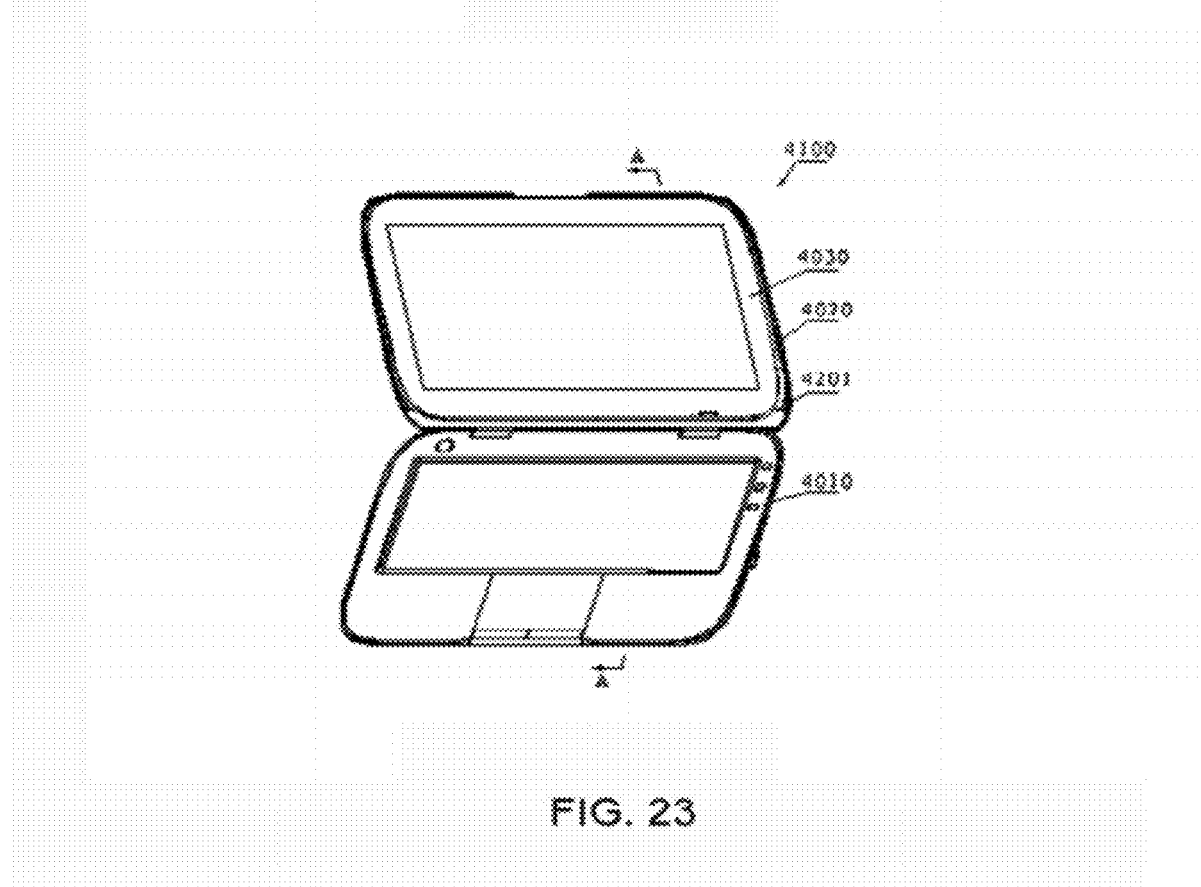
FIG. 23 is a schematic view, from the front side angle, of a notebook computer described in the embodiment of the present invention.
Figure 24:
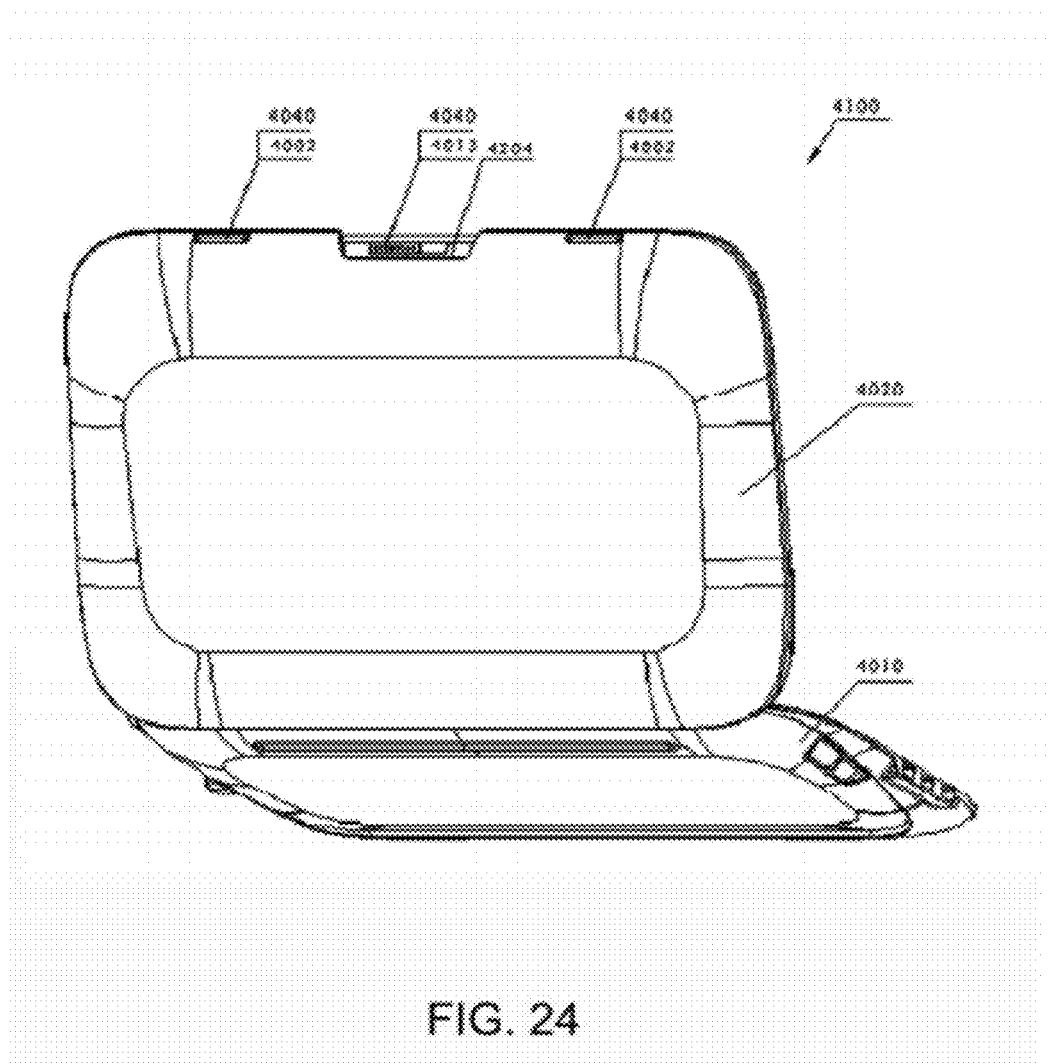
FIG. 24 is a schematic view, from the back side angle, of a notebook computer described in the embodiment of the present invention.

Please refer to FIG. 23 and FIG. 24, wherein FIG. 23 is a schematic view, from the front side angle, of a notebook computer which is in an open state described in the embodiment of the present invention and FIG. 24 is a schematic view, from the back side angle.

Figure 25:
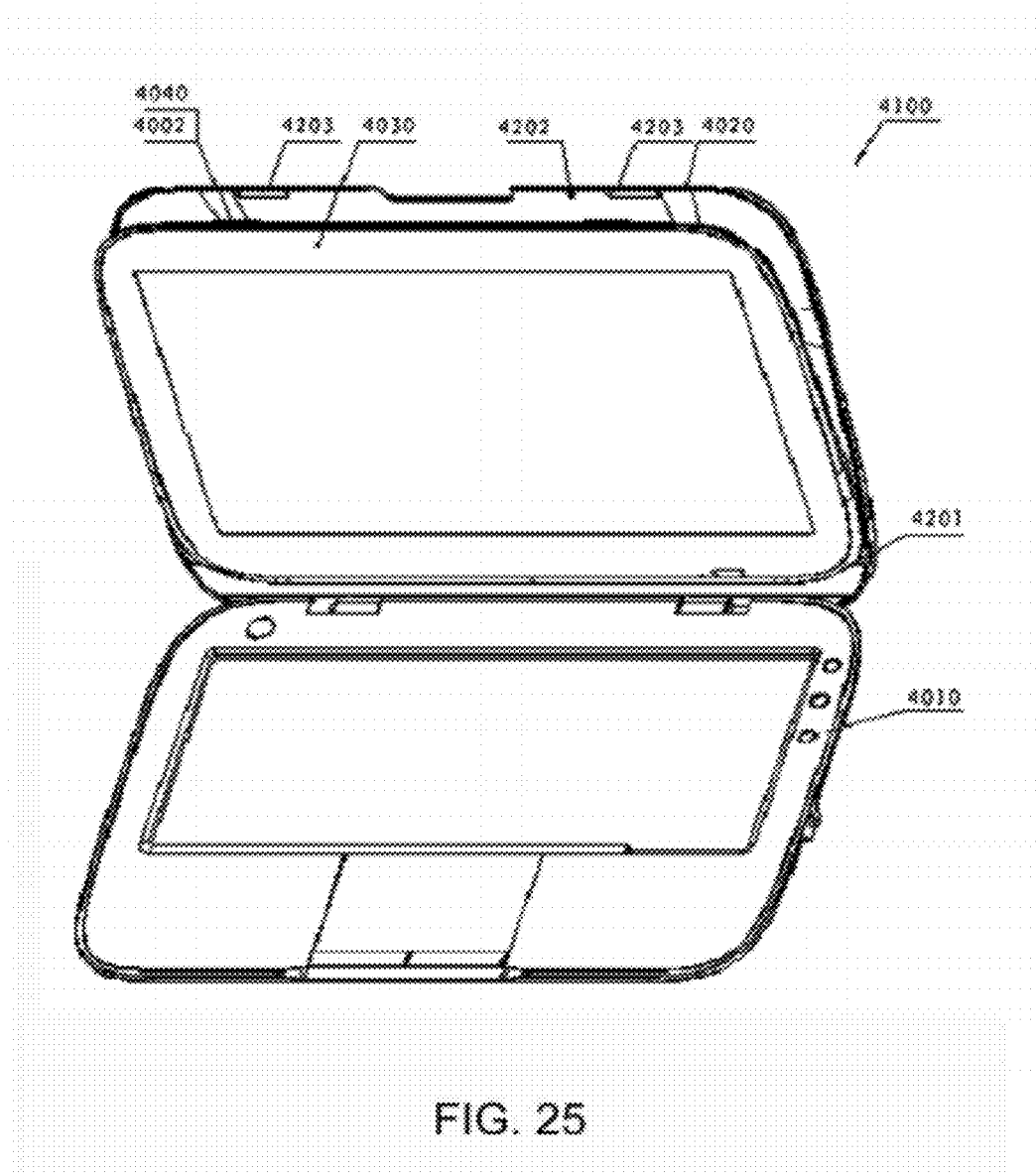
FIG. 25 is a schematic view showing a process for removing a tablet computer described in the embodiment of the present invention from the housing.
Figure 26:
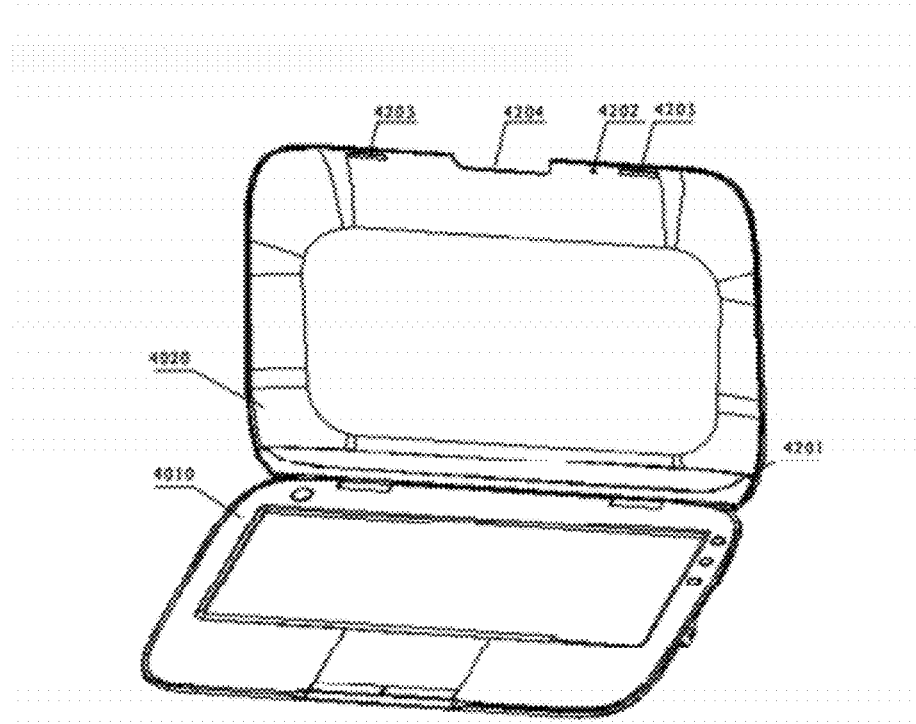
FIG. 26 is a schematic view, from the front side, of a base and the housing after the tablet computer is removed.
Figure 27:
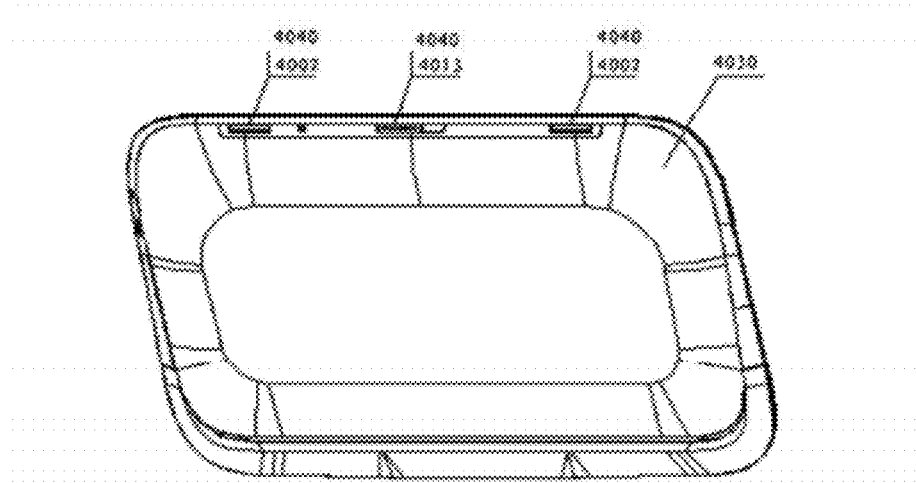
FIG. 27 is a schematic view, from the back side, do the tablet computer.

The notebook computer 4100 has a pedestal 4010, a housing 4020 hinging with the pedestal 4010 and a tablet computer 4030 embedding in the housing 4020. The user may remove the tablet computer to operate individually and use its simple functions in practice, for example, reading e-mail, viewing video, playing game and so on; the above pedestal 4010 at least comprises a keyboard, and of course may also comprise an external Graphic Card, a speaker, a camera, a mini-projector, etc. When the tablet computer 4030 is combined with the pedestal 4010, the tablet computer 4030 may be operated in a manner similar to that of a existing notebook computer (for example, performing input to the tablet computer through the keyboard, etc.), while the devices in the pedestal 4010 extend the functions of the tablet computer 4030 (for example, the external Graphic Card enhances the display quality of the tablet computer 4030). Of course, the pedestal 4010 may further comprise a set of first hardware system and a first OS adapted to the first hardware system, and the pedestal 4010 may independently act as a home server for accomplishing tasks such as download, data store, etc. When the tablet computer 4030 connects with the pedestal 4010, a display unit of the tablet computer 4030 acts as the display device of the first hardware system, while the remaining hardwares in the tablet computer 4030 are in a non-operation state. At this time, user's demands are responded to by the first hardware system and the first OS in the pedestal 4010. Further, the tablet computer 4030 may be used individually to meet the user's demands independently (the tablet computer 4030 has a hardware system and an OS adapted to the hardware system per se). When the tablet computer 4030 connects with the above pedestal 4010 with independent hardware system and independent OS, they may compose a system with hybrid architecture. The system with hybrid architecture may select one of the tablet computer 4030 and the pedestal 4010 or let they two cooperate to meet the user's demands, according to the user's demands and the processing capability between the tablet computer 4030 and the pedestal. For details, please refer to FIG. 25, FIG. 26 and FIG. 27 collectively, wherein FIG. 25 is a schematic view showing a process for detaching a tablet computer described in the embodiment of the present invention from the housing; FIG. 26 is a schematic view, from the front side, of a base and the housing after the tablet computer is detached; and FIG. 27 is a schematic view, from the back side, of the tablet computer.

Figure 28:
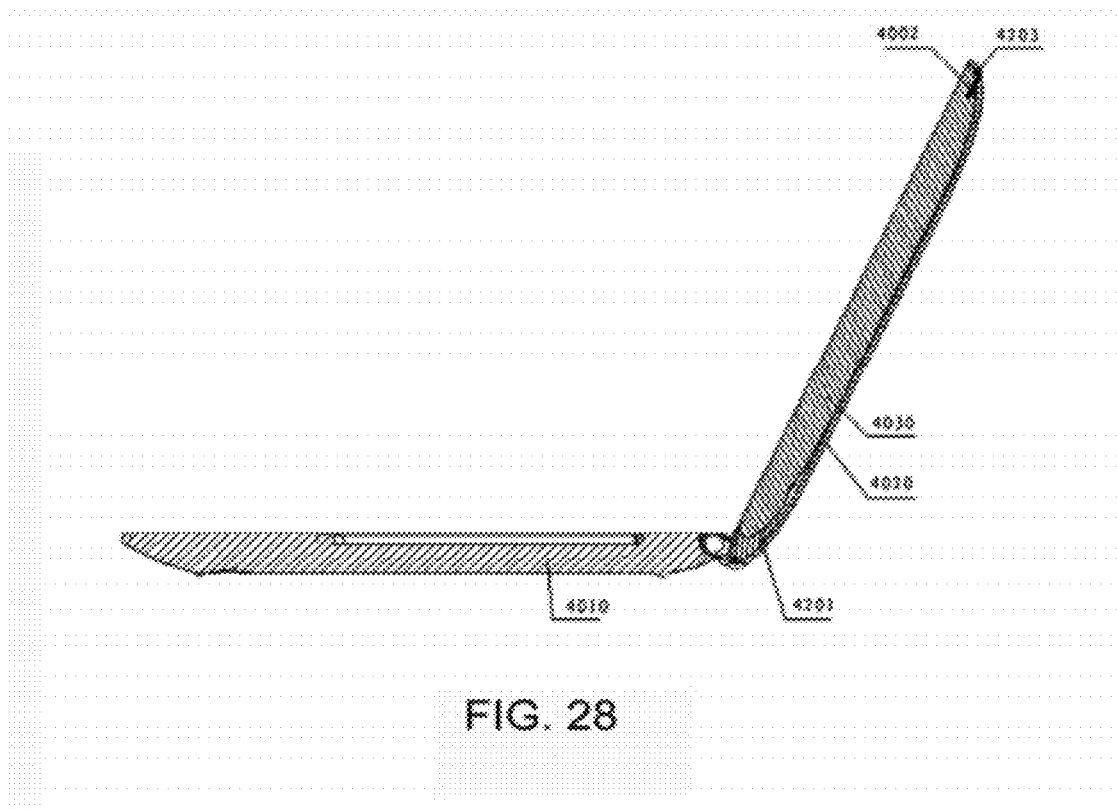
FIG. 28 is a section view of a cut position at A-A as shown in FIG. 22.
Figure 29:
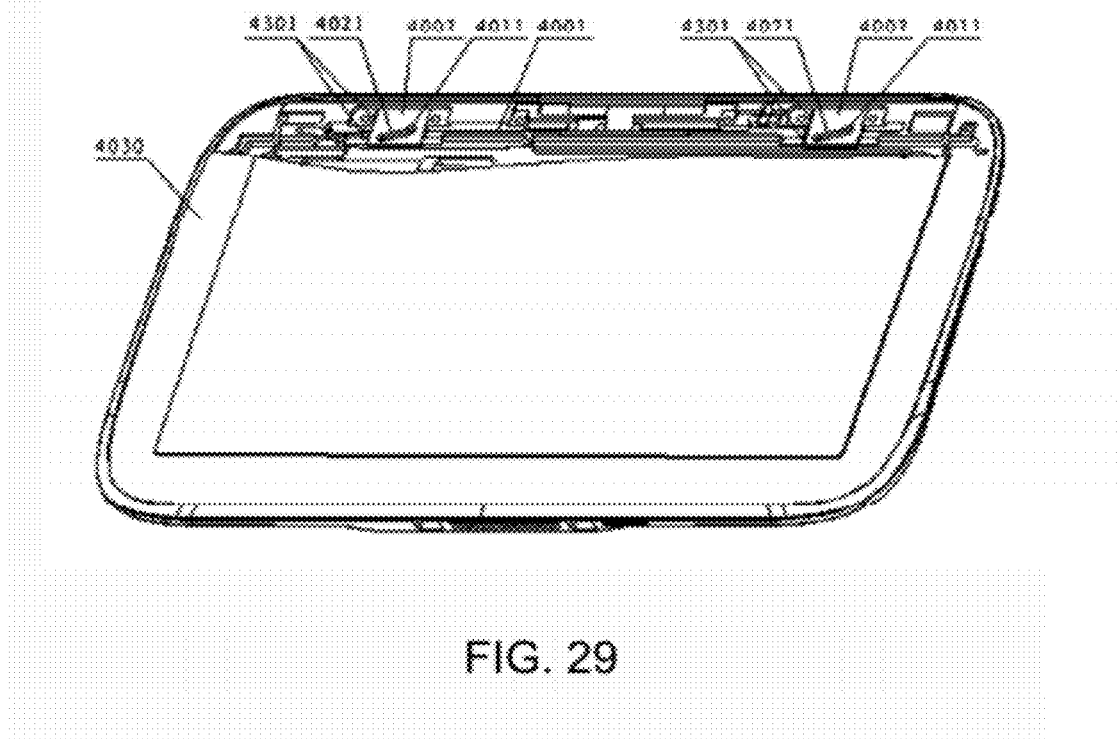
FIG. 29 is a schematic view of the tablet computer described in the embodiment of the present invention by partially cutting.

Please refer to FIG. 28 and FIG. 29 collectively, wherein FIG. 28 is a section view of a cut position at A-A as shown in FIG. 23; and FIG. 29 is a schematic view of the tablet computer described in the embodiment of the present invention by partially cutting.

A position limiting groove 4201 for embedding the tablet computer 4030 is disposed on the outer edge of one side of the housing 4020 which hinges with the pedestal 4010, a locking mechanism 4040 is disposed between the tablet computer 4030 and the outer edge of the opposite side of the housing 4020; when the tablet computer 4030 and the housing 4020 are embedded as a whole, the locking mechanism 4040 may ensure the reliable connection therebetween.

Please note, the main parts described previously, such as the pedestal 4010, housing 4020, the tablet computer 4030 and the like, are substantively similar to those in the prior art, so those skilled in the art may implement them based on the prior art and their details are omitted. Thereafter, the locking mechanism between the tablet computer 4030 and the housing 4020 embedding the tablet computer 4030 will be described in connection with the drawings.

Please refer to FIG. 30 and FIG. 31, the locking tab 4002 shown in these two figures are in the returning state. Wherein FIG. 30 is a schematic view showing an assembling relationship of a locking mechanism described in the embodiment of the present invention; and FIG. 31 is a schematic view, from the back side angle.

As shown in the figures, the locking mechanism 4040 comprises a pushing rod 4001, two locking tabs 4002, a position limiting component 4003 and a first return spring part 4004.

The pushing rod 4001 has two protruded sliding blocks 4011 and a position limiting part 4012, disposed between the tablet computer 4030 and the housing 4020, and may shift transversely along its length direction with respect to an outer edge of the housing 4020; preferably, a transverse groove (not shown in the figure) for accepting the pushing rod 4001 is disposed on the surface of the body of the tablet computer 4030, thus the pushing rod 4001 may be accepted in the transverse groove, and the length of the transverse groove is more than or equal to a sum of the length of the pushing rod and its displacement so as to satisfy the shift requirement of the pushing rod.

The two locking tabs 4002 are disposed sequentially along the length direction of the pushing rod 4001, each of the locking tab 4002 has an mating slope butting against the sliding block 4011 on the pushing rod 4001, there is a angle between the mating slope and the length direction of the pushing rod; at the same time, each of the locking tab 4002 is disposed, respectively, between two lengthways position limiting parts set face-to-face and may shift lengthways along the two lengthways position limiting part; so that the transverse shift of the pushing rod 4001 brings the locking tabs 4002 to shift lengthways. As shown in the figure, the mating slope on the locking tab is embodied as a strip sliding slot 4021 which penetrates through the locking tab 4002, and two side walls of the strip sliding slot 4021 is used to cooperate with the sliding blocks 4011. It can understand that the strip sliding slot 4021 may be a blind slot which does not penetrate through the locking tab 4002. Furthermore, other structure forms may be utilized to realize the mating slope butting against the sliding block 4011 and will fall into the scope sought for protection of the embodiment of the present invention as long as it can satisfy the design requirement. As shown in FIG. 29, a lengthways groove 4301 for accepting the locking tab 4002 is disposed on the surface of the body of the tablet computer 4030, and the lengthways groove 4301 extends to the outer edge of the tablet computer 4030, so that the locking tabs 4002 may extend from the outer edge of the tablet computer 4030, and two side walls of the lengthways groove 4301 are lengthways position limiting part. In fact, the lengthways position limiting part may further be disposed fixedly on a position limiting protrusion (not shown in the figure) on the surface of the body of the tablet computer 4030; of course, the structure shown in the figure is compacter and beneficial for enhancing the entire performance.

The first return spring part 4004 connects to the pushing rod 4001 and the body of the tablet computer 4030, respectively, so that the first return spring part 4004 is deformed by force and reserves elastic deformation energy for returning when the pushing rod 4001 brings the locking tab 4002 to return; as shown in the figures, the first return spring part 4004 is embodied as a tension spiral spring, one end of it hangs on the pushing rod 4001 and the other end of it hangs on the tablet computer 4030 (not shown in the figure). In fact, a compressed spiral spring or other suitable structure forms may be selected according to the assembling space and the returning force required.

A position limiting component is disposed between the tablet computer 4030 and the housing 4020, and the position limiting component is mated with the position limiting part 4012 on the pushing rod 4001. And, the housing 4020 has a protrude part 4202 disposed correspondingly to the position limiting component and a slot 4203 disposed correspondingly to the extended end of each of the locking tabs 4002 thereon; for details, please refer to FIG. 32 and FIG. 33, wherein the shown locking tabs 4002 are in the exposing state in both of the figures. When the user wants to use the tablet computer 4030 individually, the locking tabs 4002 are in the returning state, and in this state, the tension spiral spring is deformed by tension force and the position limiting component butts against the position limiting part 4012 on the pushing rod 4001 so as to limit the returning of the pushing rod under the function of the tension spiral spring, that is to say, the pushing rod 4001 is remained at the corresponding operation position, that is, the locking tabs 4002 is remained in the returning state. When the tablet computer 4030 is embedded into the housing 4020, the protrude part 4202 presses the position limiting component to be separated from the position limiting part 4012 on the pushing rod 4001, so that the pushing rod 4001 shifts transversely until the locking tabs 4002 extends to be inserted into the slot 4203 of the housing 4020 under the function of the tension spiral spring which is deformed by the tension force.

Specially, under a design rule of a reliable connection between the tablet computer 4030 and the housing 4020 which are assembled together, the number of the locking tab 4002 which mates to the slot 4203 when extending may be one or more than two.

In particularly, the position limiting component 4003 further comprises a position limiting means 4031 and a second return spring part 4032; wherein the operation principle of the position limiting means 4031 is similar to that of a lever mechanism, and a hinge axes 4311 of which the middle extends hinges with the body of the tablet computer 4030, a first end 4312 on one side of the hinging point cooperates with the protrude part 4202 on the housing 4020 while the second end 4313 on the other side of the hinging point cooperates with the position limiting part 4012 on the pushing rod 4001.

The second return spring part 4032 is disposed between the position limiting means 4031 and the tablet computer 4030, and as shown in the figure, the second return spring part 4032 is embodied as a compressed spiral spring.

One side of the position limiting part 4012 has a first operation plane 4121 perpendicularly to the length direction of the pushing rod 4001, and the other side of the position limiting part 4012 has a second operation plane 4122 inclining to the pushing rod 4001 body from the top of the position limiting part 4012; further, the housing 4020 has a strip opening 4204 set along the length direction of the pushing rod 4001 thereon, and the pushing rod 4001 has a toggle button 4013 extending outwards through the strip opening 4204 of the housing 4020.

The operation process of the locking mechanism of the notebook computer will be described below briefly.

Figures 34, 35:
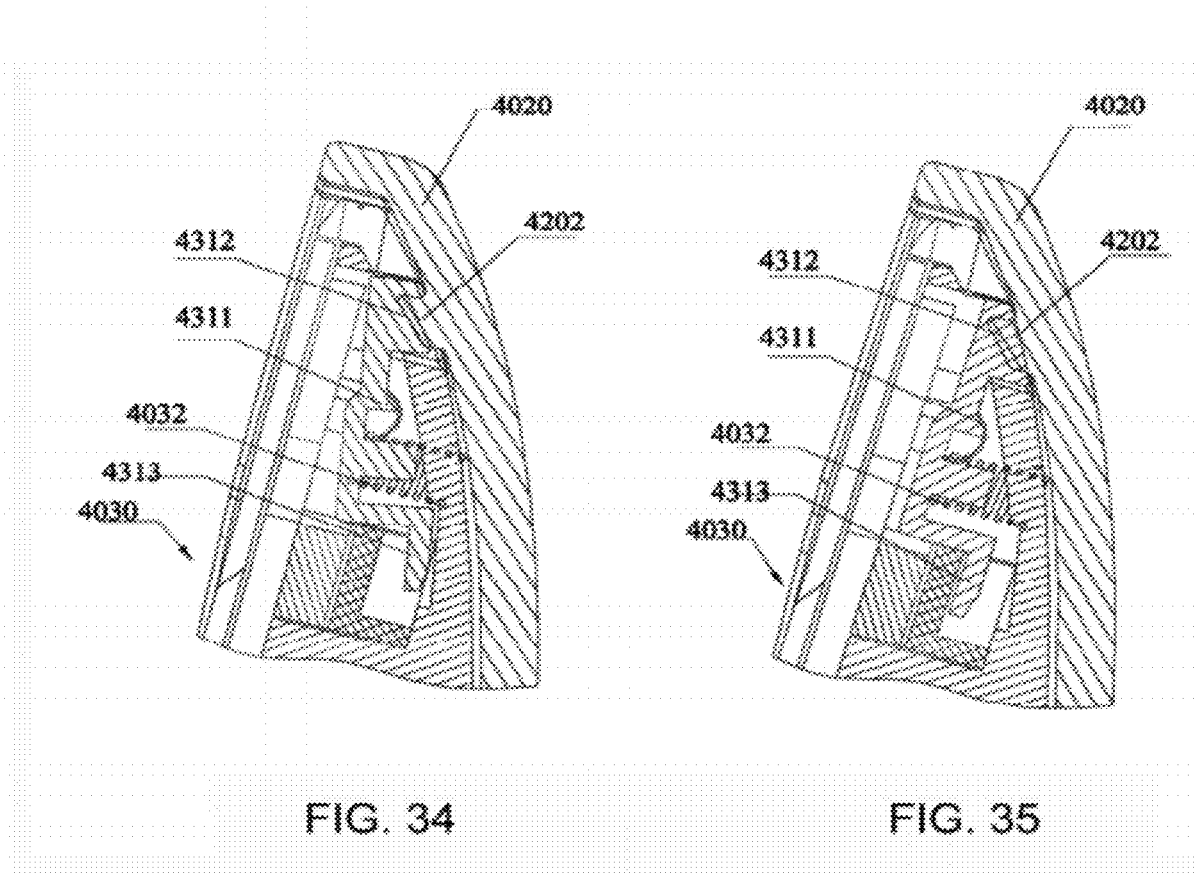
FIG. 34 shows position relationships among respective parts when the tablet computer is mounted into the housing.
FIG. 35 shows position relationships among respective parts after the tablet computer is mounted into the housing, the cutting position in the FIGS. 34 and 35 is positioned at a section plane on which a protruding part and a position limiting part are located.

When the tablet computer 4030 is embedded in the housing 4020, that is, in a course during which the locking tabs 4002 transit to the extending state from the returning state, the first end 4311 of the position limiting means 4031 rotates around its hinging point under pressing by the protrude part 4202 of the housing 4020, as shown in FIG. 34, so that it breaks away from the first operation plane 4121 of the position limiting part 4012. At the same time, the pushing rod 4001 transverse shifts with respect to the tablet computer 4030 brought by the first return spring part 4004, and because the sliding block 4011 on the pushing rod 4001 butts against the side wall of the strip sliding slot 4021 on the locking tabs 4002, the sliding block 4011 pushes the locking tabs 4002 mated thereto to shift lengthways with the shift of the pushing rod 4001 until the extended end of the locking tabs 4002 is inserted into the slot 4203 of the housing 4020, as shown in FIG. 35. In this state, the second end of the position limiting means 4031 is located one side of the second operation plane 4122 of the position limiting part 4012.

When the tablet computer 4030 is detached, it is a course during which the locking tabs 4002 transits to the returning state from the extending state. Toggling the toggle button 4013, the pushing rod 4001 inversely pushes the locking tabs 4002 to be shifted lengthways, until the extended end of the locking tabs 4002 breaks away from the slot 4203 of the housing 4020. The second end 4313 of the position limiting means 4031 rotates around its hinging point under the function of the second operation plane 4122 of the position limiting part 4012, so that it butts against the first operation plane 4121 of the position limiting part 4012 under the function of the second return spring part 4032, so that the tablet computer 4030 may be taken out from the housing.

It is to be noted that, in the embodiments, relationship terms such as first, second and the like are only used to distinguish one entity or operation from another entity or operation, but not necessarily require or imply there's any actual relationship or sequence between these entities or operations. Also, terms "include", "comprise" or any other variation intend to express non-exclusive containing, thereby a procedure, a method, a product or a device including a series of elements can not only include those elements, but also include other elements which is not listed definitely, or includes elements which is inherent to this procedure, method, product or device. In the case that there's no more limitation, element defined by sentence "including one . . . " does not exclude the procedure, method, product or device including said element also has additional same element.

By the description of the above embodiments, those skilled in the art can clearly understand that all of or part of the steps in the above method implementations can be implemented by instructing the related hardware through programs. The programs may be stored in a computer-readable storage medium, and the storage medium herein may be a ROM/RAM, a disk, an optical disc and the like.

Those skilled in the art can clearly understand that, the technique in the embodiments of the present invention may be implemented by software and necessary general hardware platform. Based on such understanding, the part of the technical solution of the invention which is contribute to the prior art may be embodied in the form of software product. This computer software product can be stored in a storage medium, such as a ROM/RAM, a disk, an optical disc and the like, include many instructions to cause one computer device (may be personal computer, server or network device etc.) to implement the embodiments of the invention or method describe by some parts of the embodiment.

The respective embodiment in the present specification is described in a gradual manner, and the same or similar parts among the embodiments may refer to each other. For each embodiment, the description focuses on the difference from other embodiments. And, the embodiments of a device or a terminal may refer to the related part for the corresponding method embodiments, and the repeated parts are omitted.

The above implementations of the present application are not intended to limit the scope sought for protection of the present application. Any amendments, equivalent replacements and enhancements within the sprit and the principle of the present application will fall into the scope sought for protection of the present application.

What is claimed is:

1. A portable terminal comprises: a master device and a slave device, wherein, the master device includes a first housing, a first hardware system and a first Operating System (OS);

the first hardware system is disposed in the first housing and at least includes a first interface, and the first OS runs on the first hardware system;

the slave device includes a second housing, a second hardware system and a second OS;

the second hardware system is disposed in the second housing and at least includes a second interface, the second hardware system is different from the first hardware system, and the second OS runs on the second hardware system;

the master device includes a master detection unit, a master notification unit and a master control unit, and the slave device includes a slave detection unit, a slave notification unit and a slave control unit;

the master detection unit and the slave detection unit are used to detect whether the second interface of the slave device is connected to the first interface of the master device, respectively, and generate a first detection result;

when the first detection result indicates the second interface is connected to the first interface, the master notification unit is used to transmit a first notification instruction to the master device, the slave notification unit is used to transmit the first notification instruction to the slave device, the first notification instruction is used to instruct the master device to connect with the slave device, and the portable terminal is in a connection state when the master device connects with the slave device; and the master control unit and the slave control unit are used to control the first hardware system and the second hardware system to compose a third hardware system, respectively, after the master device and the slave device connect with each other according to the first notification instruction, and the first OS and/or the second OS run on the third hardware system.

2. The portable terminal of claim 1, wherein: when the portable terminal is in the connection state, the master device and the slave device compose a hybrid system architecture to cooperate.

3. The portable terminal of claim 1, wherein: the first hardware system includes a first peripheral, and the first OS connects to the first peripheral though a first switching logic; the second hardware system includes a second peripheral, and the second OS connects to the second peripheral though a second switching logic.

4. The portable terminal of claim 3, wherein: the master control unit is further used for controlling a data processing before the connection between the first OS and the second OS cooperating with the slave control unit, and controlling the first OS to connect with the second switching logic, after the master device receives the first notification instruction, and the first switching logic and the second switching logic are controlled by the first OS;

the slave control unit is further used for controlling a data processing before the connection between the first OS and the second OS cooperating with the master control unit, and controlling the second OS to connect with the first switching logic, after the slave device receives the first notification instruction.

5. The portable terminal of claim 4, wherein: the data processing before connection comprises: restoring data transmission according to the stored data on the current state and configuration files, and loading drivers.

6. The portable terminal of claim 4, wherein: the master detection unit and the slave master detection unit are further used to, respectively, detect whether the second interface of the slave device is disconnected from the first interface of the master device and generate a second detection result, in the connection state;

when the second detection result indicates that the second interface is disconnected from the first interface, the master notification unit is further used to transmit a second notification instruction to the master device, the slave notification unit is further used to transmit the second notification instruction to the slave device, the second notification instruction is used to instruct the master device to disconnect from the slave device, the portable terminal is in a disconnection state after the master device is disconnected from the slave device;

the master control unit and the slave control unit are further used to control the third hardware system to be divided as the first hardware system and the second hardware system, respectively, after the master device and the slave device disconnect with each other according to the second notification instruction, and the master control unit is further used to control the first OS to run on the first hardware system, while the slave control unit is further used to control the second OS to run on the second hardware system.

7. The portable terminal of claim 6, wherein the master detection unit and the slave detection unit comprises at least one of the following units, respectively:

a first detection unit for detecting whether the second interface of the slave device is disconnected from the first interface of the master device, according to a lockpin-key-trigger of a detachable mechanism between the master device and the slave device;

a second detection unit for detecting whether the second interface of the slave device is disconnected from the first interface of the master device, according to a software-trigger set in the first OS;

a third detection unit for detecting whether the second interface of the slave device is disconnected from the first interface of the master device, according to a separation instruction generated when an insert pin in the first interface separate from an insert slot in the second interface.

8. The portable terminal of claim 6, wherein: the master control unit is further used for controlling a data processing before the disconnection between the first OS and the second OS cooperating with the slave control unit and controlling the first OS to disconnect from the second switching logic, after the master device receives the second notification instruction;

the slave control unit is further used for controlling a data processing before the disconnection between the first OS and the second OS cooperating with the master control unit and controlling the second OS to disconnect from the first switching logic, after the slave device receives the second notification instruction.

9. The portable terminal of claim 8, wherein the data processing before disconnection comprises: stopping the data transmission between the first OS and the second OS, interacting the configuration files and uninstalling the driver, and storing data about the current state.

10. The portable terminal of claim 1, wherein the master device or the slave device has a first state and a second state, all of modules in the master device or the slave device are in an operation state when the master device or the slave device is in the first state, and at least one module of all of the modules in the master device or the slave device is in a non-operation state when the master device or the slave device is in the second state; the master device or the slave device further comprises:

a management module for controlling all of modules in the master device or the slave device to be in the operation state or controlling the at least one module of all of the modules in the master device or the slave device to be in the non-operation state;

a detection module for notifying a switching module of a third detection result indicating that the master device is connected to the slave device or the slave device is connected to the master device after obtaining the third detection result; and the switching module for controlling the master device or the slave device to switch to the second state from the first state.

11. The portable terminal of claim 10, wherein when the master device or the slave device is in the second state, the at least one module in the master device or the slave device which is in the non-operation state is one of or the combination of: a gravity sensor, a virtual keyboard control module and an audio device module.

12. The portable terminal of claim 11, wherein when the master device or the slave device is in the second state, the module in the master device or the slave device which is in the non-operation state further comprises a power supply module.

13. The portable terminal of claim 10, wherein the switching module comprises:

a power supply control module for turning off the power supplies of the modules which are in the non-operation state, or the switching module comprises:

a function control module for disabling the functions of the modules which are in the non-operation state, or the switching module comprises:

a mask control module for masking the instructions issued from the modules which are in the non-operation state.

14. The portable terminal of claim 1, wherein the master device is further equipped with a connection support apparatus, and the slave device is further equipped with a connection adaptation apparatus, the master device and the slave device compose the portable terminal or separate as two separate devices through adaptation between the connection support apparatus and the connection adaptation apparatus.

15. The portable terminal of claim 14, wherein the connection support apparatus has a first surface on which a first connection joint is disposed, the first connection joint includes at least one first connection terminal; the connection adaptation apparatus has a second surface on which a second connection joint is disposed, the second connection joint includes at least one second connection terminal;

the master device connects slidably with the slave device through the adaptation between the connection support apparatus and the connection adaptation apparatus, the first surface fits onto the second surface, and one of the at least one first connection terminal connects to one of the at least one second connection terminal one-to-one correspondingly.

16. The portable terminal of claim 15, wherein: a mating slot for fixing the master device is formed on the slave device, and the mating slot is formed as the connection adaptation apparatus, the second surface is located inside the mating slot; an insertion part for mating to the mating slot is formed on the master device, and the insertion part is formed as the connection support apparatus, one side on the insertion part forms the first surface; the master device connects to the slave device, the insertion part inserts into the mating slot, and the first surface fits onto the second surface.

17. The portable terminal of claim 15, wherein: the connection adaptation apparatus is connected to a second housing of the slave device through a spindle.

18. The portable terminal of claim 15, wherein: the connection adaptation apparatus comprises a containing space with an opening, the shape of the containing space corresponds to the shape of the first housing of the master device; and when the master device connects to the slave device, the master device is inserted slidably into the containing space, and a display screen of the display unit exposes via the containing space.

19. The portable terminal of claim 18, wherein: the second surface is a bottom surface of the containing space, the first surface is a lower side surface of the first housing of the master device; and in a first inner side surface and the second inner side surface of the containing space, guide rail tracks are formed, respectively, along the length direction of the first inner surface and the second inner surface, the first inner surface is opposite to the second inner surface, the master device is disposed in a connection pedestal, and the left side surface and the right side surface of the master device are mated to the guide rail tracks of the first inner surface and the second inner surface to connect.

20. The portable terminal of claim 19, wherein: the connection adaptation apparatus further comprises a locking mechanism disposed in the inner side of the top surface of the containing space, wherein the top surface is opposite to the bottom surface.

21. The portable terminal of claim 19, wherein: the locking mechanism comprises a spring and a connection linkage, wherein one end of the spring is fixed on one side of the containing space, the other end of the spring connects to the connection linkage, and the connection linkage is arranged to be in parallel to the top surface.

22. The portable terminal of claim 21, wherein: a hook is formed at left end and right end of the connection linkage, respectively, and a trigger part which is protrude is formed at the middle of the connection linkage, the trigger part is inserted into a hole formed on the top surface; the back surface of the first housing of the master device fits and contacts to a rear bottom surface of the containing space and the hook hooks up the first housing of the master device, when the trigger part is at a first position in the hole; the hook hooks away from the first housing of the master device, and the back surface of the first housing of the master device departs from the rear bottom surface of the containing space, when the trigger part is at a second position in the hole.

23. The portable terminal of claim 15, wherein: the first connection joint further comprises a first magnetic absorbing element, the second connection joint further comprises a second magnetic absorbing element, the master device connects to the slave device, and the first magnetic absorbing element is attracted to the second magnetic absorbing element.

24. The portable terminal of claim 14, wherein the connection support apparatus further comprises:

a protection cover having at least one hole, each of the at least one hole corresponds to each of the at least one connection terminal, the at least one hole is positioned at a top board of the protection cover;

a spring connection part disposed between the first connection joint and the protection cover, the protection cover connects with the first connection joint via the spring connection part; wherein the top board of the protection cover is higher than the top of a contact part of the at least one connection terminal when the spring connection part is at a first position, and the contact part of the at least one terminal passes through the corresponding hole on the protection cover and exposes itself to the top board of the protection cover when the spring connection part is at a second position.

25. The portable terminal of claim 24, wherein: the spring connection part comprises at least one spring support part, and one end of the spring support part is fixed on the first connection joint while the other end contacts with the protection cover.

26. The portable terminal of claim 24, wherein the spring connection part further comprises at least one location part, and the location part comprises:

a first fix part located on the first connection joint;

a second fix part located on a side board of the protection cover, and the first fix part clips on the second fix part when the spring connection part is at the first position.

27. The portable terminal of claim 25, wherein: the spring support part comprises a spring and a support body, one end of the spring is fixed on the first connection joint, and the other end is fixed to a first end of the supporting body;

a second end of the supporting body contacts with a position without holes on the inner wall of the top board of the protection cover; when the spring connection part is at the first position, the spring is in a free state and the supporting body lifts up the protection cover.

28. The portable terminal of claim 25, wherein: the spring support part is embodied as a spring, one end of the spring is fixed on the connection joint, and the other end is fixed to the protection cover.

29. The portable terminal of claim 25, wherein: the spring support part is a connection terminal without electrical signal.

30. The portable terminal of claim 14, wherein the connection support apparatus further comprises:

a protection cover, holes corresponding to each of at least one first connection terminals are disposed on the protection cover;

wherein the number of the at least one first connection terminals is same as the number of the at least one second connection terminals;

wherein the at least one first connection terminal of the connection support apparatus contacts with the at least one second connection terminal of the connection adaptation apparatus by passing through the corresponding holes on the protection cover, when the master device connects to the slave device through the connection support apparatus; and the protection cover covers a top of a contact part of the at least one first connection terminal, when the master device disconnects from the slave device through the connection support apparatus.

31. The portable terminal of claim 30, wherein: the protection cover connects with the connection support apparatus through a spring connection part.

32. The portable terminal of claim 31, wherein: the spring connection part comprises at least one spring support part, and one end of the spring support part is fixed on the first connection joint of the connection support apparatus while the other end contacts with the protection cover.

33. The portable terminal of claim 31, wherein the spring connection part further comprises at least one location part, and the location part comprises:
a first fix part located on the first connection joint of the connection support apparatus; and
a second fix part located on a side board of the protection cover, and the first fix part clips on the second fix part when the spring connection part is at the first position.

34. The portable terminal of claim 1, further comprises a locking mechanism used for connecting the master device with the slave device, wherein: it comprises a pushing rod and a locking tab both disposed between the master device and the slave device, a second housing of the slave device has a slot disposed correspondingly to the locking tab thereon; the pushing rod shifts transversely along an outer edge of a second housing of the slave device, in order to make the locking tab shift lengthways until an extended end of the locking tab is inserted into the slot of the second housing of the slave device.

35. The portable terminal of claim 34, wherein,
the pushing rod has a protruded sliding block and a position limiting part;
the locking tab has a mating slope butting against the sliding block on the pushing rod, the locking tab is disposed between two lengthways position limiting parts set face-to-face and may shift lengthways along the two lengthways position limiting parts; there is an angle between the mating slope and the length direction of the pushing rod so that the transverse shift of the pushing rod brings the locking tab to shift lengthways; and the locking mechanism further comprises:
a position limiting component disposed between the master device and the slave device, the position limiting component is mated to the position limiting part on the pushing rod; and
a first return spring part connecting to the pushing rod and the master device, respectively; and
the second housing of the slave device has a protrude part disposed correspondingly to the position limiting component thereon;
wherein when the locking tab is in a returning state, the first return spring part is deformed by force under the function of the pushing rod, and the position limiting component butts against the position limiting part on the pushing rod so as to limit the transverse shift of the pushing rod; when the master device connects with the second housing of the slave device, the protrude part presses the position limiting component to be separated from the position limiting part on the pushing rod, so that the first return spring part brings the pushing rod to shift transversely and the locking tab extends to be inserted into the slot of the second housing of the slave device.

36. The portable terminal of claim 35, wherein: both of the numbers of the locking tab and the sliding block on the pushing rod are at least two, and they are disposed correspondingly and sequentially along the length direction of the pushing rod, respectively; and the mating slope on the locking tab is embodied as a strip sliding slot.

37. The portable terminal of claim 36, wherein: a transverse groove for accepting the pushing rod and a lengthways groove for accepting the locking tab are disposed on the surface of the first housing of the master device, wherein the length of the transverse groove is more than or equal to a sum of the length of the pushing rod and its displacement, and the lengthways groove extends to the outer edge of the master device.

38. The portable terminal of claim 35, wherein the position limiting component further comprises:
a position limiting means hinging with the first housing of the master device, a first end on one side of the hinging point cooperates with the protrude part on the second housing of the slave device, while the second end on the other side of the hinging point cooperates with the position limiting part on the pushing rod; and
a second return spring part disposed between the position limiting means and the master device; and
one side of the position limiting part has a first operation plane perpendicularly to the length direction of the pushing rod, and the other side of the position limiting part has a second operation plane inclining to the body of the pushing rod from the top of the position limiting part; the second housing of the slave device has a strip opening set along the length direction of the pushing rod thereon, and the pushing rod has a toggle button extending outwards through the strip opening of the second housing of the slave device; and
in a course during which the locking tab transits to the returning state from the extending state, a second end of the position limiting means rotates around its hinging point under the function of the second operation plane of the position limiting part, so that it butts against the first operation plane of the position limiting part under the function of the second return spring part; in a course during which the locking tab transits to the extending state from the returning state, a second end of the position limiting means rotates around its hinging point under pressing by the protrude part of the second housing of the slave device, so that it breaks away from the first operation plane of the position limiting part.

39. The portable terminal of claim 38, wherein: the first return spring part is embodied as a tension spiral spring, and the second return spring part is embodied as a compressed spiral spring.

40. The portable terminal of claim 1, wherein the master device is embedded in a second housing of the slave device, wherein: a pushing rod and a locking tab are disposed between the master device and the second housing of the slave device, the second housing of the slave device has a slot disposed correspondingly to the locking tab thereon; the pushing rod shifts transversely along an outer edge of the second housing, in order to make the locking tab shift lengthways until an extended end of the locking tab is inserted into the slot of the second housing.

41. The portable terminal of claim 40, wherein,
the pushing rod has a protruded sliding block and a position limiting part;
the locking tab has a mating slope butting against the sliding block on the pushing rod, the locking tab is disposed between two lengthways position limiting parts set face-to-face and shift lengthways along the two lengthways position limiting parts; there is an angle between the mating slope and the length direction of the pushing rod so that the transverse shift of the pushing rod brings the locking tab to shift lengthways; and further comprises:
a position limiting component disposed between the master device and the second housing of the slave device, the position limiting component is mated with the position limiting part on the pushing rod; and
a first return spring part connecting to the pushing rod and the master device, respectively; and
the second housing of the slave device has a protrude part disposed correspondingly to the position limiting component thereon;
wherein when the locking tab is in a returning state, the first return spring part is deformed by force under the function of the pushing rod, and the position limiting component butts against the position limiting part on the pushing rod so as to limit the transverse shift of the pushing rod; when the master device is embedded into the second housing of the slave device, the protrude part presses the position limiting component to be separated from the position limiting part on the pushing rod, so that the first return spring part brings the pushing rod to shift transversely and the locking tab extends to be inserted into the slot of the housing.

42. The portable terminal of claim 41, wherein: both of the numbers of the locking tab and the sliding block on the pushing rod are at least two, and they are disposed correspondingly and sequentially along the length direction of the pushing rod, respectively; and the mating slope on the locking tab is embodied as a strip sliding slot.

43. The portable terminal of claim 42, wherein: a transverse groove for accepting the pushing rod and a lengthways groove for accepting the locking tab are disposed on the surface of the first housing of the master device, wherein the length of the transverse groove is more than or equal to a sum of the length of the pushing rod and its displacement course, and the lengthways groove extends to the outer edge of the master device.

44. The portable terminal of claim 41, wherein the position limiting component further comprises:
a position limiting means hinging with the first housing of the master device, a first end on one side of the hinging point cooperates with the protrude part on the second housing of the slave device, while the second end on the other side of the hinging point cooperates with the position limiting part on the pushing rod; and
a second return spring part disposed between the position limiting means and the master device; and
one side of the position limiting part has a first operation plane perpendicularly to the length direction of the pushing rod, the other side of the position limiting part has a second operation plane inclining to the body of the pushing rod from the top of the position limiting part; the second housing of the slave device has a strip opening set along the length direction of the pushing rod thereon, and the pushing rod has a toggle button extending outwards through the strip opening of the second housing of the slave device; and
in a course during which the locking tab transits to the returning state from the extending state, a second end of the position limiting means rotates around its hinging point under the function of the second operation plane of the position limiting part, so that it butts against the first operation plane of the position limiting part under the function of the second return spring part; in a course during which the locking tab transits to the extending state from the returning state, a second end of the position limiting means rotates around its hinging point under pressing by the protrude part of the second housing of the slave device, so that it breaks away from the first operation plane of the position limiting part.

45. A control method for a portable terminal, wherein the portable terminal comprises a master device and a slave device, wherein the master device include a first housing, a first hardware system and a first Operating System (OS); the first hardware system is disposed in the first housing and at least includes a first interface, and the first OS runs on the first hardware system; the slave device includes a second housing, a second hardware system and a second OS; the second hardware system is disposed in the second housing and at least includes a second interface, the second hardware system is different from the first hardware system, and the second OS runs on the second hardware system;
the method comprises the steps of:
detecting whether the second interface of the slave device is connected to the first interface of the master device, and generating a first detection result;
when the first detection result indicates the second interface is connected to the first interface, transmitting a first notification instruction to the master device and the slave device, respectively, the first notification instruction is used to instruct the master device to connect with the slave device, and the portable terminal is in a connection state when the master device connects with the slave device;
controlling the first hardware system and the second hardware system to compose a third hardware system after the master device and the slave device connect with each other according to the first notification instruction, and the first OS and/or the second OS run(s) on the third hardware system.

46. The method of claim 45, wherein the first hardware system includes a first peripheral, and the first OS connects to the first peripheral though a first switching logic; the second hardware system includes a second peripheral, and the second OS connects to the second peripheral though a second switching logic;
the method further comprises steps of:
controlling a data processing before the connection between the first OS and the second OS, controlling the first OS to connect with the second switching logic, and controlling the second OS to connect with the first switching logic, after the master device and the slave device receive the first notification instruction, and the first switching logic and the second switching logic are controlled by the first OS.

47. The method of claim 46, further comprises steps of:
detecting whether the second interface of the slave device is disconnected from the first interface of the master device and generating a second detection result, in the connection state;
transmitting a second notification instruction to the master device and the slave device, respectively, when the second detection result indicates that the second interface is disconnected from the first interface, the second notification instruction is used to instruct the master device to disconnect from the slave device, the portable terminal is in a disconnection state when the master device is disconnected from the slave device;

controlling the third hardware system to be divided as the first hardware system and the second hardware system, respectively, after the master device and the slave device disconnect with each other according to the second notification instruction, and controlling the first OS to run on the first hardware system the second OS to run on the second hardware system.

48. The method of claim 47, further comprises steps of: controlling a data processing before the disconnection between the first OS and the second OS, controlling the first OS to disconnect from the second switching logic and controlling the second OS to disconnect from the first switching logic, after the master device and the slave device receive the second notification instruction.

49. The method of claim 45, wherein the master device or the slave device has a first state and a second state, all of modules in the master device or the slave device are in an operation state when the master device or the slave device is in the first state, and at least one module of all of the modules in the master device or the slave device is in a non-operation state when the master device or the slave device is in the second state; the method further comprises steps of:

obtaining a third detection result indicating that the master device is connected to the slave device or the slave device is connected to the master device; and controlling the master device or the slave device to switch to the second state from the first state, according to the third detection result.

50. The method of claim 49, wherein when the master device or the slave device is in the second state, the at least one module in the master device or the slave device which is in the non-operation state is one of or the combination of: a gravity sensor, a virtual keyboard control module and an audio device module.

51. The method of claim 49, wherein: when the master device or the slave device is in the second state, the module in the master device or the slave device which is in the non-operation state further comprises a power supply module; the master device gets power from the slave device or the slave device gets power from the master device.

52. The method of claim 50, wherein: when the master device or the slave device is in the second state, the module in the master device or the slave device which is in the operation state further comprises a power supply module; the master device supplies the power to the slave device or the slave device supplies the power to the master device.

53. The method of claim 49, wherein the manner for controlling the master device or the slave device to switch to the second state from the first state comprises:

turning off the power supplies of the modules which are in the non-operation state, or disabling the functions of the modules which are in the non-operation state, or masking the instructions issued from the modules which are in the non-operation state.

54. The method of claim 49, further comprises: all of modules in the master device or the slave device are in the operation state when the master device or the slave device switches to the first state from the second state.

55. A portable device, comprising: a first housing, a first hardware system and a first Operating System (OS), the first hardware system is disposed in the first housing and at least includes a display unit and a first interface, and the first OS runs on the first hardware system; the portable device further comprises:

a detection unit for detecting whether the first interface is connected to a second interface of a second portable device and generating a first detection result, wherein the second portable device has a second housing, a second hardware system and a second OS, the second hardware system is disposed in the second housing and at least includes a second interface, and the second OS runs on the second hardware system;

a notification unit for transmitting a first notification instruction to an embedded controller EC in the first hardware system and the second portable device, respectively, when the first detection result indicates the second interface is connected with the first interface, the first notification instruction is used to instruct the portable device to connect with the second portable device; and a control unit for controlling the first hardware system and the second hardware system to compose a third hardware system after the portable device and the second portable device connect with each other according to the first notification instruction, and the first OS and/or the second OS run(s) on the third hardware system.

56. The portable device of claim 55, wherein: the control unit is further used for controlling to perform the data processing before connection between the first OS and the second OS, when the portable device and the second portable device receive the first notification instruction;

the data processing before connection comprises: restoring data transmission according to the stored data about the current state and the configuration file, and loading the driver.

57. The portable device of claim 55, wherein: the detection unit is further used for detecting whether the second interface of the second portable device is disconnected from the first interface of the portable device and generating a second detection result, after the portable device connects to the second portable device;

the notification unit is further used for transmitting a second notification instruction to the portable device and the second portable device, respectively, when the second detection result indicates that the second interface is disconnected from the first interface, the second notification instruction is used to instruct the portable device to disconnect from the second portable device;

the control unit is further used for controlling the third hardware system to be divided as the first hardware system and the second hardware system, after the portable device and the second portable device disconnect with each other according to the second notification instruction, and controlling the first OS to run on the first hardware system.

58. The portable device of claim 57, wherein: the control unit is further used for controlling to perform the data processing before disconnection between the first OS and the second OS after the portable device and the second portable device receive the second notification instruction;

the data processing before disconnection comprises: stopping the data transmission between the first OS and the second OS, interacting the configuration files and uninstalling the driver, and storing data about the current state.

59. The portable device of claim 55, the portable device has a first state and a second state, all of modules in the portable device are in an operation state when the portable device is in the first state, and at least one module of all of the modules in the portable device is in a non-operation state when the portable device is in the second state;

the portable device further comprises:
a management module for controlling all of modules in the portable device to be in the operation state or controlling the at least one module of all of the modules in the portable device to be in the non-operation state;
a detection module for notifying a switching module of a third detection result indicating that the portable device is connected to the second portable device after obtaining the detection result; and
the switching module for controlling the portable device to switch to the second state from the first state.

60. The portable device of claim 55, wherein: the portable device further comprises a first connection part, the first connection part is disposed on the first housing of the portable device, and the first connection part has a first surface on which a first connection joint is disposed, the first connection joint includes at least one first connection terminal;
the second portable device further comprises a second connection part, the second connection part is disposed on the second housing of the second portable device, and the second connection part has a second surface on which a second connection joint is disposed, the second connection joint includes at least one second connection terminal;
the portable device connects slidably with the second portable device through the first connection part and the second connection part, the first surface fits onto the second surface, and one of the at least one first connection terminal connects to the one of the at least one second connection terminal one-to-one correspondingly.

61. The portable device of claim 55, further comprising:
a display unit disposed in the first housing, a display screen of the display unit is exposed from the first housing of the portable device;
a first connection part disposed on the first housing of the portable device, and the first connection part has a first surface on which a first connection joint which electrically connects to a second connection joint of the slave device is disposed, the first connection joint includes at least one first connection terminal;
wherein when the portable device connects with the second portable device, the first connection part connects to the second connection part of the second portable device, the first surface fits onto a second surface of the second portable device on which a second connection joint is formed, and one of the at least one first connection terminal connects to the one of the at least one second connection terminal of the second connection joint one-to-one correspondingly.

62. The portable device of claim 55, wherein the second portable device further comprises:
a keyboard;
a second connection part disposed on the second housing of the second portable device, and the second connection part has a second surface on which a second connection joint which electrically connects to a first connection joint of the portable device is disposed, the second connection joint includes at least one second connection terminal;
wherein when the portable device connects with the second portable device, the second connection part connects to the first connection part of the portable device, the second surface fits onto a first surface of the portable device on which the first connection joints are formed, and one of the at least one second connection terminal connects to the one of the at least one first connection terminal of the first connection joint one-to-one correspondingly.

63. The portable device of claim 60, wherein the first connection part further comprises:
a protection cover having at least one hole, each of the at least one hole corresponds to each of the at least one first connection terminal, the at least one hole is positioned at a top board of the protection cover;
a spring connection part disposed between the first connection joint and the protection cover, the protection cover connects with the first connection joint via the spring connection part; wherein the top board of the protection cover is higher than the top of the contact part of the at least one connection terminal when the spring connection part is at a first position, and the contact part of the at least one terminal passes through the corresponding hole on the protection cover and exposes itself to the top board of the protection cover when the spring connection part is at a second position.

64. The portable device of claim 60, further comprising:
a spindle,
the first connection part connects to the portable device via the spindle, and includes:
a protection cover, holes corresponding to each of at least one first connection terminals are disposed on the protection cover;
the second portable device has a display function and connects to the portable device through the first connection part;
the number of the at least one second connection terminals of the second connection part of the second portable device is same as the number of the at least one first connection terminals of the first connection part of the portable device;
wherein the at least one first connection terminal of the first connection part contacts with the at least one second connection terminal of the second connection part by passing through the corresponding holes on the protection cover, when the second portable device connects to the portable device through the first connection part; and the protection cover covers a top of a contact part of the at least one first connection terminal, when the second portable device disconnects from the portable device through the first connection part.

65. The portable device of claim 55, further comprises a locking mechanism used for connecting the portable device with the second portable device embedding the portable device, wherein: it comprises a pushing rod and a locking tab both disposed between the portable device and the second portable device, the second portable device has a slot disposed correspondingly to the locking tab thereon; the pushing rod shifts transversely along an outer edge of the second portable device, in order to make the locking tab shift lengthways until an extended end of the locking tab is inserted into the slot of the second portable device.

66. A control method for a portable device, wherein the portable device comprises a first housing, a first hardware system and a first Operating System (OS), the first hardware system is disposed in the first housing and at least includes a first interface, and the first OS runs on the first hardware system;
the method comprises the steps of:
detecting whether the first interface is connected to a second interface of a second portable device and generating a first detection result, wherein the second portable device has a second housing, a second hardware system and a second OS, the second hardware system is disposed in the second housing and at least includes a second interface, and the second OS runs on the second hardware system;
transmitting a first notification instruction to an embedded controller EC in the first hardware system and the second portable device, respectively, when the first detection result indicates the second interface is connected with the first interface, the first notification instruction is used to instruct the portable device to connect with the second portable device; and
controlling the first hardware system and the second hardware system to compose a third hardware system after the portable device and the second portable device connect with each other according to the first notification instruction, and the first OS and/or the second OS run(s) on the third hardware system.

67. The method of claim 66, further comprising steps of: controlling a data processing before the connection between the first OS and the second OS, after the portable device and the second portable device receive the first notification instruction, and the data processing before connection comprises: restoring data transmission according to the stored data about the current state and the configuration file, and loading the driver.

68. The method of claim 66, further comprises steps of:
detecting whether the second interface of the second portable device is disconnected from the first interface of the portable device and generating a second detection result, after the portable device connects to the second portable device;
transmitting a second notification instruction to the portable device and the second portable device, respectively, when the second detection result indicates that the second interface is disconnected from the first interface, the second notification instruction is used to instruct the portable device to disconnect from the second portable device;
controlling the third hardware system to be divided as the first hardware system and the second hardware system, respectively, after the portable device and the second portable device disconnect with each other according to the second notification instruction, and controlling the first OS to run on the first hardware system.

69. The method of claim 68, further comprising steps of: controlling a data processing before the disconnection between the first OS and the second OS, after the portable device and the second portable device receive the second notification instruction, the data processing before disconnection comprises: stopping the data transmission between the first OS and the second OS, interacting the configuration file and uninstalling the driver, and storing data about the current state.

70. The method of claim 66, wherein: the portable device has a first state and a second state, all of modules in the portable device are in an operation state when the portable device is in the first state, and at least one module of all of the modules in the portable device is in a non-operation state when the portable device is in the second state; the method further comprises steps of:
obtaining a third detection result indicating that the portable device is connected to the second portable device; and
controlling the portable device to switch to the second state from the first state, according to the third detection result.

71. The portable terminal of claim 1, wherein:
the master device comprises a display unit, the first housing and a first connection part acting as a connection support apparatus, the first connection part is disposed on the first housing of the master device, and the first connection part has a first surface on which a first connection joint is disposed, the first connection joint includes at least one first connection terminal;
the slave device, including a keyboard, the second housing and a second connection part acting as a connection adaptation apparatus, the second connection part is disposed on the second housing of the slave device, and the second connection part has a second surface on which a second connection joint is disposed, the second connection joint includes at least one second connection terminal;
the master device connects slidably with the slave device through the first connection part and the second connection part, the first surface fits onto the second surface, and one of the at least one first connection terminal connects to the one of the at least one second connection terminal one-to-one correspondingly.

72. The portable terminal of claim 1, wherein the master device further comprises:
a display unit disposed in the first housing, a display screen of the display unit is exposed from the first housing of the master device;
a first connection part, acting as the connection support apparatus, disposed on the first housing of the master device, and the first connection part has a first surface on which a first connection joint which electrically connects to a second connection joint of the slave device is disposed, the first connection joint includes at least one first connection terminal;
wherein when the master device connects with the slave device, the first connection part connects to the second connection part of the slave device, the first surface fits onto a second surface of the slave device on which a second connection joint is formed, and one of the at least one first connection terminal connects to the one of the at least one second connection terminal of the second connection joint one-to-one correspondingly.

73. The portable terminal of claim 1, wherein the slave device further comprises:
a keyboard;
a second connection part, acting as a connection adaptation apparatus, disposed on the second housing of the slave device, and the second connection part has a second surface on which a second connection joint which electrically connects to a first connection joint of the master device is disposed, the second connection joint includes at least one second connection terminal;
wherein when the master device connects with the slave device, the second connection part connects to the first connection part of the master device, the second surface fits onto a first surface of the master device on which a first connection joint is formed, and one of the at least one second connection terminal connects to the one of the at least one first connection terminal of the first connection joint one-to-one correspondingly.

74. The portable terminal of claim 1, wherein, a connector is applied to the portable terminal having a master device and a slave device, and wherein the connecter comprises:
a connection joint, on which at least one connection terminal is disposed;
a protection cover having at least one hole, each of the at least one hole corresponds to each of the at least one connection terminal, the at least one hole is positioned at a top board of the protection cover;
a spring connection part disposed between the connection joint and the protection cover, the protection cover connects with the connection joint via the spring connection part; wherein the top board of the protection cover is higher than the top of the contact part of the at least one connection terminal when the spring connection part is at a first position, and the contact part of the at least one terminal passes through the corresponding hole on the protection cover and exposes itself to the top board of the protection cover when the spring connection part is at a second position.

75. The portable terminal of claim 1, further comprising:
a spindle;
a first connection part, acting as a connection support apparatus, which connects to the master device through the spindle;
a first connection joints disposed on the first connection part and including
   a protection cover;
   at least one connection terminal, holes corresponding to each of the connection terminals are disposed on the protection cover, respectively;
the slave device having display function, which connects to the master device through the first connection part;
a second connection joints disposed on the slave device having display function and having at least one second connection terminal, the number of the second connection terminals is same as the number of the first connection terminals;
wherein the at least one first connection terminal in the first connection joints contact with the at least one second connection terminal in the second connection joints by passing through the corresponding holes on the protection cover, when the slave device having display function connects to the master device through the first connection part; and the protection cover covers the top of contact point of the at least one first connection terminal, when the slave device having display function disconnects from the master device through the first connection part.

76. The portable terminal of claim 1, wherein a locking mechanism is applied to the portable terminal and is used for connecting the master device with the slave device embedding the master device, wherein: it comprises a pushing rod and a locking tab both disposed between the master device and the slave device, the slave device has a slot disposed correspondingly to the locking tab thereon; the pushing rod shifts transversely along an outer edge of the slave device, in order to make the locking tab shift lengthways until an extended end of the locking tab is inserted into the slot of the slave device.

77. The portable terminal of claim 1, wherein the master device is embedded in the second housing of the slave device hinged with the slave device, wherein: a pushing rod and a locking tab are disposed between the master device and the slave device, the second housing of the slave device has a slot disposed correspondingly to the locking tab thereon; the pushing rod shifts transversely along an outer edge of the second housing of the slave device, in order to make the locking tab shift lengthways until an extended end of the locking tab is inserted into the slot of the second housing of the slave device.

* * * * *